US012368859B2

(12) United States Patent
Ruiz Coll et al.

(10) Patent No.: US 12,368,859 B2
(45) Date of Patent: Jul. 22, 2025

(54) VIDEO COMPRESSION USING BLOCK VECTOR PREDICTOR REFINEMENT

(71) Applicant: Comcast Cable Communications, LLC, Philadelphia, PA (US)

(72) Inventors: Damian Ruiz Coll, Reston, VA (US); Tae Meon Bae, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 76 days.

(21) Appl. No.: 17/957,625

(22) Filed: Sep. 30, 2022

(65) Prior Publication Data

US 2023/0102958 A1   Mar. 30, 2023

Related U.S. Application Data

(63) Continuation of application No. 17/957,193, filed on Sep. 30, 2022, now Pat. No. 12,137,227.

(60) Provisional application No. 63/316,312, filed on Mar. 3, 2022, provisional application No. 63/250,336, filed on Sep. 30, 2021.

(51) Int. Cl.
*H04N 19/137* (2014.01)
*H04N 19/105* (2014.01)
*H04N 19/176* (2014.01)

(52) U.S. Cl.
CPC ......... *H04N 19/137* (2014.11); *H04N 19/105* (2014.11); *H04N 19/176* (2014.11)

(58) Field of Classification Search
CPC ... H04N 19/137; H04N 19/105; H04N 19/176
USPC .................................................. 375/240.02
See application file for complete search history.

(56) References Cited

U.S. PATENT DOCUMENTS

| | | | |
|---|---|---|---|
| 10,856,009 B2 * | 12/2020 | Chuang | H04N 19/513 |
| 2015/0195559 A1 | 7/2015 | Chen et al. | |
| 2015/0271515 A1 | 9/2015 | Pang et al. | |
| 2016/0330471 A1 * | 11/2016 | Zhu | H04N 19/91 |
| 2017/0094271 A1 * | 3/2017 | Liu | H04N 19/176 |
| 2017/0134724 A1 | 5/2017 | Liu et al. | |
| 2017/0223379 A1 * | 8/2017 | Chuang | H04N 19/513 |
| 2020/0021835 A1 | 1/2020 | Xu et al. | |
| 2020/0327702 A1 | 10/2020 | Wang et al. | |
| 2020/0404287 A1 * | 12/2020 | Xu | H04N 19/174 |
| 2021/0021811 A1 | 1/2021 | Xu et al. | |
| 2021/0250580 A1 | 8/2021 | Chen et al. | |
| 2021/0368198 A1 | 11/2021 | Zhang et al. | |

(Continued)

FOREIGN PATENT DOCUMENTS

WO    2015/100726 A1    7/2015

OTHER PUBLICATIONS

Gao, Han, et al. "Decoder Side Motion Vector Refinement for Versatile Video Coding", George Mason University. Downloaded on Jun. 23, 2021, 978-1-7281-1817-8/19/$31.00 c 2019 IEEE.

(Continued)

*Primary Examiner* — Jessica M Prince
(74) *Attorney, Agent, or Firm* — Banner & Witcoff, Ltd.

(57) ABSTRACT

Encoding and/or decoding a block of a video frame may be based on a previously decoded reference block in the same frame or in a different frame. The reference block may be indicated by a block vector (BV). The BV may be encoded as difference between a block vector predictor (BVP) and the BV. The BVP may be adjusted to improve prediction accuracy of the BVP.

20 Claims, 30 Drawing Sheets

(56) References Cited

U.S. PATENT DOCUMENTS

| | | | |
|---|---|---|---|
| 2022/0086447 A1* | 3/2022 | Xu | .................... H04N 19/52 |
| 2022/0109852 A1 | 4/2022 | Xu et al. | |
| 2022/0166998 A1 | 5/2022 | Lim et al. | |
| 2022/0182638 A1 | 6/2022 | Xu et al. | |
| 2022/0272388 A1 | 8/2022 | Jang | |
| 2022/0368916 A1 | 11/2022 | Zhang et al. | |
| 2023/0019544 A1 | 1/2023 | Solovyev et al. | |

OTHER PUBLICATIONS

Xu, Xiaozhong, et al. "Intra block copy in Versatile Video Coding with Reference Sample Memory Reuse", 2019 Picture Coding Symposium (PCS) Nov. 12-15, 2019, Ningbo, China, 978-1-7281-4704-8/19/$31.00 © 2019 IEEE.

JVET-L0159r1, Joint Video Experts Team (JVET) of ITU-T SG 16 WP 3 and ISO/IEC JTC 1/SC 29/WG 11 12th Meeting: Macau, CN, Oct. 8-12, 2018, Source: LG Electronics Inc., Title: Non-CE8: Block vector predictor for IBC.

JVET-N0382-v1v2, Joint Video Experts Team (JVET) of ITU-T SG 16 WP 3 and ISO/IEC JTC 1/SC 29/WG 11 14th Meeting: Geneva, CH, Mar. 19-27, 2019, Source: Tencent, Title: CE8-related: Unified intra block copy block vector prediction.

JVET-N0457, Joint Video Experts Team (JVET) of ITU-T SG 16 WP 3 and ISO/IEC JTC 1/SC 29/WG 11 14th Meeting: Geneva, CH, Mar. 19-27, 2019, Source: LG Electronics Inc., Title: CE8-1.1: Block vector prediction for IBC.

JVET-N0460, Joint Video Experts Team (JVET) of ITU-T SG 16 WP 3 and ISO/IEC JTC 1/SC 29/WG 11 14th Meeting: Geneva, CH, Mar. 19-27, 2019, Source: LG Electronics Inc., Title: CE8-related: Default candidates for IBC merge mode.

JVET-O0078-v3, Joint Video Experts Team (JVET) of ITU-T SG 16 WP 3 and ISO/IEC JTC 1/SC 29/WG 11 15th Meeting: Gothenburg, SE, Jul. 3-12, 2019, Source: Peking University, SZ DJI Technology Co., Ltd., Bytedance Inc., Tencent, Title: CE8-1.7: Single HMVP table for all CUs inside the shared merge list region for IBC.

JVET-P0400, Joint Video Experts Team (JVET) of ITU-T SG 16 WP 3 and ISO/IEC JTC 1/SC 29/WG 11 16th Meeting: Geneva, CH, Oct. 1-11, 2019, Source: Bytedance Inc., Title: AhG16/Non-CE8: Removal of shared merge list.

JVET-P0457-v12, Joint Video Experts Team (JVET) of ITU-T SG 16 WP 3 and ISO/IEC JTC 1/SC 29/WG 11 16th Meeting: Geneva, CH, Oct. 1-11, 2019, Source: Tencent, Title: Non-CE8: On IBC merge list size signaling.

JVET-Q0327-v41, Joint Video Experts Team (JVET) of ITU-T SG 16 WP 3 and ISO/IEC JTC 1/SC 29/WG 11 17th Meeting: Brussels, BE, Jan. 7-17, 2020, Source: SZ DJI Technology Co., Ltd., Peking University, Title: On IBC/ATMVP candidate list construction.

JVET-T2002-v2, Joint Video Experts Team (JVET) of ITU-T SG 16 WP 3 and ISO/IEC JTC 1/SC 29 20th Meeting, by teleconference, Oct. 7-16, 2020, Source: Editors, Title: Algorithm description for Versatile Video Coding and Test Model 11 (VTM 11).

Nguyen, Tung, et al., "Overview of the Screen Content Support in VVC: Applications, Coding Tools, and Performance", Journal of Latex Class Files, vol. 14, No. 8, Aug. 2015, DOI 10.1109/TCSVT.2021.3074312, IEEE.

International Telecommunication Union (ITU-T) Telecommunication Standardization Sector of ITU H.266 (Aug. 2020), Series H: Audiovisual and Multimedia Systems Infrastructure of audiovisual services—Coding of moving video, Versatile video coding.

Jun Xu and Ali Tabatabai, Joint Collaborative Team on Video Coding (JCT-VC), Title: On intra block copying in RExt, Source: Sony Electronics, Oct. 23-Nov. 1, 2013.

Feb. 3, 2023—International Search Report—PCT/US2022/045388.

* cited by examiner

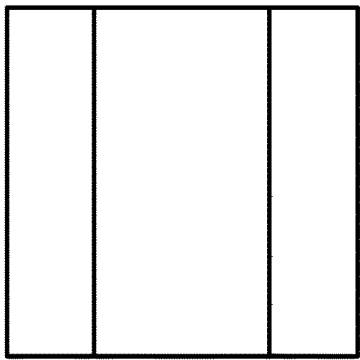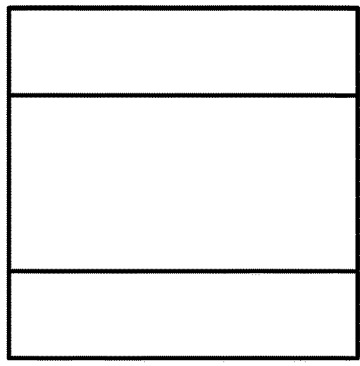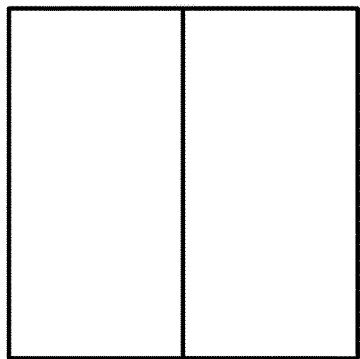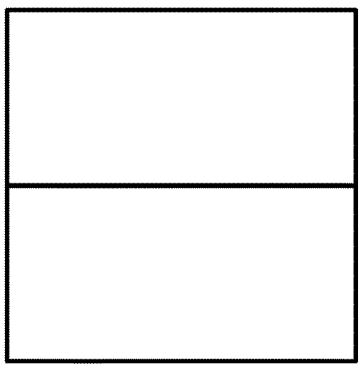
FIG. 6

Determine that: a sum, of a horizontal component of a block vector predictor (BVP) and a width (cbWidth) of a current block, is greater than zero; and a sum, of a vertical component of the BVP and a height (cbHeight) of the current block, is greater than zero
2502

Calculate: a first horizontal distance from the position of the reference block to a first vertical boundary of an intra block copy (IBC) reference region of the current block; and a first vertical distance from the position of the reference block to a first horizontal boundary of the IBC reference region of the current block
2504

Replace the BVP with an adjusted BVP based on a comparison between the first horizontal distance and the first vertical distance
2506

VIDEO COMPRESSION USING BLOCK VECTOR PREDICTOR REFINEMENT

CROSS-REFERENCE TO RELATED APPLICATIONS

This application is a continuation of U.S. application Ser. No. 17/957,193, filed on Sep. 30, 2022, which claims the benefit of U.S. Provisional Application No. 63/250,336, filed on Sep. 30, 2021 and also U.S. Provisional Application No. 63/316,312, filed on Mar. 3, 2022. Each of the above referenced applications is hereby incorporated by reference in its entirety.

BACKGROUND

A computing device processes video for storage, transmission, reception, and/or display. Processing a video comprises encoding and decoding, for example, to reduce a data size associated with the video.

SUMMARY

The following summary presents a simplified summary of certain features. The summary is not an extensive overview and is not intended to identify key or critical elements.

A video may comprise a sequence of frames displayed consecutively. Predictive encoding and decoding may involve the use of information associated with blocks, within a frame, to encode and/or decode other blocks in the same frame. For example, information associated with a block (e.g., luma and/or chroma components of the block) may be encoded using previously decoded information associated with a reference block in the same frame. The reference block may be indicated in the form of a block vector (BV) that represents the location of the reference block with respect to a current block being encoded or decoded. The BV itself may be indicated as a function of a block vector predictor (BVP) in order to reduce signaling overhead required for directly indicating the BV. An encoder and/or a decoder may determine one or more BVPs that are within a decoded region of the frame. For example, the encoder and/or a decoder may determine the one or more BVPs based on the dimensions of the current block and/or boundaries associated with the reference region. Determining a BVP in the decoded region may help to ensure that the BVP is a close prediction of the BV. A BVP that is a close prediction of the BV may provide additional advantages such as reduced signaling overhead required for indicating the BV.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6 shows example binary tree and ternary tree partitions.
FIG. 25 shows an example method for replacing a BVP with an adjusted BVP.

DETAILED DESCRIPTION

Figure 1:
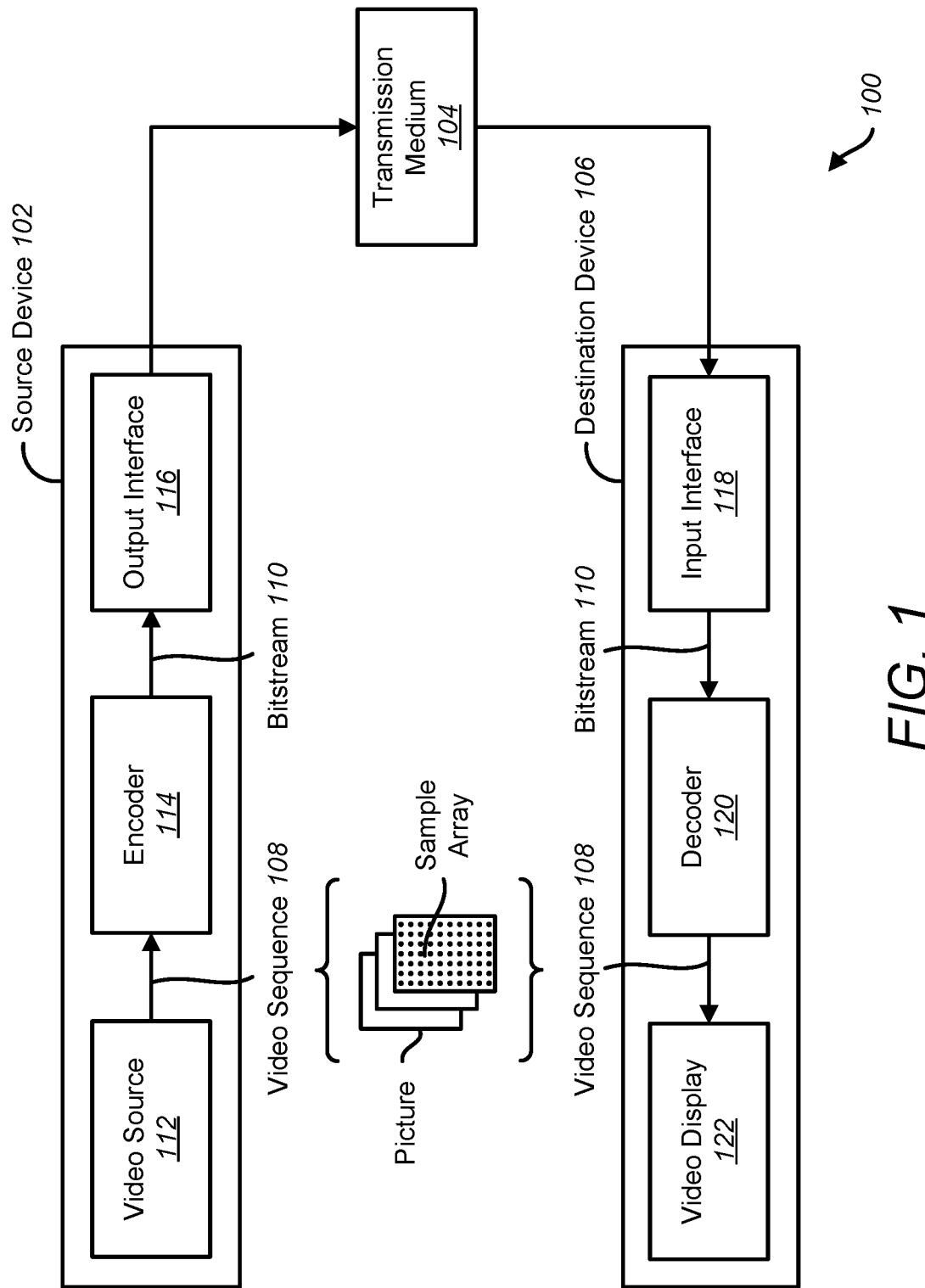
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays are possible based on different color schemes (e.g., a red, green, blue (RGB) color scheme). A pixel, in a color picture, may refer to/comprise/be associated with) all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of a video sequence.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks (e.g., prediction types, motion vectors, and prediction modes). The encoder 114 may perform one or more of quantization and entropy coding of the transform coefficients and/or the other information used to determine prediction blocks before forming the bitstream 110. Quantization and/or entropy coding may further reduce the quantity of bits needed to store and/or transmit video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via transmission medium 104. The output interface 116 may comprise a wired and/or wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one more networks (e.g., the internet) or file servers configured to store and/or send/transmit encoded video data.

The destination device 108 may decode the bitstream 110 into the video sequence 108 for display. The destination device 106 may comprise one or more of an input interface 118, a decoder 120, and/or a video display 122. The input interface 118 may be configured to read the bitstream 110 stored on transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 according to one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence. The decoder 120 may generate the prediction blocks using/based on prediction types, prediction modes, and/or motion vectors received in the bitstream 110. The decoder 120 may determine the prediction errors using transform coefficients received in the bitstream 110. The decoder 120 may determine the prediction errors by weighting transform basis functions using the transform coefficients. The decoder 120 may combine the prediction blocks and the prediction errors to decode the video sequence 108. A decoded video sequence at the destination device may be, or may not necessarily be, the same video sequence sent, such as the video sequence 108 as sent by the source device 102. For example, the decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate according to one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and/or AOMedia Video 1 (AV1)), and/or any other communication protocol.

Figure 2:
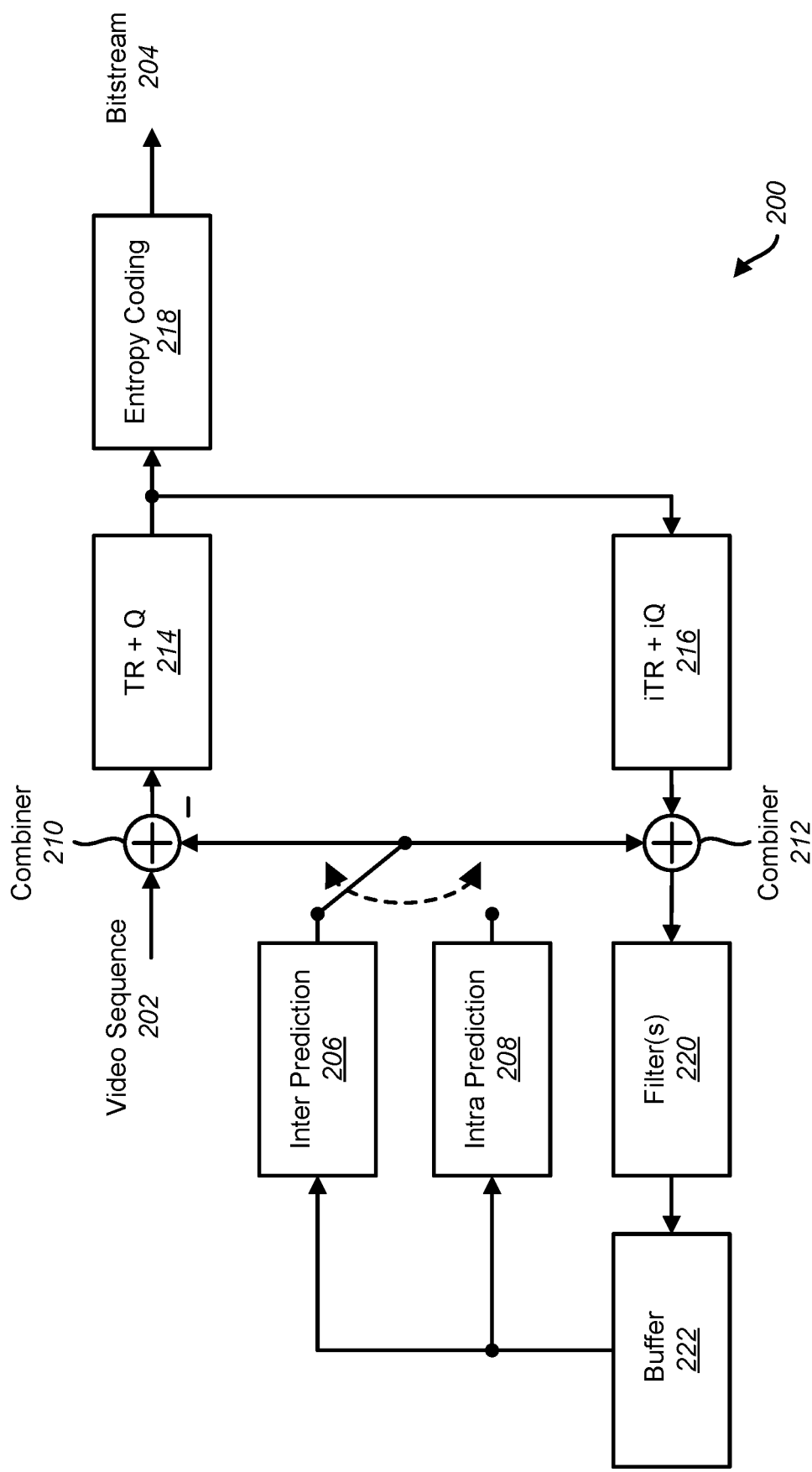
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) unit 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. A reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of video sequence 202 may be similar except for differences due to motion or affine transformation of the screen content over time.

The intra prediction unit 208 may perform intra prediction by forming a prediction block based on data from reconstructed neighboring samples of the block to be encoded within the same picture of the video sequence 202. A reconstructed sample may refer to a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of a video sequence.

The transform and quantization unit 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of video sequence 202.

The encoder 200 may further comprise an encoder control unit. The encoder control unit may be configured to control one or more of the units of encoder 200 shown in FIG. 2. The encoder control unit may control the one or more units of the encoder 200 such that the bitstream 204 may be generated in conformance with the requirements of one or more proprietary coding protcols, industry video coding standards, and/or any other communication protocol. For example, the encoder control unit may control the one or more units of the encoder 200 such that bitstream 204 is generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other communication protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/ control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and transform and/or quantization parameters may be packed with the prediction error to form bitstream 204.

The encoder 200 is merely an example and encoders different from the encoder 200 and/or modified versions of the encoder 200 may perform the methods and processes as described herein. For example, the encoder 200 may have other components and/or arrangements. One or more of the components shown in FIG. 2 may be optionally included in the encoder 200 (e.g, the entropy coding unit 218 and/or the filters(s) 220).

Figure 3:
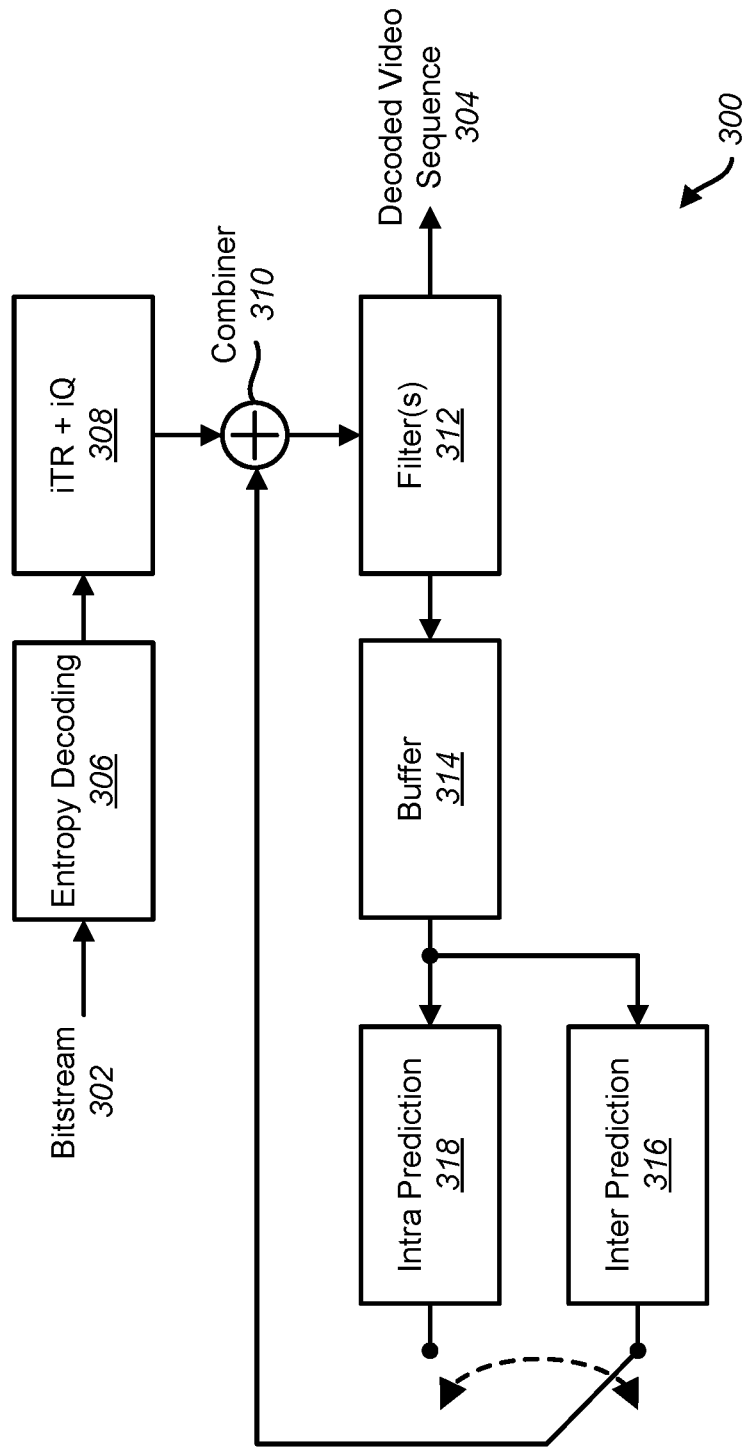
FIG. 3 shows an example decoder.

FIG. 3 shows an example decoder. A decoder 300 as shown in FIG. 3 may implement one or more processes described herein. The decoder 300 may decode a bitstream 302 into a decoded video sequence for display and/or some other form of consumption. The decoder 300 may be implemented in the video coding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+ iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the inter prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

Decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2"×2" samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
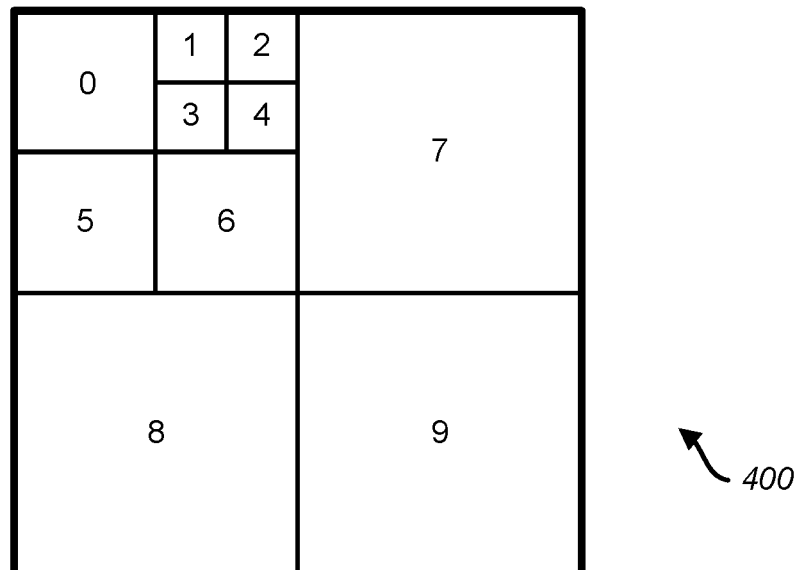
FIG. 4 shows an example quadtree partitioning of a coding tree block (CTB).
Figure 5:
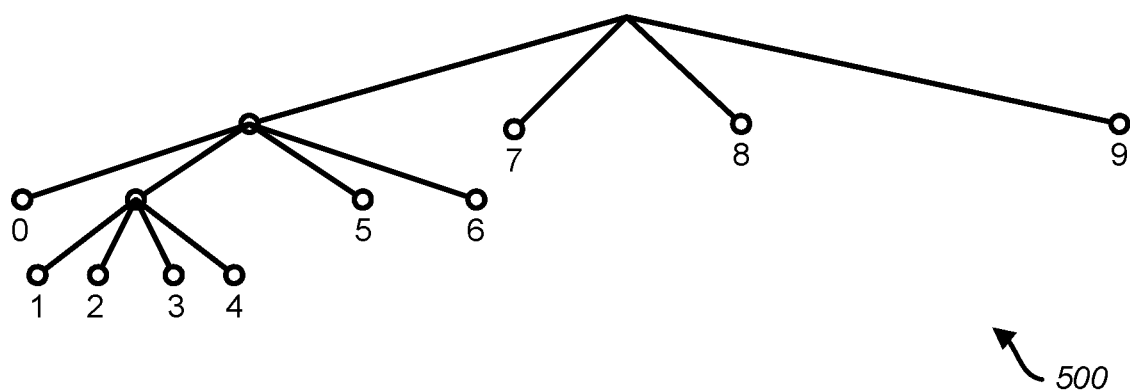
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either the vertical direction 606 or horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as quadtree+multi-type tree partitioning because of the addition of binary and/or ternary tree partitioning to quadtree partitioning.

Figure 7:
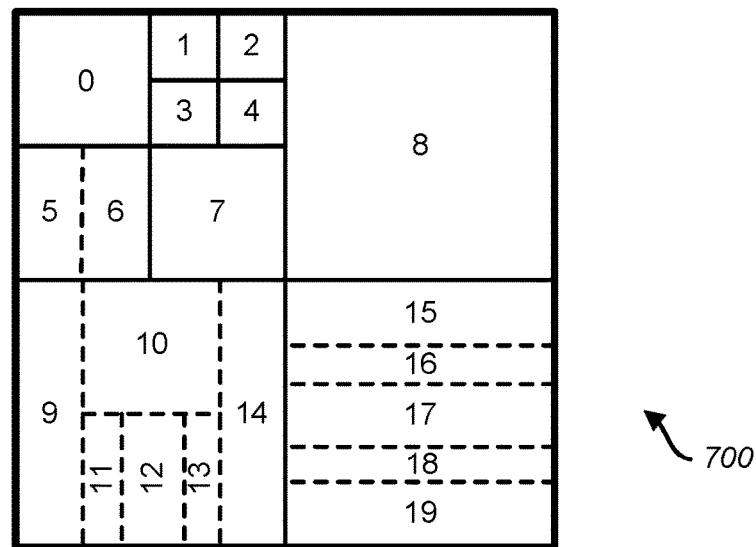
FIG. 7 shows an example of combined quadtree and multi-type tree partitioning of a CTB.
Figure 8:
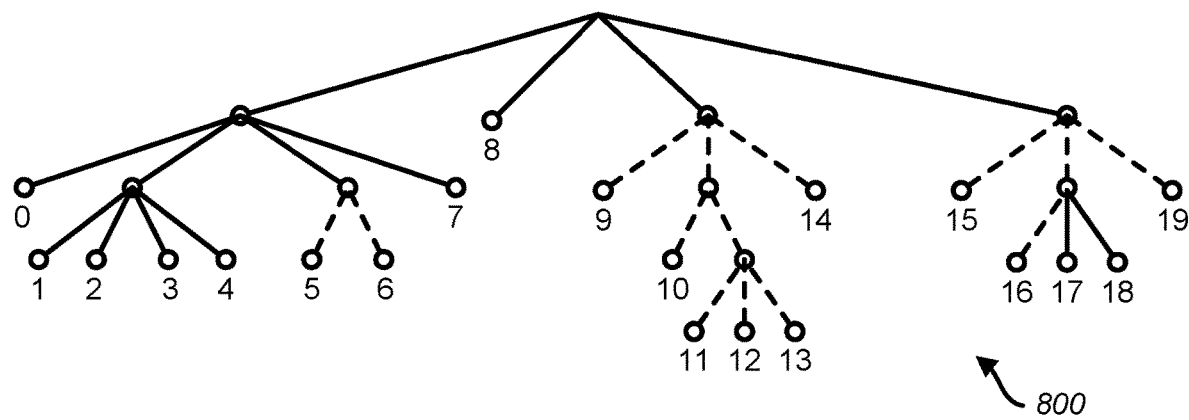
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and ternary tree partitions.

Leaf CB 5 of FIG. 4 may be partitioned into two CBs based on a vertical binary tree partitioning. The two resulting CBs may be leaf CBs respectively labeled 5 and 6 in FIGS. 7 and 8. Leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. Leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, CTB 700 may be partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other of coding standard/format) may define various units (e.g., in addition to specifying various blocks (e.g., CTBs, CBs, PBs, TBs). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or sub-block in the VP8 coding format, a superblock or sub-block in the VP9 coding format, or a superblock or sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining predicted samples with a prediction error.

Figure 9:
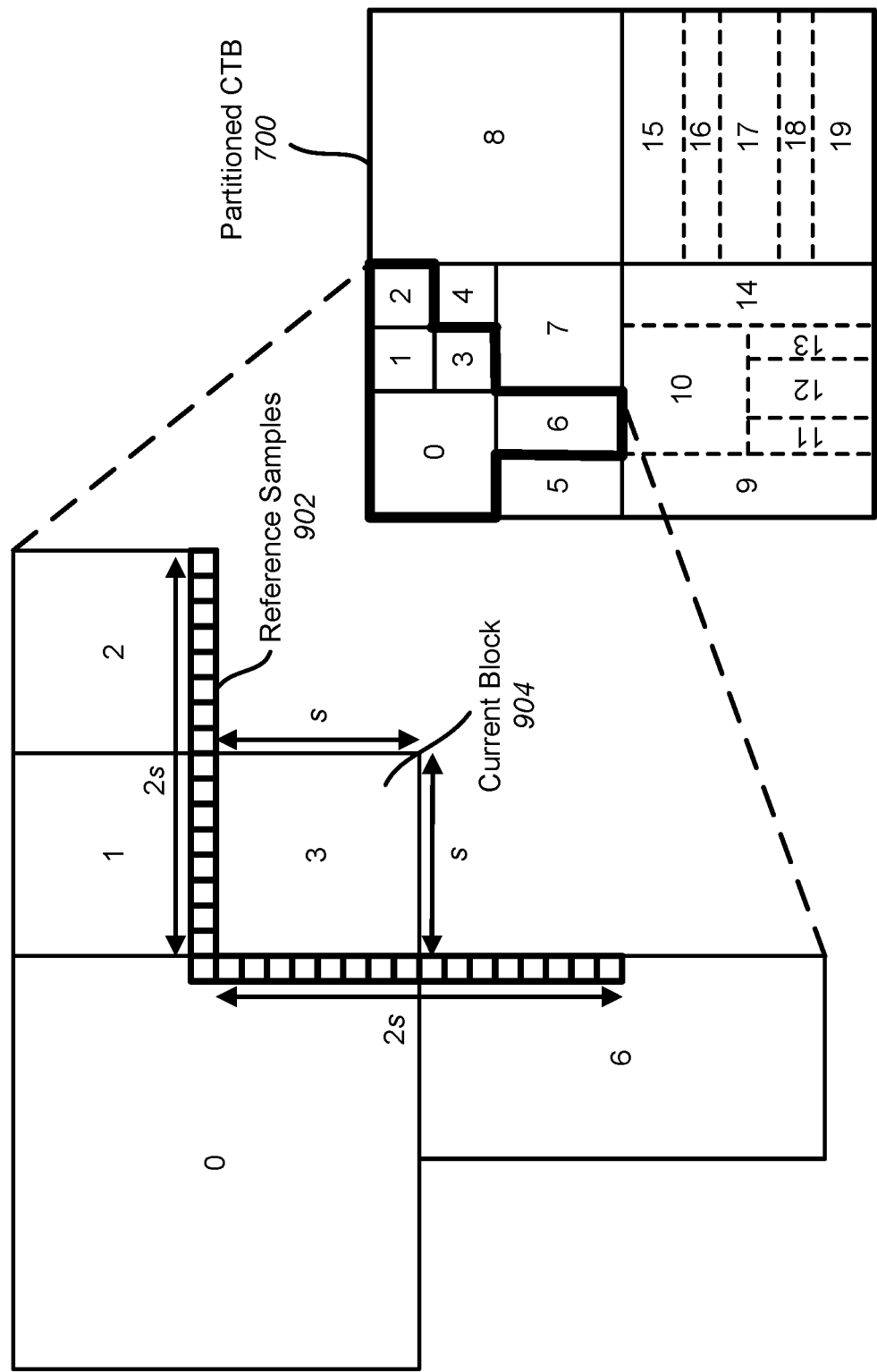
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2h samples (or any other quantity of samples) of the column immediately adjacent to the left-most column of the current block 904, and the top left neighboring corner sample to current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples may allow identical prediction results to be determined at both the encoder and decoder. Samples from neighboring blocks 0, 1, and 2 may be available to construct reference samples 902 given that these blocks are encoded and reconstructed at an encoder and decoded at a decoder prior to coding of current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from the neighboring block 6 may not be available due to the sequence order for encoding/decoding (e.g., because block 6 may not have already been encoded and reconstructed at the encoder and/or decoded at the decoder based on the sequence order for encoding/decoding).

Unavailable samples from the reference samples 902 may be filled with one or more of available reference samples 902. For example, an unavailable reference sample may be filled with a nearest available reference sample. The nearest available reference sample may be determined by moving in a clock-wise direction through reference samples 902 from the position of the unavailable reference. Reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
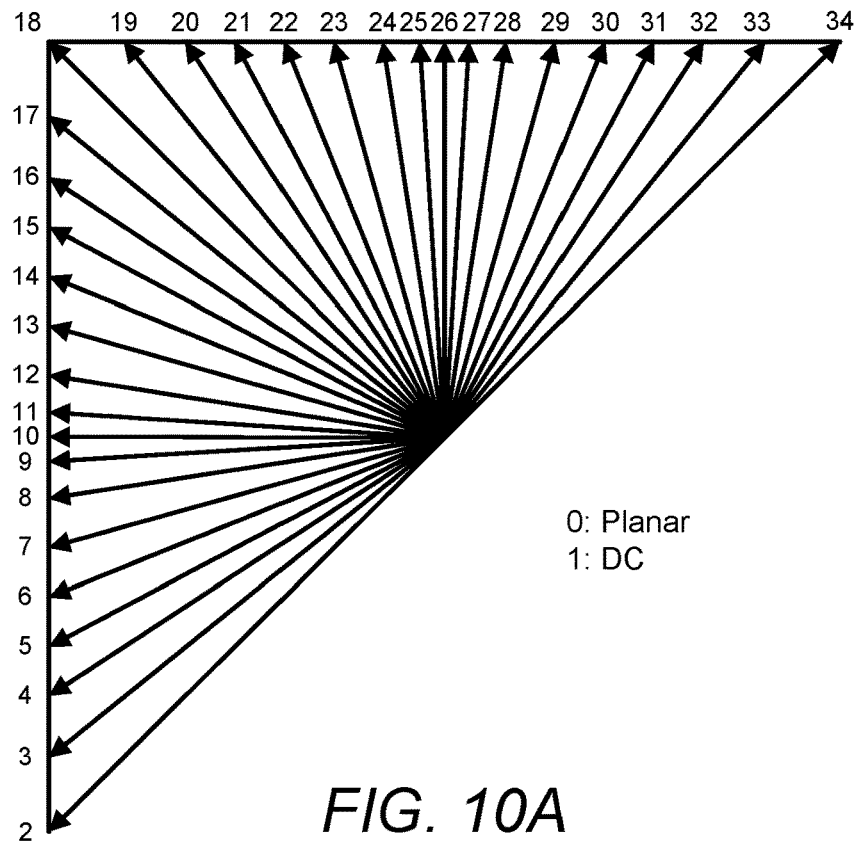
FIGS. 10A and 10B show example intra prediction modes.
Figure 10B:
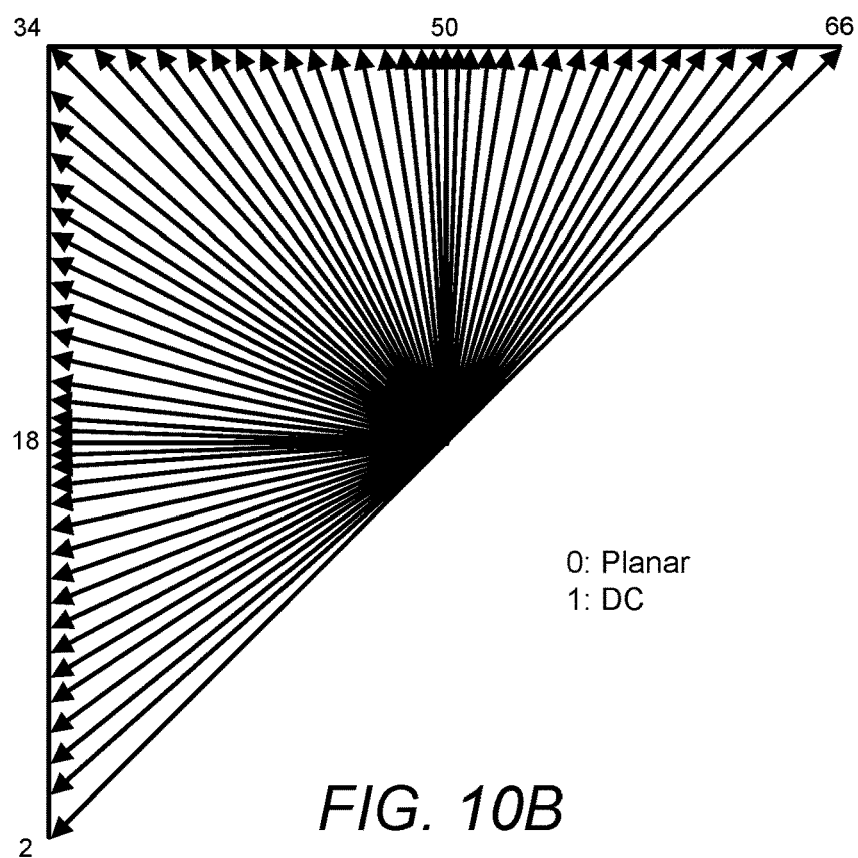

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
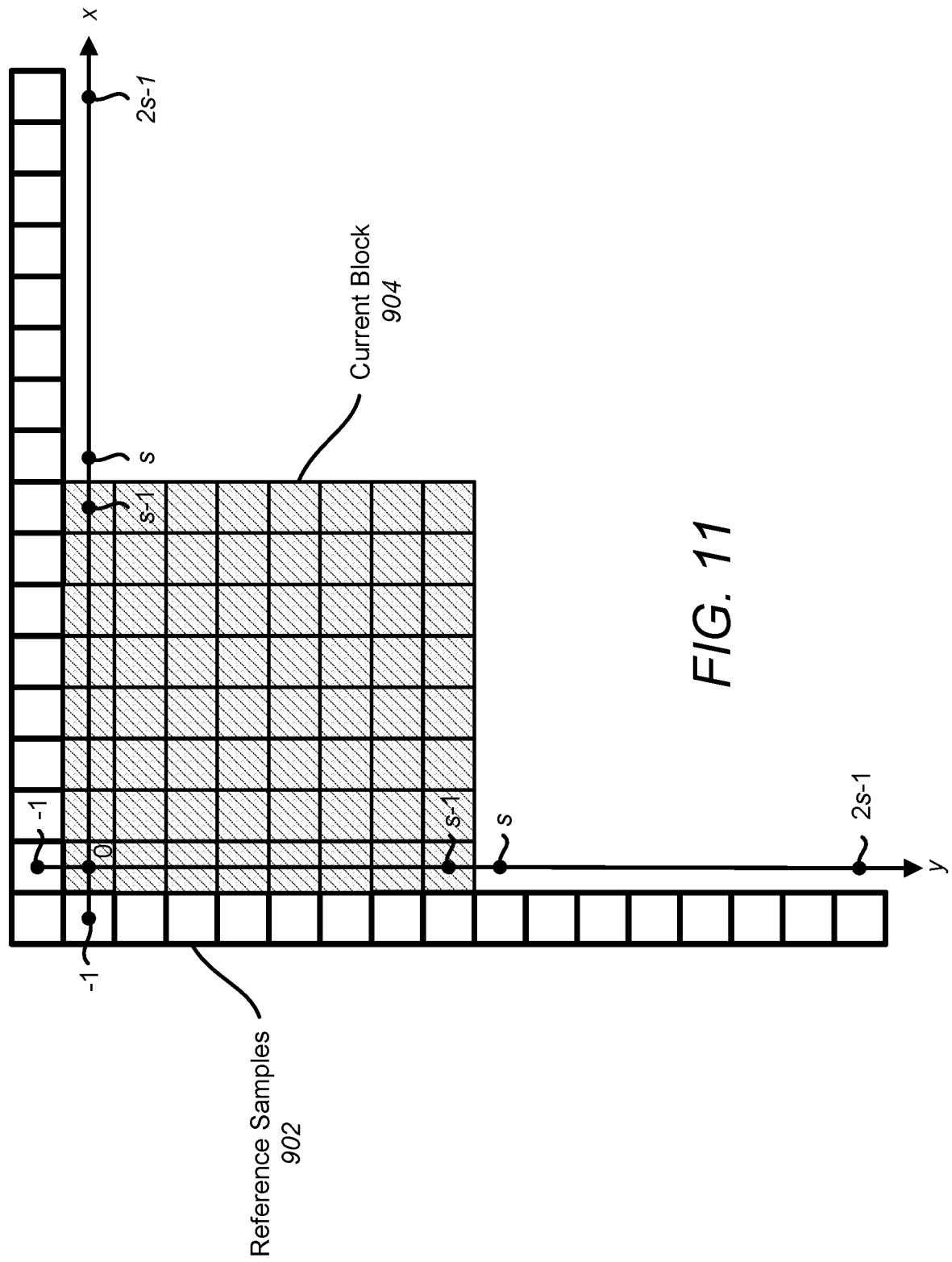
FIG. 11 shows a current block and corresponding reference samples.

FIG. 11 shows a current block and corresponding reference samples. In FIG. 11, a current block 904 and reference samples 902 from FIG. 9 are shown in a two-dimensional x, y plane, where a sample may be referenced as p[x][y]. In order to simplify the prediction process, the reference samples 902 may be placed in two, one-dimensional arrays.

The reference samples 902, above the current block 904, may be placed in the one-dimensional array $ref_1[x]$:

$$ref_1[x]=p[-1+x][-1], (x\geq 0) \quad (1)$$

Reference samples 902 to the left of current block 904 may be placed in the one-dimensional array $ref_2[y]$:

$$ref_2[y]=p[-1][-1+y], (y\geq 0) \quad (2)$$

The prediction process may comprise determination of a predicted sample p[x][y] (e.g., a predicted value) at a location [x][y] in the current block 904. For planar mode, a sample at location [x][y] in the current block 904 may be predicted by determining/calculating the mean of two interpolated values. The first of the two interpolated values may be based on a horizontal linear interpolation at location [x][y] in the current block 904. The second of the two interpolated values may be based on a vertical linear interpolation at location [x][y] in current block 904. The predicted sample p[x][y] in current block 904 may be determined/calculated as:

$$p[x][y] = \frac{1}{2 \cdot s}(h[x][y] + v[x][y] + s) \quad (3)$$

where $$h[x][y]=(s-x-1)\cdot ref_2[y]+(x+1)\cdot ref_1[s] \quad (4)$$

may be the horizontal linear interpolation at location [x][y] in current block 904 and $$v[x][y]=(s-y-1)\cdot ref_1[x]+(y+1)\cdot ref_2[s] \quad (5)$$

may be the vertical linear interpolation at location [x][y] in current block 904. s may be equal to a length of a side (e.g., a number of samples on a side) of the current block 904.

A sample at location [x][y] in the current block 904 may be predicted by the mean of the reference samples 902, such as for a DC mode. The predicted sample p[x][y] in current block 904 may be determined/calculated as $$p[x][y] = \frac{1}{2 \cdot s}\left(\sum_{x=0}^{s-1} ref_1[x] + \sum_{y=0}^{s-1} ref_2[y]\right) \quad (6)$$

A sample at location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
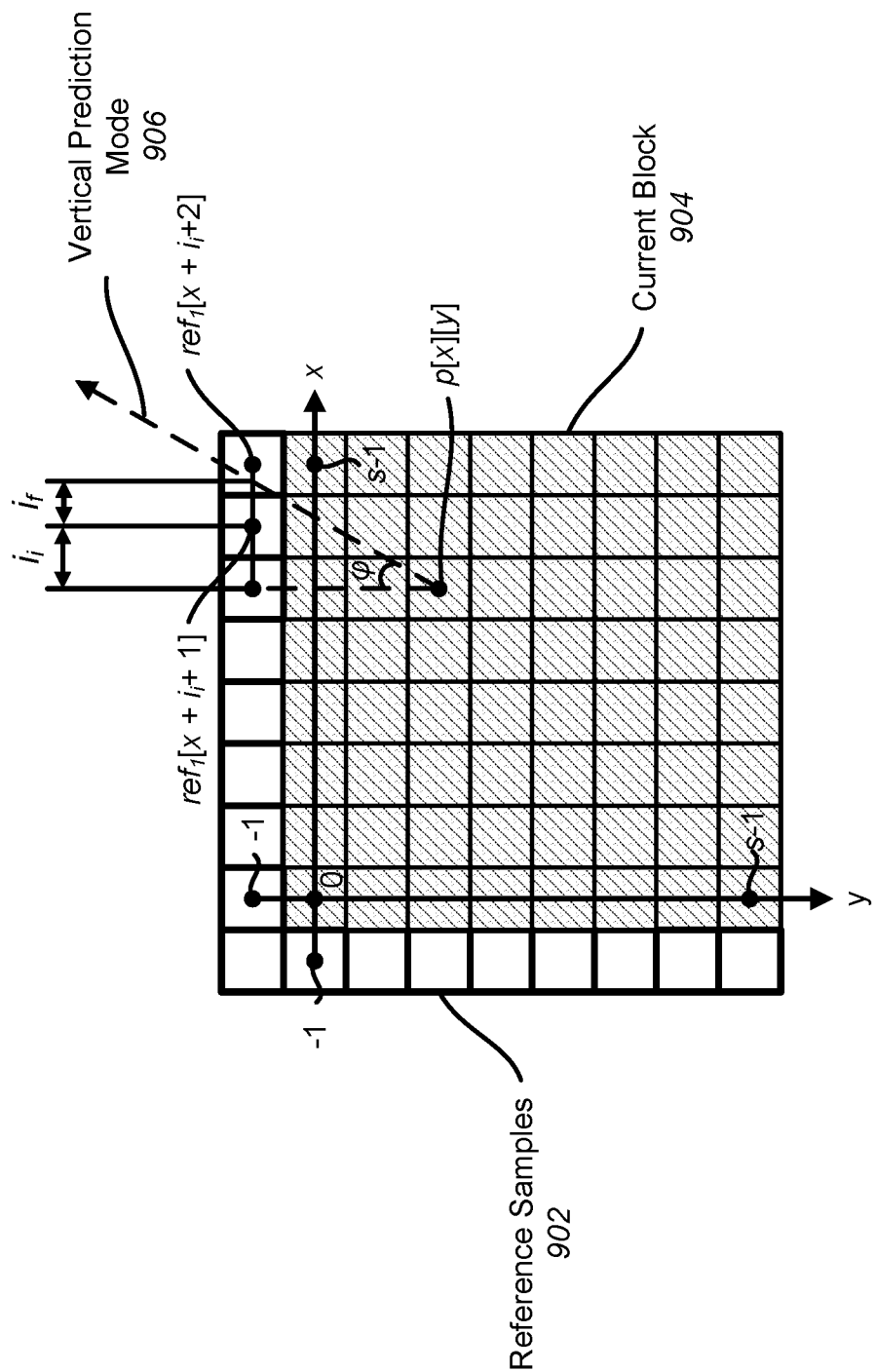
FIG. 12 shows application of an intra prediction mode for prediction of a current block.

FIG. 12 shows application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to a vertical axis. The location [x][y] in the current block 904, in vertical projection modes, may be projected to a point (e.g., a projection point) on the horizontal line of reference samples $ref_1[x]$. The reference samples 902 are only partially shown in FIG. 12 for ease of illustration. As seen in FIG. 12, the projection point on the horizontal line of reference samples $ref_1[x]$ may not be exactly on a reference sample, The predicted sample p[x][y] in the current block 904 may be determined/calculated by linearly interpolating between the two reference samples, for example, if the projection point falls at a fractional sample position between two reference samples. A predicted sample p[x][y] may be determined as:

$$p[x][y]=(1-i_f)\cdot ref_1[x+i_i+1]+i_f\cdot ref_1[x+i_i+2]. \quad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i=\lfloor (y+1)\cdot \tan \varphi \rfloor \quad (8)$$

$i_f$ may be the fractional part of the horizontal displacement of the projection point relative to the location [x][y] and may be determined/calculated as $$i_f=((y+1)\cdot \tan \varphi)-\lfloor (y+1)\cdot \tan \varphi \rfloor \quad (9)$$

where $\lfloor \cdot \rfloor$ is the integer floor function.

The position [x][y] of a sample in the current block 904 may be projected onto the vertical line of reference samples $ref_2[y]$, such as for horizontal prediction modes. A predicted sample p[x][y] for horizontal prediction modes may be determined/calculated as:

$$p[x][y]=(1-i_f)\cdot ref_2[y+i_i+1]+i_f\cdot ref_2[y+i_i+2]. \quad (10)$$

$i_i$ may be the integer part of the vertical displacement of the projection point relative to the location [x][y]. i may be determined/calculated as a function of the tangent of the angle φ of the horizontal prediction mode as:

$$i_i=\lfloor (x+1)\cdot \tan \varphi \rfloor. \quad (11)$$

$i_f$ may be the fractional part of the vertical displacement of the projection point relative to the location [x][y]. $i_f$ may be determined/calculated as $$i_f=(x+1)\cdot \tan \varphi-\lfloor (x+1)\cdot \tan \varphi \rfloor, \quad (12)$$

where $\lfloor \cdot \rfloor$ is the integer floor.

The interpolation functions given by Equations (7) and (10) may be implemented by an encoder and/or decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y] = \sum_{i=0}^{3} fT[i]\cdot ref_1[x+ildx+i] \quad (13)$$

where fT[i], i=0 . . . 3, may be the filter coefficients, and Idx is integer displacement. The predicted sample p[x][y], for horizontal prediction modes, may be determined based on the four-tap FIR filter as:

$$p[x][y] = \sum_{i=0}^{3} fT[i]\cdot ref_2[y+ildx+i]. \quad (14)$$

Supplementary reference samples may be determined/constructed if the position [x][y] of a sample in the current block 904 to be predicted is projected to a negative x coordinate. The position [x][y] of a sample may be projected to a negative x coordinate, for example, if negative vertical prediction angles o are used. The supplementary reference samples may be determined/constructed by projecting the reference samples in $ref_2[y]$ in the vertical line of reference samples 902 to the horizontal line of reference samples 902 using the negative vertical prediction angle φ Supplementary reference samples may be similarly determined, for example, if the position [x][y] of a sample in the current block 904 to be predicted is projected to a negative y coordinate. The position [x][y] of a sample may be projected to a negative y coordinate, for example, if negative horizontal prediction angles φ are used. The supplementary reference samples may be determined/constructed by projecting the reference samples in $ref_1[x]$ on the horizontal line of reference samples 902 to the vertical line of reference samples 902 using the negative horizontal prediction angle φ.

An encoder may determine/predict the samples of a current block being encoded (e.g., the current block 904) for a plurality of intra prediction modes (e.g., using one or more of the functions described herein). For example, the encoder may predict the samples of the current block for each of the 35 intra prediction modes in HEVC or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may select an intra prediction mode that results in the smallest prediction error for the current block. The encoder may select the intra prediction mode to encode the current block based on a rate-distortion measure (e.g., Lagrangian rate-distortion cost) determined using the prediction errors. The encoder may send an indication of the selected intra prediction mode and its corresponding prediction error (e.g., residual) to a decoder for decoding of the current block.

A decoder may determine/predict the samples of a current block being decoded (e.g., the current block 904) for an intra prediction mode. For example, the decoder may receive an indication of a prediction mode (e.g., an angular intra prediction mode) from an encoder for a block. The decoder may construct a set of reference samples and perform intra prediction based on the prediction mode indicated by the encoder for the block in a similar manner (e.g., as described above for the encoder). The decoder would add predicted values of the samples (e.g., determined based on intra prediction) of the block to a residual of the block to reconstruct the block. The decoder need not receive an indication of an angular intra prediction mode from an encoder for a block. The decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of the video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of an object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for the current block. An encoder may determine the difference, for example, based on/after determining/generating a prediction for the current block (e.g., using inter prediction). The difference may be referred to as a prediction error and/or as a residual. The encoder may then store and/or send (e.g., signal), in/via a bitstream, the prediction error and/or other related prediction information. The prediction error and/or other related prediction information may be used for decoding or other forms of consumption. A decoder may decode the current block by predicting the samples of the current block (e.g., by using the related prediction information) and combining the predicted samples with the prediction error.

Figure 13A:
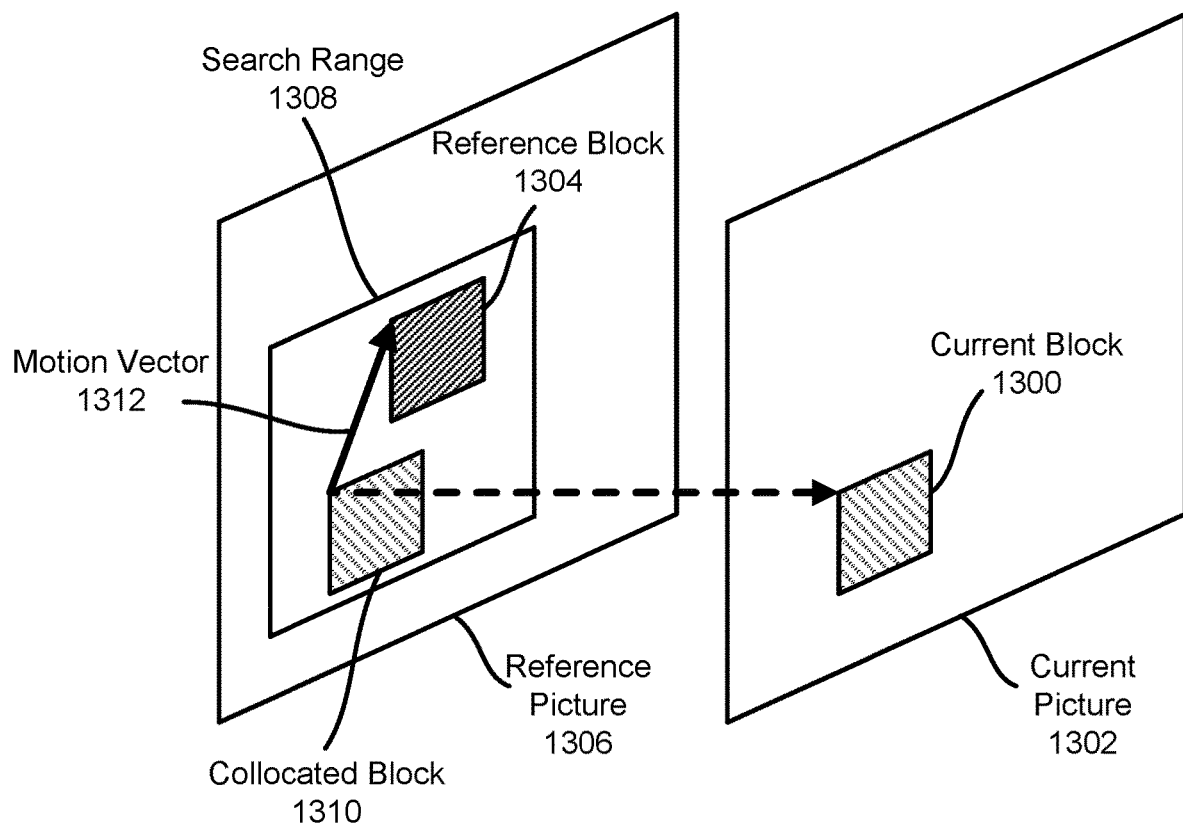
FIG. 13A shows an example of inter prediction.

FIG. 13A shows an example of inter prediction. The inter prediction may be performed for a current block 1300 in a current picture 1302 being encoded. An encoder (e.g., encoder 200 as shown in FIG. 2) may perform inter prediction to determine and/or generate a reference block 1304 in a reference picture 1306. The reference block 1304 may be used to predict a current block 1300. Reference pictures (e.g., the reference picture 1306) may be prior decoded pictures available at the encoder and decoder. Availability of a prior decoded picture may depend/be based on whether the prior decoded picture is available in a decoded picture buffer at the time current block 1300 is being encoded or decoded. The encoder may search one or more reference pictures for a reference block that is similar (or substantially similar) to current block 1300. The encoder may determine a best matching reference block from the blocks tested during the searching process. The best matching reference block may be the reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and the original samples of current block 1300.

The encoder may search for the reference block 1304 within a reference region 1308. The reference region 1308 may be positioned around a collocated position (or block) 1310, of current block 1300, in the reference picture 1306. The collocated block 1310 may have a same position in the reference picture 1306 as the current block 1300 in the current picture 1302. The reference region 1308 may be referred to as a search range. The reference region 1308 may at least partially extend outside of the reference picture 1306. Constant boundary extension may be used, for example, if the reference region 1308 extends outside of the reference picture 1306. The constant boundary extension may be used such that values of the samples in a row or a column of reference picture 1306, immediately adjacent to a portion of the reference region 1308 extending outside of the reference picture 1306, may be used for sample locations outside of the reference picture 1306. A subset of potential positions, or all potential positions, within the reference region 1308 may be searched for the reference block 1304. The encoder may utilize one or more search implementations to determine and/or generate the reference block 1304. For example, the encoder may determine a set of a candidate search positions based on motion information of neighboring blocks to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising reference picture 1306.

Figure 13B:
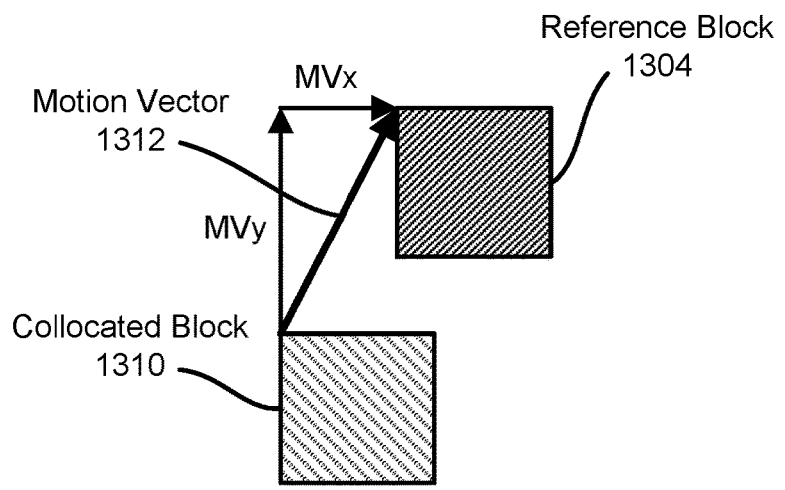
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component ($MV_x$) and a vertical component ($MV_y$) relative to the position of current block 1300. A motion vector (e.g., the motion vector 1312) may have fractional or integer resolution. A motion vector with fractional resolution may point between two samples in a reference picture to provide a better estimation of the motion of current block 1300. For example, a motion vector may have 1/2, 1/4, 1/8, 1/16, 1/32, or any other fractional sample resolution. Interpolation between samples at integer positions may be used to generate the reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be referred to as a prediction error and/or a residual. The encoder may store and/or send (e.g., signal), in/via a bitstream, the prediction error and/or related motion information. The prediction error and/or related motion information may be used for decoding (e.g., decoding the current block 1300) and/or fr other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as the source of the prediction for current block 1300. Inter prediction based on a prediction of a current block using a single picture may be referred to as uni-prediction.

Figure 14:
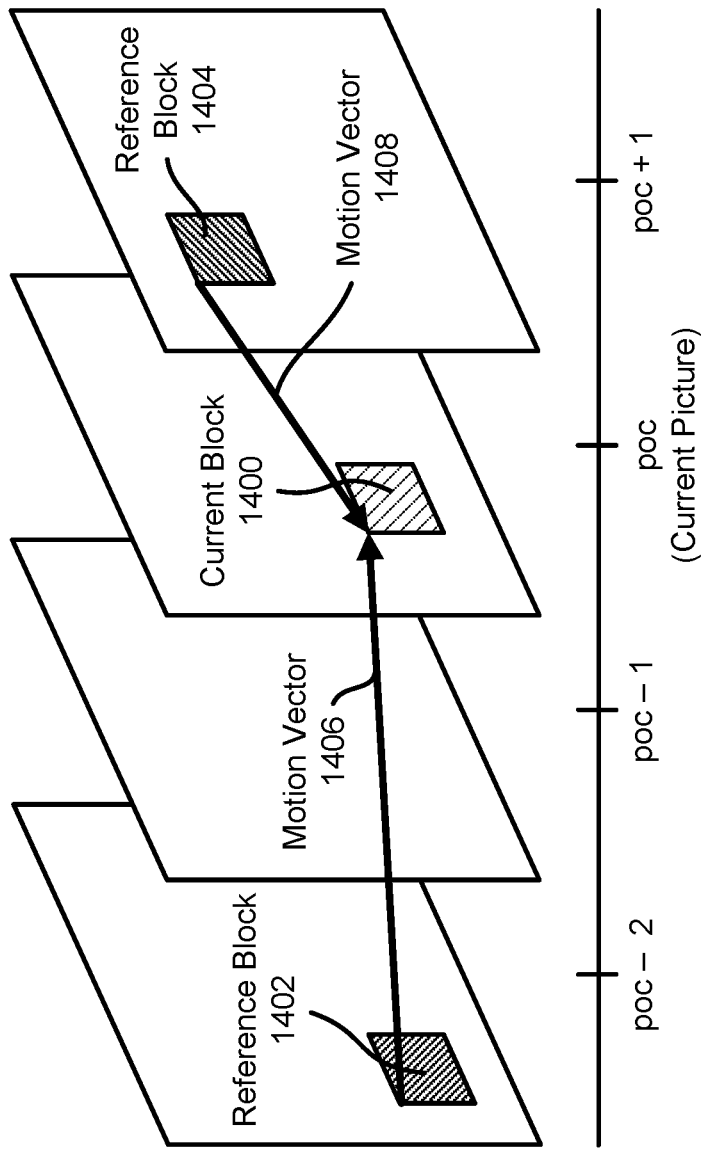
FIG. 14 shows an example of bi-prediction.

FIG. 14 shows an example of bi-prediction. Prediction, for a current block 1400, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uniprediction and/or bi-prediction) may depend on a slice type of current block 1400. For example, for P slices, only uni-prediction may be available/used for performing inter prediction. For B slices, either uni-prediction or bi-prediction may be used for performing inter prediction. An encoder may determine and/or generate a reference block, for predicting a current block 1400, from reference picture list 0, for example, if the encoder is using uni-prediction. An encoder may determine and/or generate a first reference block for predicting a current block 1400 from a reference picture list 0 and determine and/or generate a second reference block for predicting the current block 1400 from a reference picture list 1, for example, if the encoder is using bi-prediction.

FIG. 14 shows an example of inter-prediction performed using bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, reference block 1402 may be in a first picture that precedes (e.g., in time) the current picture of current block 1400, and reference block 1402 may be in a second picture that succeeds (e.g., in time) the current picture of current block 1400. The first picture may precede the current picture in terms of a picture order count (POC). The second picture may succeed the current picture in terms of the POC. The reference pictures may both precede or both succeed the current picture in terms of POC. POC may be/indicate an order in which pictures are output (e.g., from a decoded picture buffer). The POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to the one or more inter prediction reference blocks. An encoder may enable the use of weighted prediction using a flag in a picture parameter set (PPS). The encoder may send/signal the weighting and/or offset parameters in a slice segment header for the current block 1400. Different weight and/or offset parameters may be signaled for luma and chroma components.

The encoder may determine and/or generate the reference blocks 1402 and 1404 for the current block 1400 using inter prediction. The encoder may determine a difference between the current block 1400 and each of reference blocks 1402 and 1404. The differences may be referred to as prediction errors or residuals. The encoder may store and/or send/signal, in/via a bitstream, the prediction errors and their respective related motion information. The prediction errors and their respective related motion information may be used for decoding or other forms of consumption. The motion information for the reference block 1402 may comprise a motion vector 1406 and a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the respective motion information for the reference blocks 1402 and 1404. The reference blocks 1402 and 1404 may correspond to/form (e.g., be considered as) the predictions of the current block 1400. The decoder may decode the current block based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same (or similar to) the motion of objects in the neighboring blocks. Motion information prediction techniques may comprise advanced motion vector prediction (AMVP) and inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component ($MV_x$) and a vertical component ($MV_y$)) relative to a position of the current block being coded, the MVD may be represented by two components $MVD_x$ and $MVD_y$. $MVD_x$ and $MVD_y$ may be determined/calculated as:

$$MVD_x = MV_x - MVP_x \quad (15)$$

$$MVD_y = MV_y - MVP_y \quad (16)$$

$MVD_x$ and $MVD_y$ may respectively represent horizontal and vertical components of the MVD. $MVP_x$ and $MVP_y$ may respectively represent the horizontal and vertical components of the MVP. A decoder (e.g., the decoder 300 as shown in FIG. 3) may decode the motion vector by adding the MVD to the MVP indicated in the bitstream. The decoder may decode the current block by determining and/or generating the reference block. The decoder may determine and/or generate the reference block, for example, based on the decoded motion vector. The reference block may correspond to/form (e.g., be considered as) a prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two spatial candidate MVPs determined/derived from five spatial neighboring blocks of the current block being coded; one temporal candidate MVP determined/derived from two temporal, co-located blocks (e.g., if both of the two spatial candidate MVPs are not available or are identical); or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
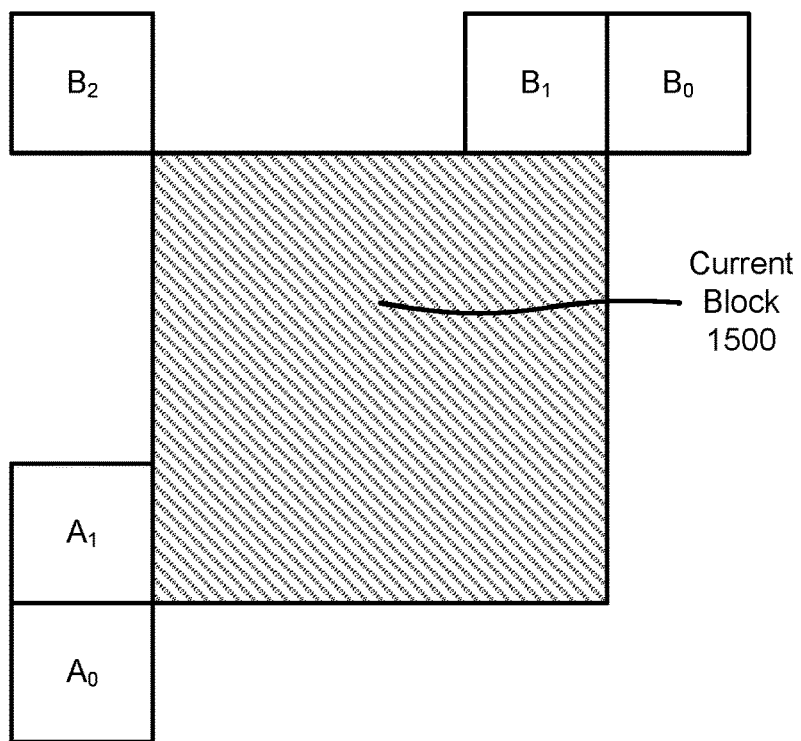
FIG. 15A shows example spatial candidate neighboring blocks for a current block.
Figure 15B:
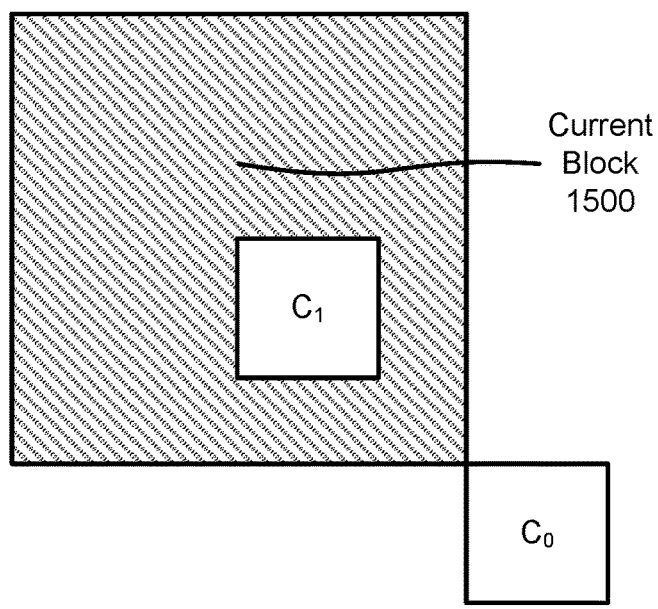
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be $A_0, A_1, B_0, B_1,$ and $B_2$. FIG. 15B shows temporal, co-located blocks for the current block. For example, two (or any other quantity of) temporal, co-located blocks may be located relative to the current block 1500. The two temporal, co-located blocks may be $C_0$ and $C_1$. The two temporal, co-located blocks may be in one or more reference pictures that may be different from the current picture of current block 1500.

An encoder (e.g., the encoder 200 as shown in FIG. 2) may code a motion vector using inter prediction block merging (e.g., a merge mode). The encoder (e.g., using merge mode) may reuse a same motion information of a neighboring block (e.g., one of neighboring blocks $A_0, A_1, B_0, B_1,$ and $B_2$) for inter prediction of a current block. The encoder (e.g., using merge mode) may reuse a same motion information of a temporal, co-located block (e.g., one of temporal, co-located blocks $C_0$ and $C_1$) for inter prediction of a current block. An MVD need not be sent (e.g., indicated, signaled) for the current block because the same motion information as that of a neighboring block or a temporal, co-located block may be used for the current block (e.g., at the encoder and/or decoder). A signaling overhead for sending/signaling the motion information of the current block may be reduced because the MVD need not be indicated for the current block. The encoder and/or the decoder (e.g., both the encoder and decoder) may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting a motion information of the current block being coded. The encoder may signal/send, in/via the bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding format/standard/protocol) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than the current block being encoded. Block matching may also be used to determine a reference block in a same picture as that of a current block being encoded. A reference block, in a same picture as the current block, as determined using block matching may often not accurately predict the current block (e.g., for camera captured videos). Prediction accuracy for screen video content may not be similarly impacted, for example, if a reference block in the same picture as the current block is used for encoding. Screen content video may comprise, for example, computer generated text, graphics, animation, etc. Screen video content may comprise (e.g., may often comprise) repeated patterns (e.g., repeated patterns of text and graphics) within the same picture. Using a reference block (e.g., as determined using block matching), in a same picture as a current block being encoded, may provide efficient compression for screen content video.

A prediction technique may be used (e.g., in HEVC, VVC, and/or any other coding standard/format/protocol) to exploit correlation between blocks of samples within a same picture (e.g., of a screen content video). The prediction technique may be referred to as intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

Figure 16:
FIG. 16 shows an example of intra block copy (IBC) for encoding.

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be referred to as a prediction error or residual. The encoder may store and/or send/signal, in/via a bitstream the prediction error and/or the related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standard/format/protocol) before being stored and/or sent/signaled in/via a bit stream. The BV for a current block may be predictively coded based on the BV blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., encoder 200 as shown in FIG. 2) performing BV prediction and coding may code a BV as a difference between the BV of a current block being coded and a BV predictor (BVP). An encoder may select/determine the BVP from a list of candidate BVPs. The candidate BVPs may comprise/correspond to previously decoded BVs of blocks neighboring the current block in the current picture. The encoder and/or decoder may generate or determine the list of candidate BVPs.

The encoder may send/signal, in/via a bitstream, an indication of the selected BVP and a BV difference (BVD). The encoder may indicate the selected BVP in the bitstream using an index/indicator. The index may indicate the selected BVP in the list of candidate BVPs. The BVD may be determined/calculated based on a difference between the BV of the current block and the selected BVP. For example, for a BV represented by a horizontal component ($BV_x$) and a vertical component ($BV_y$) relative to a position of the current block being coded, the BVD may represented by two components $BVD_x$ and $BVD_y$. $BVD_x$ and $BVD_y$ may be determined/calculated as:

$$BVD_x = BV_x - BVP_x \qquad (17)$$

$$BVD_y = BV_y - BVP_y \qquad (18)$$

$BVD_x$ and $BVD_y$ may respectively represent horizontal and vertical components of the BVD. $BVP_x$ and $BVP_y$ may respectively represent the horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) a prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for for coding motion vectors in inter prediction (e.g., as shown in FIG. 15A). For example, five spatial candidate neighboring blocks for IBC may be respectively denoted $A_0$, $A_1$, $B_0$, $B_1$, and $B_2$.

In at least some encoders and/or decoders, a BV for a current block (e.g., coded using IBC) may be constrained to indicate a relative displacement from the current block to a reference block within a reference region (e.g., an IBC reference region). The reference region may correspond to at least a portion of a region, in a current picture of the current block, that has been previously encoded (e.g., at an encoder) and subsequently decoded (e.g., at a decoder). Constraining the reference block to be within the reference region may ensure that encoding and decoding systems may produce identical results when processing the current block. A BVP used to predictively code a BV may not be similarly constrained within the reference region. A BVP may not be similarly constrained because a BVP may be determined/derived based on a BV of a spatially neighboring block of the current block and/or a prior coded (e.g., history based) BV. A BVP may not accurately predict the BV because the BVP may not be constrained, like the BV (e.g., to indicate a relative displacement from a current block to a reference block), within an IBC reference region. For example, the BVP may not be a close estimate of the BV. Inaccurate prediction of the BV using the unconstrained BVP may cause one or more issues such as potentially increasing signaling overhead for (e.g., a quantity of bits needed to) indicating a BVD between the BV and the BVP.

Various examples described herein provide improvements for BVP, such as by adjusting a BVP to provide a more accurate prediction of a BV (e.g., determined using an IBC procedure). A device (e.g., an encoder, a source device, a computing device, etc.) may adjust the BVP based on one or more criteria. The one or more criteria may be based on a position, indicated by the BVP, relative to a location of a current block being encoded. The one or more criteria may comprise determining whether the position is within the reference region (e.g., IBC reference region). The one or more criteria may comprise determining whether the position is at least one or more offsets away, from the current block, in one or more predetermined directions. The one or more criteria may be based on dimensions of a current block being encoded. The one or more criteria may be based on a position, indicated by the BVP, relative to one or more boundaries of the reference region. The encoder may use an adjusted BVP based on the one or more criteria being satisfied or not satisfied. For example, the encoder may replace the BVP (e.g., as present in a list) with an adjusted BVP. Using the adjusted BVP and/or replacing the BVP with the adjusted BVP may provide advantages such as reduced signaling overhead needed for sending an encoded video. For example, a quantity of bits needed to represent a BVD for a block may be reduced if the BVP is replaced by the adjusted BVP.

An encoder may determine that the BVP points to/indicates a position, relative to the position of the current block, that is neither to the left of the current block by at least a first offset nor above the current block by at least a second offset. The first offset may be equal to a width of the current block. The second offset may be equal to a height of the current block. The encoder may determine that the BVP points to a position outside a reference region (e.g., an IBC reference region) for the current block, for example, if the BVP points to a position, relative to the position of the current block, that is neither at least the first offset distance to the left from the current block nor at least the second offset distance above the current block. An encoder may use an adjusted BVP, for example, based on the BVP pointing outside the reference region. An encoder may replace the BVP with an adjusted BVP, for example, based on the BVP pointing outside the reference region. The adjusted BVP may be used to determine or predict (e.g., encode and/or decode) the BV for the current block. These and other features providing improvements for BVP are described further below.

Figure 17A:
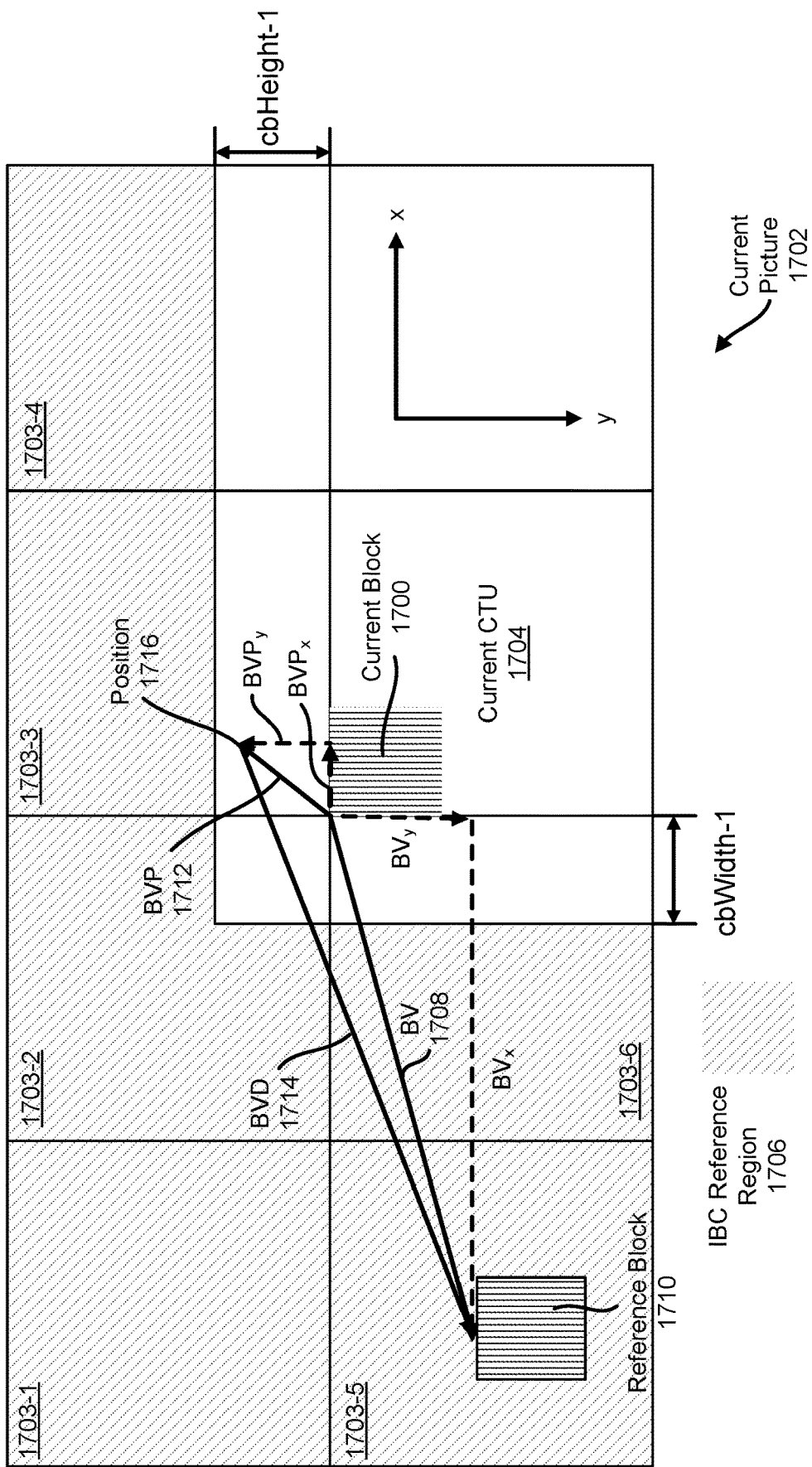
FIG. 17A shows an example of IBC for encoding.

FIG. 17A shows an example of IBC for encoding. An encoder (e.g., the encoder 200 as shown in FIG. 2) may use an IBC mode to code a current block 1700 in a current picture (or portion of a current picture) 1702. The current block 1700 may be a coding block (CB) within a coding tree unit (CTU) 1704. An encoder, using IBC, may search for a reference block in the same, current picture as that of the current block. Only a part of the current picture may be available for searching for a reference block. For example, only the part of the current picture that has been decoded prior to the encoding of the current block may be available for searching for a reference block. The part of the current picture available for searching for a reference block may be the IBC reference region. Searching only the part of the current picture that has been decoded prior to the encoding of the current block may ensure that the encoding and decoding systems may produce identical results, but may limit the IBC reference region.

Blocks may be scanned in a particular order. Blocks may be scanned (e.g., in HEVC, VVC, and/or other coding standards/formats/protocols) from left-to-right, top-to-bottom using a z-scan to form a sequence order for encoding/decoding. CTUs (represented by the large, square tiles as shown in FIG. 17A) to the left and above current CTU 1704 may be encoded/decoded prior to current CTU 1704 and current block 1700, for example, based on the z-scan. Samples of these CTUs (e.g., CTUs 1703-1 ... 1703-6) may form an exemplary IBC reference region 1706 for determining a reference block to predict current block 1700. A different sequence order for encoding/decoding may be used for other video encoders/decoders. Using a different sequence order may change IBC reference region 1706 accordingly.

The IBC reference region 1706 may represent locations for a valid reference block. The IBC reference region 1706 (e.g., as shown shaded) may be defined/represented in the form of valid positions/locations of a reference block that may be used for encoding/decoding/predicting the current block 1700. A position of a reference block may be defined as a position/location of a top left corner of the reference block. Reference blocks for which the top left corners are outside or coincide with a boundary (e.g., lowermost or rightmost boundary) of the IBC reference region 1706 may be at least partially outside the IBC reference region and/or may coincide with the current block 1700. Reference blocks for which the top left corners are outside or coincide with a boundary (e.g., lowermost or rightmost boundary) of the IBC reference region 1706 may be considered as being located outside the IBC reference region 1706. A position of a reference block may be defined, relative the current block 1700, using a BV.

The IBC reference region 1706 may not comprise an L-shaped region surrounding the left and top part of current block 1700. The L-shaped region may be defined in terms of a width of the current block 1700 (e.g., cbWidth) and a height of the current block (e.g., cbHeight). For example, the left part of the L-shaped region may have a width equal to (cbWidth−1) and the top part of the L-shaped region may have a height equal to (cbHeight−1)). The IBC reference region 1706 may not comprise the L-shaped region to prevent a BV from pointing to a reference block that may be (at least partially) overlap the current block 1700 or a non-reconstructed region of the current picture 1702.

Figure 17B:
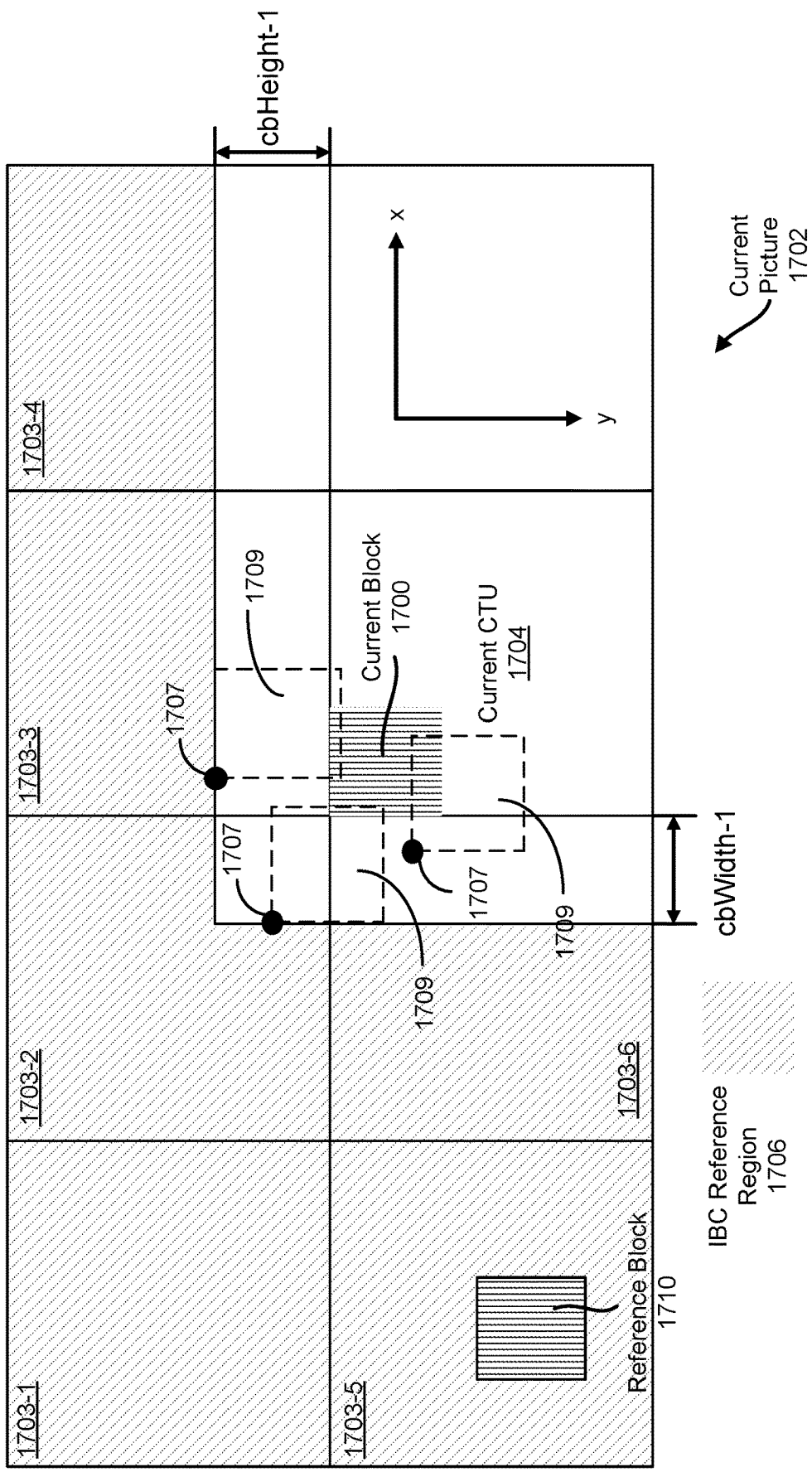
FIG. 17B shows example locations of reference blocks that are not in an IBC reference region.

FIG. 17B shows example locations of reference blocks that are not in an IBC reference region. For example, top left corners 1707 of reference blocks 1709 may coincide with a boundary (e.g., a rightmost or the lowermost) boundary of the IBC reference region 1706 and/or may be outside the IBC reference region 1706. The reference blocks 1709 may be considered to be outside the IBC reference region 1706.

Figure 17C:
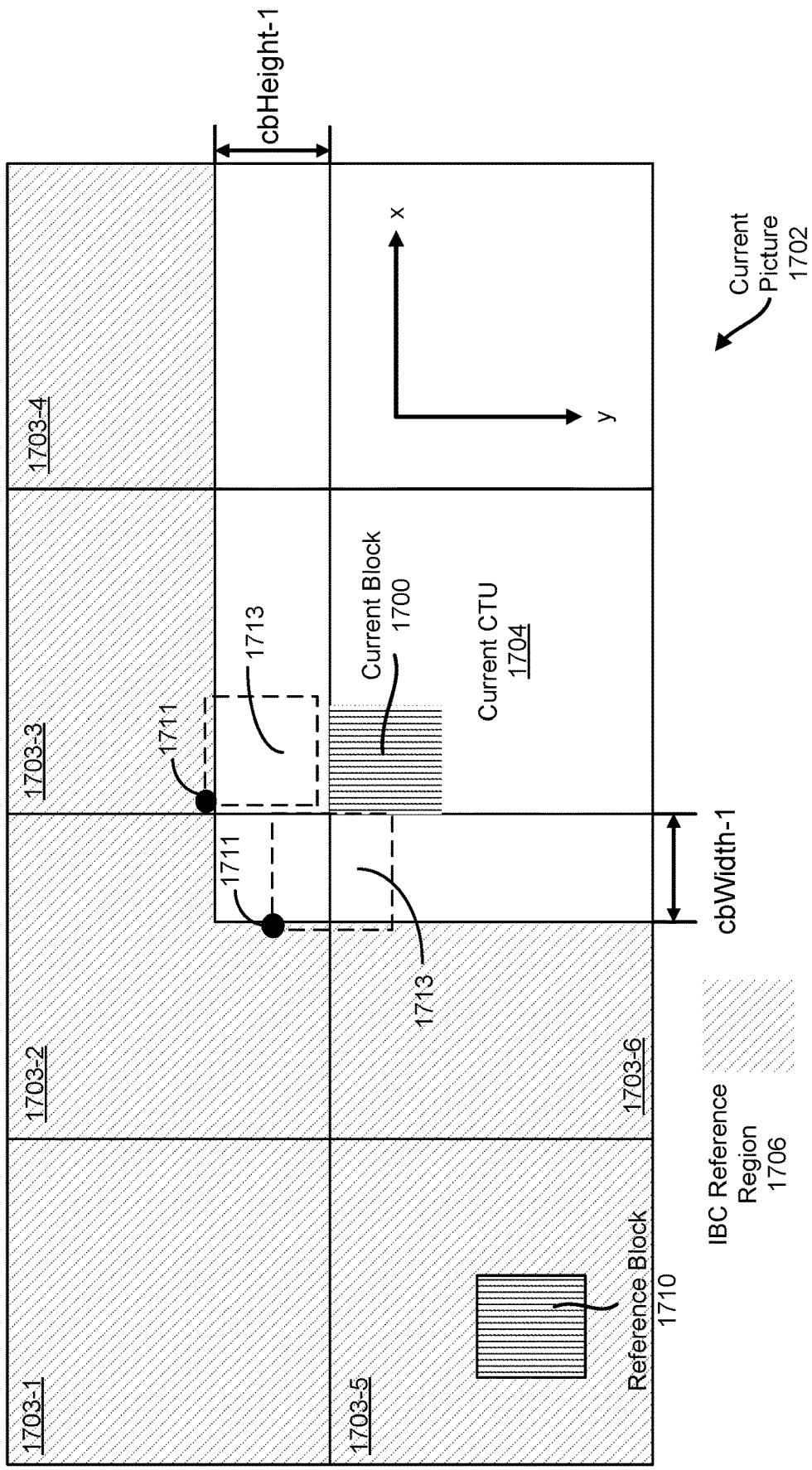
FIG. 17C shows example locations of reference blocks that are within an IBC reference region.

FIG. 17C shows example locations of reference blocks that are within an IBC reference region. For example, top left corners 1711 of reference blocks 1713 may be within the IBC reference region 1706. The reference blocks 1713 may be considered to be within the IBC reference region 1706, for example, based on the top left corners 1711 of the reference blocks 1713 being within the IBC reference region 1706.

One or more reference region constraints (e.g., in addition to the encoding/decoding sequence order) may be placed on IBC reference region 1706. For example, IBC reference region 1706 may be constrained based on a limited memory (e.g., at the encoder) for storing reference samples. IBC reference region 1706 may be constrained to CTUs determined based on a parallel processing approach (e.g., tiles or wavefront parallel processing (WPP)). Tiles may be used as part of a picture partitioning process for flexibly subdividing a picture into rectangular regions of CTUs such that coding dependencies between CTUs of different tiles are not allowed. WPP may be similarly used, as part of a picture partitioning process, for partitioning a picture into CTU rows. The partitioning into CTU rows may be such that dependencies between CTUs of different partitions are not allowed. Use of tiles or WPP may enable parallel processing of the picture partitions.

The encoder may use/apply a block matching technique to determine a block vector (BV) 1708. The BV may indicate a relative displacement from current block 1700 to a reference block 1710 within the IBC reference region 1706. The reference block 1710 may be a block that best matches the current block 1700 (e.g., in accordance with intra block compensated prediction). The IBC reference region 1706 may be a constraint that may be applied to the BV 1708. The BV 1708 may be constrained by the IBC reference region 1706 to indicate a displacement from current block 1700 to a reference block that is within the IBC reference region 1706. The encoder may determine the best matching reference block 1710 from among blocks (e.g., within IBC reference region 1706) that are tested during a searching process. The encoder may determine that the reference block 1710 may be the best matching reference block based on one or more cost criteria. as the one or more cost criteria may comprise a rate-distortion criterion (e.g., Lagrangian rate-distortion cost). The one or more cost criteria may be based on, for example, one or more differences (e.g., one or more of an SSD, an SAD, an SATD, and/or a difference determined based on a hash function) between prediction samples of the reference block 1710 and original samples of the current block 1700. The reference block 1710 may comprise decoded (and/or reconstructed) samples of the current picture 1702 prior to being processed by in-loop filtering operations (e.g., deblocking and/or SAO filtering).

The encoder may determine and/or use a difference (e.g., a corresponding sample-by-sample difference) between the current block 1700 and the reference block 1710. The difference may be referred to as a prediction error or residual. The encoder may store and/or send/signal, in/via a bitstream, the prediction error and related prediction information for decoding.

The prediction information may comprise the BV 1708. The prediction information may comprise an indication of the BV 1708. The BV 1708 may be predictively coded (e.g., in HEVC, VVC, and/or other video compression formats/standards/protocols) before being stored and/or send/signaled in/via a bit stream. The BV 1708 for current block 1700 may be predictively coded using a technique similar to AMVP as applied to inter prediction. The technique similar to AMVP (as applied for inter prediction) may be referred as BV prediction and difference coding or AMVP for IBC. The encoder, using BV prediction and difference coding, may code the BV 1708 as a difference between the BV 1708 and a BVP 1712. The encoder may select/determine the BVP 1712 from a list of candidate BVPs. The candidate BVPs may correspond to/comprise previously decoded BVs of neighboring blocks of the current block 1700 or may originate other sources. A null BVP candidate (e.g., with an x-component and y-component with zero magnitude) may be added to the list of candidate BVPs, for example, if a BV from a neighboring block of the current block 1700 is not available. The encoder and/or decoder may generate and/or determine the list of candidate BVPs.

The encoder may determine a BVD 1714. BVD 1714 may be determined/calculated based on the difference between the BV 1708 and the BVP 1712. For example, the BVD 1714 may be represented by two directional components $BVD_x$ and $BVD_y$. $BVD_x$ and $BVD_y$ may be determined/calculated as:

$$BVD_x = BV_x - BVP_x \tag{17}$$

$$BVD_y = BV_y - BVP_y \tag{18}$$

$BVD_x$ and $BVD_y$ may respectively represent the horizontal and vertical components of the BVD 1714. $BV_x$ and $BV_y$ may respectively represent the horizontal and vertical components of the BV 1708. $BVP_x$ and $BVP_y$ may respectively represent the horizontal and vertical components of the BVP 1712. The horizontal x-axis and vertical y-axis are indicated in the lower right hand corner of current picture 1702 for reference purposes. With respect to the example of FIG. 17A, the x-axis (e.g., x-axis value) may increase from left to right, and the y-axis (e.g., y-axis value) may increase from top to bottom.

The encoder may send/signal, in/via a bit stream, the prediction error, an indication of the selected BVP 1712, and the separate components of BVD 1714 as determined based on equations (17) and (18). The indication of the BVP 1712 may be an index indicating the BVP 1712 within the list of candidate BVPs. A decoder (e.g., the decoder 300 as shown in FIG. 3) may decode the BV 1708 by adding corresponding components of the BVD 1714 to corresponding components of the BVP 1712. The decoder may decode the current block 1700 by determining and/or generating the reference block 1710. The decoder may determine and/or generate the reference block 1710 using the decoded BV. The reference block 1710 may correspond to/form (e.g., be considered as) a prediction of the current block 1700. The decoder may decode the current block based on combining the prediction with the prediction error received in/via the bitstream.

The BVP 1712 may indicate a relative displacement from a position of current block 1700 to a position (e.g., sample position) 1716. The position of a block (e.g., the current block 1700, the reference block 1710) may be determined by/correspond to the position of the top left sample of the block (e.g., the current block 1700, the reference block 1710). The position of a block may be determined by/correspond to any other sample of the block. The position 1716 may be an integer sample position or a fractional sample position between two integer sample positions. The sample position 1716, indicated by BVP 1712, may be outside the IBC reference region 1706 (e.g., as shown in FIG. 17A) because the BVP 1712 may be derived from spatially neighboring blocks of the current block 1700 and/or prior coded BVs. The BV 1708 may be constrained to indicate a relative displacement from the current block 1700 to a position of a reference block 1710 within the IBC reference region 1706. The position of the reference block 1710 may be determined by the position of the top left sample (or any other sample) of the reference block 1710. The BVP 1712 may not accurately predict the BV 1708 because the BVP 1712 may indicate a relative displacement from the current block 1700 to the sample position 1716 that may be outside the IBC reference region 1706, while the BV 1708 may indicate a relative displacement from the current block 1700 to the position of the reference block 1710 that is within the IBC reference region 1706. Inaccurate prediction of the BV 1708 may result in requiring higher signaling overhead for indicating the BVD 1714. Various examples herein describe adjusting BVPs (e.g., the BVP 1716) to more accurately predict a BV.

A BVP 1712 being a more accurate prediction of the BV 1708 may correspond to the BVP indicating a position (e.g., the position 1716) that is within the IBC reference region. An encoder and/or a decoder may determine whether the BVP 1712 points to/indicates a position (e.g., the position 1716) that is within the IBC reference region. The BVP 1712 pointing to/indicating a position that is within the IBC reference region may result in the BVP being a more accurate prediction of the BV 1708. The BVP 1712 being a more accurate prediction of the BV 1708 may result in lower signaling overhead for signaling/sending the BVD 1714. An encoder and/or a decoder may replace/adjust the BVP 1712 with an adjusted BVP, for example, based on determining that the BVP 1712 points to/indicates a position that is not within the IBC reference region.

Determining whether the BVP 1712 points to/indicates a position (e.g., position 1716) that is within the IBC reference region may comprise determining whether the position is at least one or more offsets away, from the current block 1700, in one or more predetermined directions. The one or more predetermined directions may be based on a scan type used for the video coding. For example, for video coding using a z-scan (e.g., left-to-right, top-to-bottom scan), the one or more directions may comprise a first direction that points above the current block 1700 and a second direction that points to the left of the current block. Determining whether the BVP 1712 points to/indicates a position that is within the IBC reference region may comprise determining whether the position is at least a first offset distance away to the left of the current block 1700 and/or at least a second offset distance away above the current block. The first offset distance and the second offset distance may be defined as a function of dimensions of the current block 1700 (e.g., width and/or height of the current block 1700).

With reference to FIG. 17A, an encoder and/or a decoder may determine that the BVP 1712 indicates a position 1716 that is neither to the left of current block 1700 by at least a first offset distance (e.g., by at least a distance equal to the width (cbWidth) of the current block 1700, or by some additional or other offset amount), nor above the current block 1700 by at least a second offset distance (e.g., by at least a distance equal to a height (cbHeight) of current block 1700, or by some additional or other offset amount). The BVP 1712 may point to a position in the non-shaded region of current picture 1702 (e.g., as shown in FIG. 17A) which may be outside the IBC reference region 1706 for current block 1700, for example, if the position 1716 is neither to the left of current block 1700 by at least the first offset distance nor above the current block 1700 by at least the second offset distance.

As described above, the IBC reference region 1706 may not comprise the L-shaped region to prevent a BV from pointing to a reference block that may (at least partially) overlap the current block 1700 or a non-reconstructed region of the current picture 1702. The encoder or the decoder may determine whether the BVP 1712 points to/indicates a position 1716 that is within or outside the IBC reference region 1706. The encoder or the decoder may determine that the BVP 1712 points to/indicates a position 1716 that is neither to the left of the current block 1700 by at least the first offset distance (e.g., cbWidth, or any other distance), nor above current block 1700 by at least the second offset distance (e.g., cbHeight, or any other distance) by determining that: a sum of a horizontal component $BVP_x$ of the BVP 1712 and the first offset distance is greater than zero; and a sum of a vertical component $BVP_y$ of BVP 1712 and the second offset distance is greater than zero. The determination may be equivalently stated (e.g., if the first offset distance is cbWidth and the second offset distance is cbHeight) as determining that: the horizontal component $BVP_x$ of BVP 1712 is greater than −cbWidth; and the vertical component $BVP_y$ of BVP 1712 is greater than −cbHeight.

The encoder and/or the decoder may replace the BVP 1712 with an adjusted BVP, for example, based on determining the position 1716 indicated by the BVP 1712. The encoder and/or the decoder may replace the BVP 1712 with an adjusted BVP, for example, based on determining that the position 1716 is not within (e.g., is outside) the IBC reference region 1706. The encoder and/or the decoder may replace the BVP 1712 with the adjusted BVP, for example, based on determining that the position 1716 is neither to the left of the current block 1700 by at least the first offset distance (e.g., by at least a distance equal to the width (cbWidth) of the current block 1700), nor above the current block 1700 by at least the second offset distance (e.g., by at least a distance equal to a height (cbHeight) of the current block 1700). The encoder and/or the decoder may replace the BVP 1712 with an adjusted BVP that satisfies one or more of the above conditions.

The encoder and/or the decoder may replace the BVP 1712 with an adjusted BVP that may indicate a displacement from the position of current block 1700 to a position within the IBC reference region 1706. For example, the encoder and/or the decoder may replace the BVP 1712 with an adjusted BVP comprising: a horizontal component equal to −cbWidth, and a vertical component equal to the vertical component $BVP_y$ of BVP 1712. The encoder and/or the decoder may replace BVP 1712 with an adjusted BVP comprising: a horizontal component equal to the horizontal component $BVP_x$ of BVP 1712, and a vertical component equal to −cbHeight. The encoder and/or the decoder may replace BVP 1712 with an adjusted BVP comprising: a horizontal component equal to −cbWidth, and a vertical component equal to −cbHeight. The encoder and/or the decoder may replace the BVP 1712 with an adjusted BVP that is to the left of the current block 1700 by at least the first offset distance (e.g., cbWidth), and/or above the current block 1700 by at least the second offset distance (e.g., cbHeight). The encoder and/or the decoder may replace the BVP 1712 with an adjusted BVP that indicates a displacement from the position of current block 1700 to a position within the IBC reference region 1706, for example, based on determining that the position 1716 is neither to the left of current block 1700 by at least the first offset distance (e.g., a distance equal to the width (cbWidth) of current block 1700), nor above current block 1700 by at least the second offset distance (e.g., a distance equal to a height (cbHeight) of current block 1700). The encoder and/or the decoder may replace the BVP 1712 with an adjusted BVP that points to/indicates a position, relative to the position of current block 1700, that is within the IBC reference region 1706. The encoder and/or the decoder may replace the BVP 1712 with the adjusted BVP based on determining one or more adjusted BVP candidates.

Figure 17D:
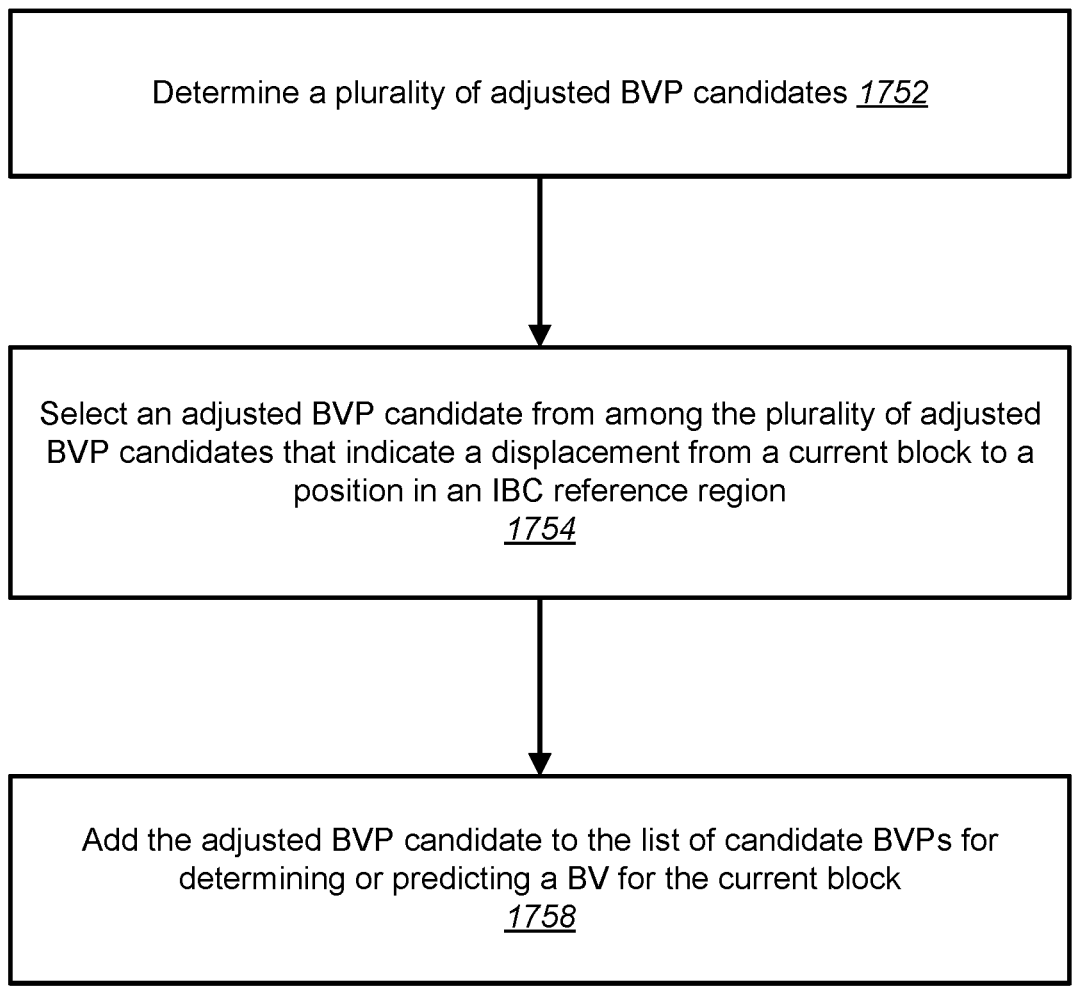
FIG. 17D shows an example method for adjusted block vector predictor(s) (BVP(s)).

FIG. 17D shows an example method for adjusted BVP(s). A method 1750 may comprise determining adjusted BVP candidates. The example method 1750 may be performed at an encoder and/or at a decoder. At step 1752, an encoder and/or a decoder may determine a plurality of adjusted BVP candidates. The plurality of adjusted BVP candidates may comprise at least two of: a first adjusted BVP candidate with a horizontal component equal to a negative of the first offset distance (e.g., −cbWidth), and a vertical component equal to the vertical component $BVP_y$ of BVP 1712; a second adjusted BVP candidate with a horizontal component equal to the horizontal component $BVP_x$ of BVP 1712, and a vertical component equal to a negative of the second offset distance (e.g., −cbHeight); and a third adjusted BVP candidate with a horizontal component equal to a negative of the first offset distance (e.g., −cbWidth), and a vertical component equal to a negative of the second offset distance (e.g., −cbHeight). The plurality of adjusted BVP candidates may comprise at least two of: a first adjusted BVP candidate with a horizontal component based on a width of the current block 1700 (cbWidth); a second adjusted BVP candidate with a vertical component based on a height of the current block (cbHeight); and a third adjusted BVP candidate with a horizontal component based on the width of the current block 1700 (cbWidth), and a vertical component equal based on the height of the current block (cbHeight).

At step 1754, the encoder and/or the decoder may select an adjusted BVP from the plurality of adjusted BVP candidates. For example, the encoder and/or the decoder may determine/select one of the adjusted BVP candidates as the adjusted BVP for replacing the BVP 1712. At step 1758, the encoder and/or the decoder may add the adjusted BVP to a list of candidate BVPs. The encoder and/or the decoder may select the one of the adjusted BVP candidates (e.g., in the list of candidate BVPs), for example, based on a BVD determined/calculated for each of the adjusted BVP candidates. A BVP may be determined/calculated, for each adjusted BVP candidate, as a difference between the BV 1708 and the adjusted BVP candidate. The encoder and/or the decoder may select the adjusted BVP candidate that results in a smallest BVD, among the BVDs calculated for the adjusted BVP candidates, as the adjusted BVP.

The encoder and/or the decoder may select the adjusted BVP candidate based on a predetermined order. The predetermined order may comprise a first, a second, and a third adjusted BVP candidate. The encoder and/or the decoder may select one of the adjusted BVP candidates from among only those adjusted BVP candidates that are valid. A valid BVP candidate may be a candidate that indicates a displacement from the position of current block 1700 to a position within the IBC reference region 1706. The encoder may send/signal, in/via the bitstream and to the decoder, an indication of the adjusted BVP candidate that has been selected. The decoder may receive, from the bitstream, the indication and replace the BVP with the selected adjusted BVP candidate. The adjusted BVP may be used to predict (e.g., at the encoder) and/or determine (e.g., at the decoder) the BV 1708 in the same manner as described with respect to the BVP 1712.

Figure 18:
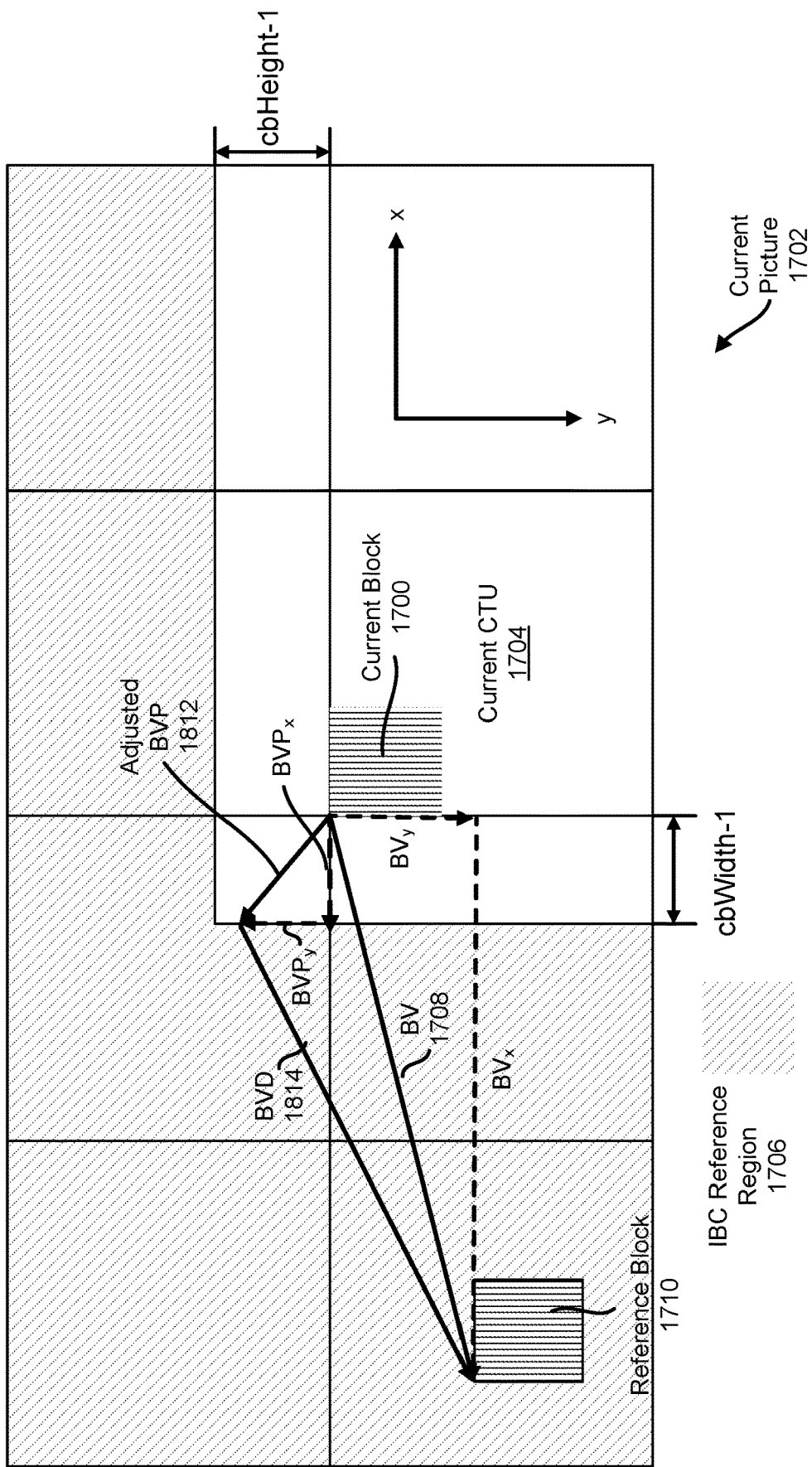
FIG. 18 shows an example of IBC with an adjusted BVP.

FIG. 18 shows an example of IBC with an adjusted BVP. An encoder and/or a decoder may replace the BVP 1712 (e.g., described with respect to FIG. 17A) with an adjusted BVP 1812. Replacing the BVP 1712 with the adjusted BVP 1812 may be based on one or more considerations as described with respect to FIGS. 17A-D. The adjusted BVP may be determined/selected from one or more adjusted BVP candidates. The adjusted BVP candidates may be determined based on one or more considerations as described with respect to FIGS. 17A-17D. For example, the adjusted BVP 1812 may comprise a horizontal component equal to −cbWidth, and a vertical component equal to the vertical component $BVP_y$ of the BVP 1712. As shown in FIG. 18, the adjusted BVP 1812 may provide a better prediction of the BV 1708 by reducing the length of the horizontal component $BVD_x$ of the BVD 1814 compared to the horizontal component of $BVD_x$ of the BVD 1714 in FIG. 17A.

Figure 19:
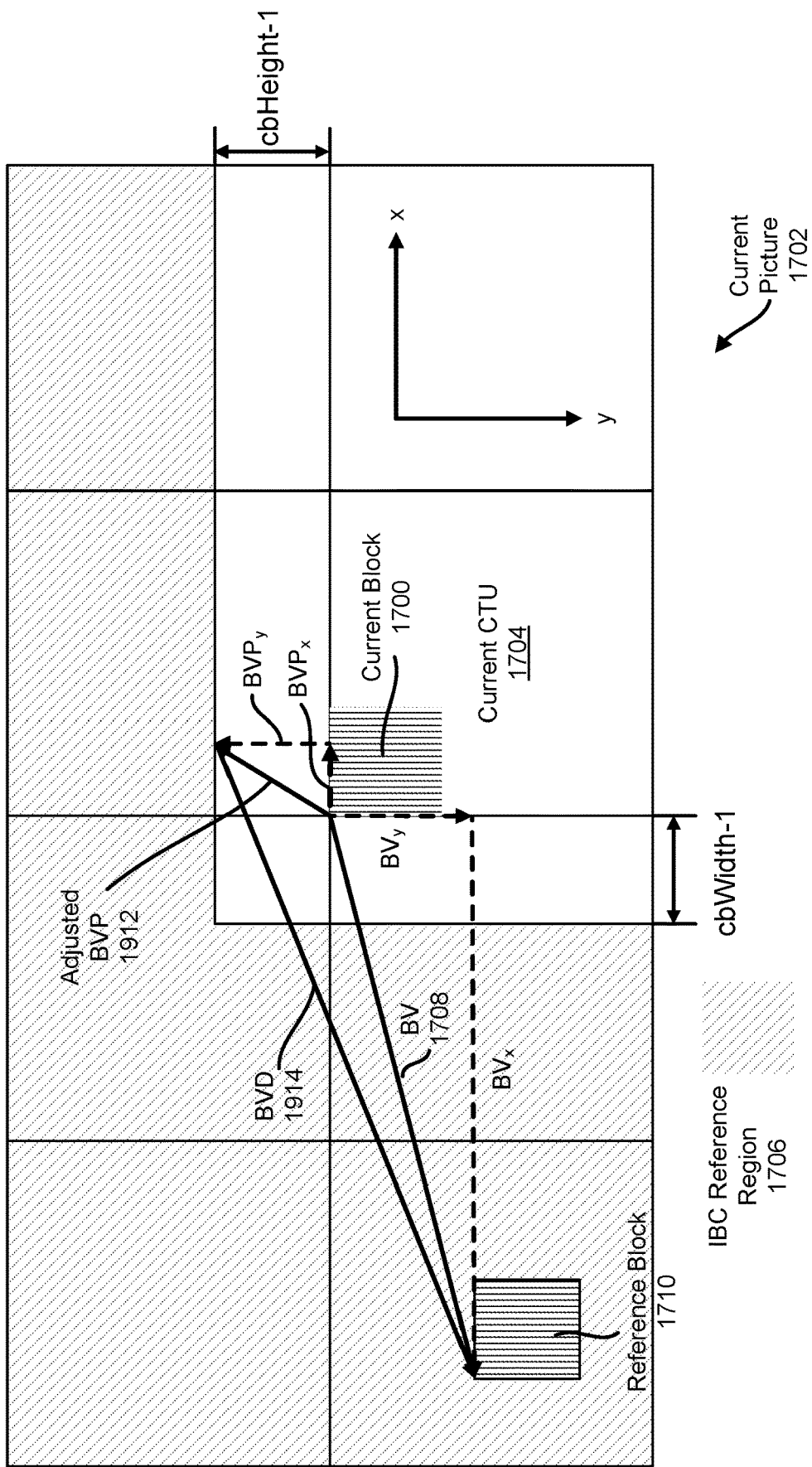
FIG. 19 shows an example of IBC with an adjusted BVP.

FIG. 19 shows an example of IBC with an adjusted BVP. An encoder and/or a decoder may replace the BVP 1712 with an adjusted BVP 1912. Replacing the BVP 1712 with the adjusted BVP 1912 may be based on one or more considerations as described with respect to FIGS. 17A-D. The adjusted BVP may be determined/selected from one or more adjusted BVP candidates. The adjusted BVP candidates may be determined based on one or more considerations as described with respect to FIGS. 17A-D. The adjusted BVP 1912 may comprise a horizontal component equal to the horizontal component $BVP_x$ of BVP 1712, and a vertical component equal to −cbHeight. As shown in FIG. 19, the adjusted BVP 1912 may provide a worse prediction of the BV 1708 by increasing the length of the vertical component $BVD_y$ of the BVD 1914 compared to the vertical component $BVD_y$ of the BVD 1714 in FIG. 17A.

Figure 20:
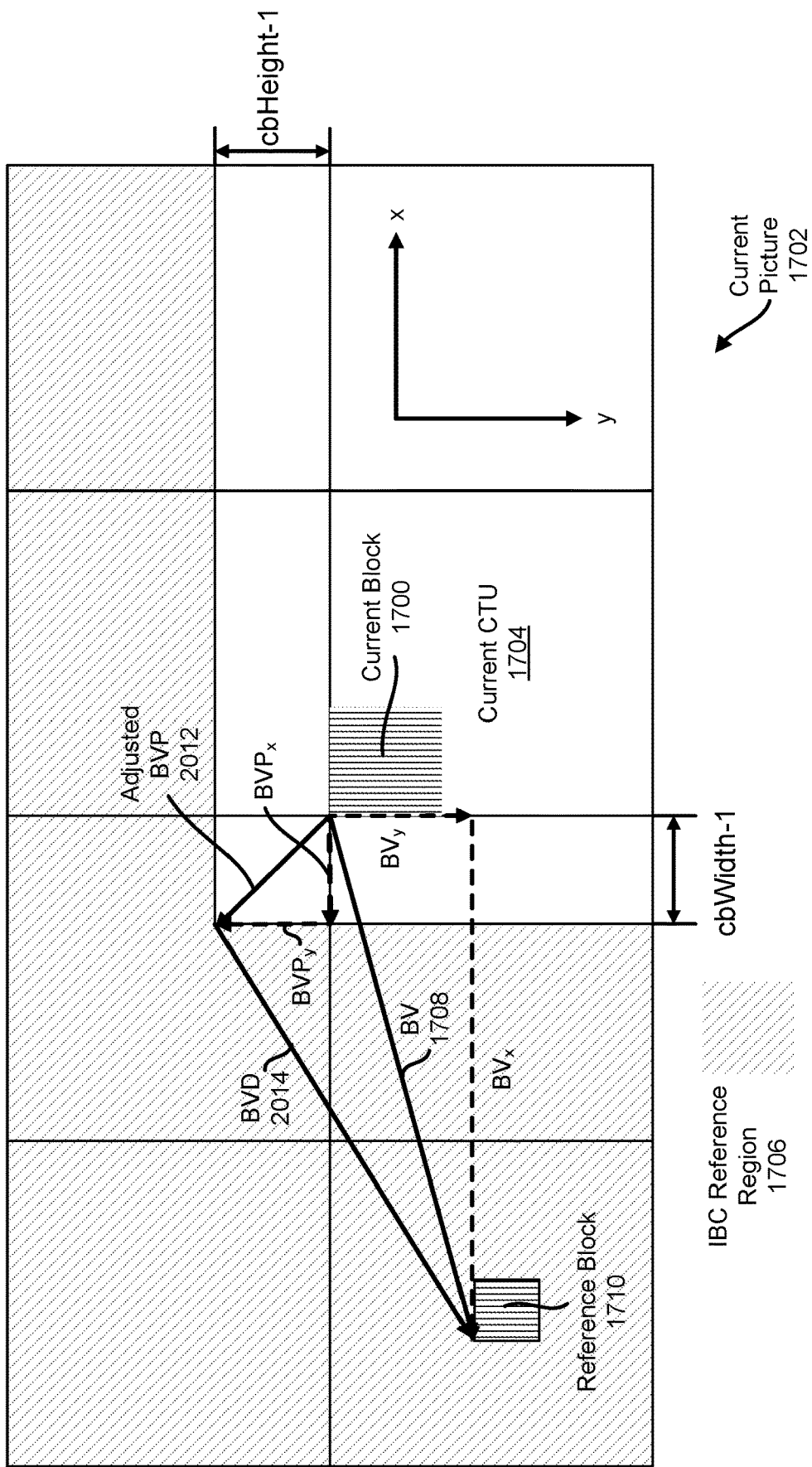
FIG. 20 shows an example of IBC with an adjusted BVP.

FIG. 20 shows an example of IBC with an adjusted BVP. An encoder and/or a decoder may replace the BVP 1712 with an adjusted BVP 2012. Replacing the BVP 1712 with the adjusted BVP 1912 may be based on one or more considerations as described with respect to FIGS. 17A-D. The adjusted BVP may be determined/selected from one or more adjusted BVP candidates. The adjusted BVP candidates may be determined based on one or more considerations as described with respect to FIGS. 17A-D. The adjusted BVP 2012 may comprise a horizontal component equal to −cbWidth, and a vertical component equal to −cbHeight. As shown in FIG. 20, the adjusted BVP 2012 may provide a better prediction of BV 1708 in one respect by reducing the length of the horizontal component of BVD 2014 compared to the horizontal components of BVD 1714 in FIG. 17, but may also provide a worse prediction of BV 1708 in another respect by increasing the length of the vertical component $BVD_y$ of BVD 2014 compared to the vertical component $BVD_y$ of BVD 1714 in FIG. 17.

The encoder and/or the decoder may use the adjusted BVP in a manner similar to the BVP as described above. For example, the encoder may determine a BVD based on the adjusted BVP as per Equations 17 and 18. The encoder may send/signal, in/via a bit stream, a prediction error, an indication of the adjusted BVP, and separate components of BVD. The indication of the adjusted BVP may be an index indicating the adjusted BVP within the list of candidate BVPs. A decoder (e.g., the decoder 300 as shown in FIG. 3) may decode the BV by adding corresponding components of the BVD to corresponding components of the adjusted BVP. The decoder may decode the current block by determining and/or generating the reference block. The decoder may determine and/or generate the reference block using the decoded BV. The reference block may correspond to/form (e.g., be considered as) a prediction of the current block. The decoder may decode the current block based on combining the prediction with the prediction error received in/via the bitstream.

The IBC reference region 1706, as shown in FIGS. 17A-17D, FIG. 18, FIG. 19, and FIG. 20, is merely exemplary, and an IBC reference region may be different from the IBC reference region 1706. The methods, devices, and systems described herein with respect to FIGS. 17A-17D, FIG. 18, FIG. 19, and FIG. 20 may be used for/applied to IBC reference regions different than the IBC reference region 1706. For example, the IBC reference region 1706 may be replaced by an IBC reference region determined based on a different set of IBC reference region constraints. The IBC reference region 1706 may be further constrained to include a number/quantity of decoded or reconstructed samples that may be stored in a limited memory size (e.g., IBC reference sample memory), for example, in addition to being constrained to a reconstructed part of current picture 1702 and/or to one or more WPP partitions or tile partitions. The size of the IBC reference sample memory may be limited based on being implemented on-chip with the encoder or decoder. The IBC reference region may be increased in size by using a larger size IBC reference sample memory off-chip from the encoder or decoder. Using an off-chip memory may require higher memory bandwidth requirements and increased delay in writing and/or reading samples (e.g., in the IBC reference region 1706) to and/or from the IBC reference sample memory.

The IBC reference region (e.g., the IBC reference region 1706) may be constrained to: a reconstructed part of the current CTU; and/or one or more reconstructed CTUs to the left of the current CTU. The one or more reconstructed CTUs to the left of the current CTU may not include a portion, of a left most one of the one or more reconstructed CTUs, that is collocated with either the reconstructed part of the current CTU or a virtual pipeline data unit (VPDU) in which the current block being coded is located. Blocks of samples in different CTUs may be collocated based on having a same size and/or CTU offset. A CTU offset of a block may be the offset of the block's top-left corner relative to the top-left corner of the CTU in which the block is located.

The IBC reference region may not include the portion, of the left most one of the more reconstructed CTUs, that is collocated with the reconstructed part of the current CTU. For example, the IBC reference region may not include the portion, of the left most one of the more reconstructed CTUs, that is collocated with the reconstructed part of the current CTU because the IBC reference sample memory may be implemented in a manner similar to a circular buffer. For example, the IBC reference sample memory may store reconstructed reference samples corresponding to one or more CTUs. Reconstructed reference samples of the current CTU may replace the reconstructed reference samples of a CTU, stored in the IBC reference sample memory, that are located (e.g., within a picture or frame) farthest to the left of the current CTU, for example, if the IBC reference sample memory is filled. The samples of the CTU stored in the IBC reference sample memory that are located, within a picture or frame, farthest to the left of the current CTU may correspond to the oldest data in the IBC reference sample memory. Updating the samples in the IBC reference sample memory as described herein may allow at least some of the reconstructed reference samples from the left most CTU to remain stored in the IBC reference sample memory when processing the current CTU. The remaining reference samples of the left most CTU stored in the IBC reference sample memory may be used for predicting the current block in the current CTU.

A CTU may or may not be processed all at once. For example, in typical hardware implementations of an encoder and/or of a decoder, a CTU may not be processed all at once. The CTU may be divided into VPDUs for processing by a pipeline stage. A VPDU may comprise a 4×4 region of samples, a 16×16 region of samples, a 32×32 region of samples, a 64×64 region of samples, a 128×128 region of samples, or any other sample region size. A size of a VPDU may be determined based on a lower one of: a maximum VPDU size (e.g., a 64×64 region of samples) and a size (e.g., a width or height) of a current CTU. The portion, of the left most one of the one or more reconstructed CTUs, that is collocated with the VPDU in which the block being coded is located may be further excluded from the IBC reference region. Excluding this portion of the left most one of the one or more reconstructed CTUs from the IBC reference region, may enable the portion of the IBC reference sample memory (e.g., used to store the reconstructed reference samples from this portion) to store only samples within the region of the current CTU corresponding to the VPDU. Storing only samples within the region of the current CTU corresponding to the VPDU may reduce and/or avoid certain complexities in encoder and/or decoder design.

The quantity of reconstructed CTUs, to the left of the current CTU included in the IBC reference region, may be determined based on the quantity of reconstructed reference samples that the IBC reference sample memory may store and/or the size of the CTUs in the current picture. The quantity of reconstructed CTUs, to the left of the current CTU included in the IBC reference region, may be determined based on the quantity of reconstructed reference samples that the IBC reference sample memory may store divided by the size of a CTU in the current picture. For example, for an IBC reference sample memory that may store 128×128 reconstructed reference samples for the IBC reference region and a CTU size is 128×128 samples, the quantity of reconstructed CTUs to the left of the current CTU included in the IBC reference region may be equal to (128×128)/(128×128) or 1 CTU. As another example, for a memory that may store 128×128 reconstructed reference samples for the IBC reference region and a CTU size is 64×64 samples, the quantity of reconstructed CTUs to the left of the current CTU included in the IBC reference region may be equal to (128×128)/(64×64) or 4 CTUs.

Figure 21A:
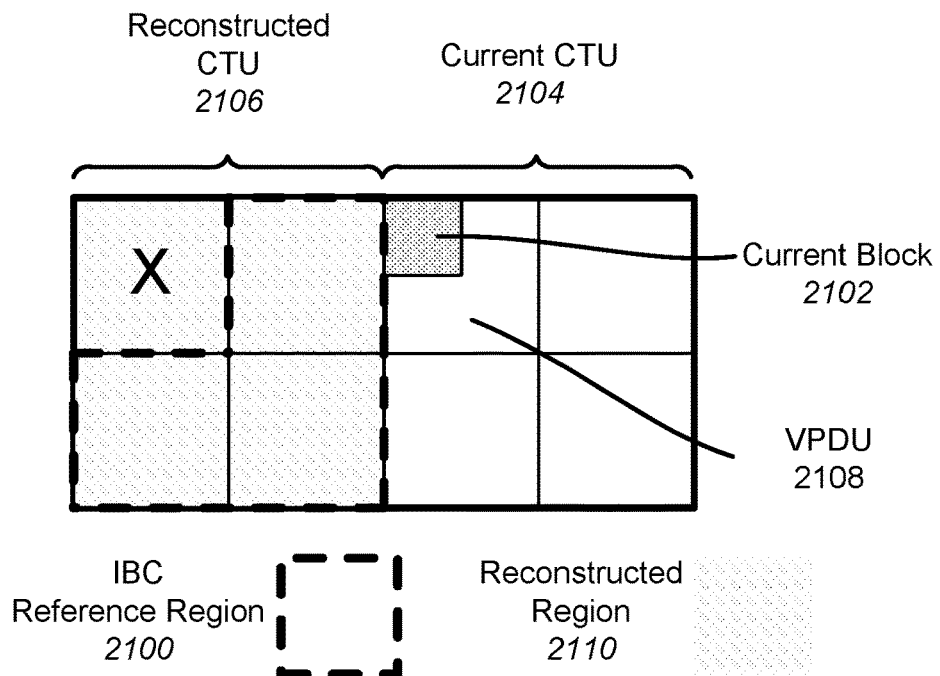
FIG. 21A and FIG. 21B show example IBC reference regions.

FIG. 21A shows an example IBC reference region. The IBC reference region 2100 may be determined based on an IBC reference sample memory size and a CTU size. The IBC reference sample memory size may be equal to a CTU size. The IBC reference sample memory size may be equal to 128×128 samples (or any other quantity of samples). The CTU size may be equal to 128×128 samples (or any other quantity of samples). A quantity of reconstructed CTUs, to the left of a current CTU 2104, as included in the IBC reference region 2100 may be equal to (128×128)/(128×128) or 1 CTU. The IBC reference region 2100 may be a portion of a reconstructed region 2110. Samples in the IBC reference region 2100 may be a subset of samples in the reconstructed region 2110. Samples of a current block 2102 being coded may be a subset of the samples in the VPDU 2108.

FIG. 21A shows a current block 2102 within a current CTU 2104. The current block 2102 may be the first block coded in the current CTU 2104 and may be coded using an IBC mode. As described with respect to FIG. 17, a block may be coded using IBC mode by determining a best matching reference block within an IBC reference region 2100. The IBC reference region 2100 may be constrained to: a reconstructed part of current CTU 2104; and the single, reconstructed CTU 2106 to the left of current CTU 2104 not including a portion, of the reconstructed CTU 2106, that is collocated with either the reconstructed part of current CTU 2104 or a VPDU 2108 in which the current block 2102 is located. CTUs may be divided into multiple VPDUs. For example, CTUs in FIG. 21A may be divided into 4 VPDUs of size 64×64 samples. The IBC reference region 2100 for current block 2102 may include the reconstructed region 2110 (shown with hatching) except the 64×64 region of the reconstructed CTU 2106 that is collocated with the VPDU 2108. The collocated region is marked with an X in FIG. 21A. The IBC reference region 2100 may include a different quantity of CTUs to the left of current CTU 2102. A quantity of CTUs, in the IBC reference region 2100, that are to the left of current CTU 2102 may be different for different CTU sizes. For example, for CTU sizes of 64×64, the IBC reference region 2100 may include 4 CTUs to the left of current CTU 2102 based on the quantity of reconstructed reference samples that the IBC reference sample memory may store divided by the size of the CTUs in the current picture. For ease of illustration, FIG. 21A does not show the L-shaped region surrounding the current block as described with respect to FIG. 17. Such an L-shaped region may be excluded from the IBC reference region 2100.

Figure 21B:
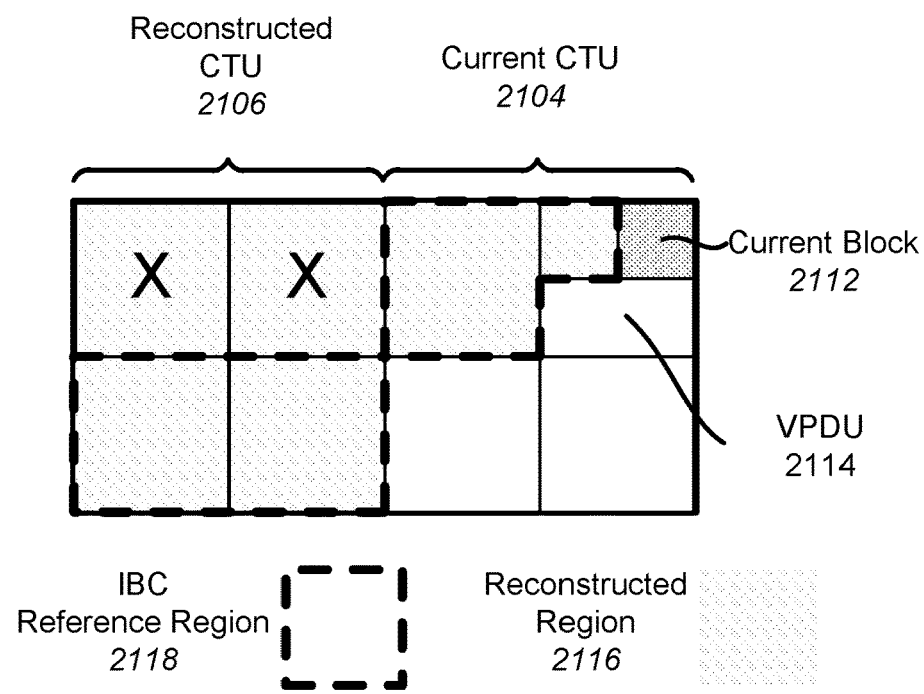

FIG. 21B shows an example IBC reference region. FIG. 21B shows an IBC reference region 2118 for a later coded block in the current CTU 2104. The later coded block may be the current block 2112. The current block 2112 may be coded using an IBC mode (e.g., as described above with respect to FIGS. 17A-D). The current block 2112 may be coded by determining a best matching reference block within an IBC reference region 2118. The IBC reference region 2118 for the current block 2112 may be constrained to: a reconstructed part of the current CTU 2104; and the reconstructed CTU 2106 not including a portion, of the reconstructed CTU 2106, that is collocated with either the reconstructed part of the current CTU 2104 or a VPDU 2114 in which the current block 2112 is located. The current CTU 2104 may be divided into 4 VPDUs of size 64×64 samples (e.g., as described with respect to FIG. 21A). The IBC reference region 2118 for the current block 2112 may comprise the reconstructed region 2116 (shown with hatching) except the part of CTU 2106 that is collocated with either the reconstructed part of the current CTU 2104 and/or the VPDU 2114. The collocated regions are each marked with an X in FIG. 21B. For ease of illustration, FIG. 21B does not show the L-shaped region surrounding the current block as described with respect to FIG. 17A. Such an L-shaped region may be excluded from the IBC reference region 2118.

Figure 22:
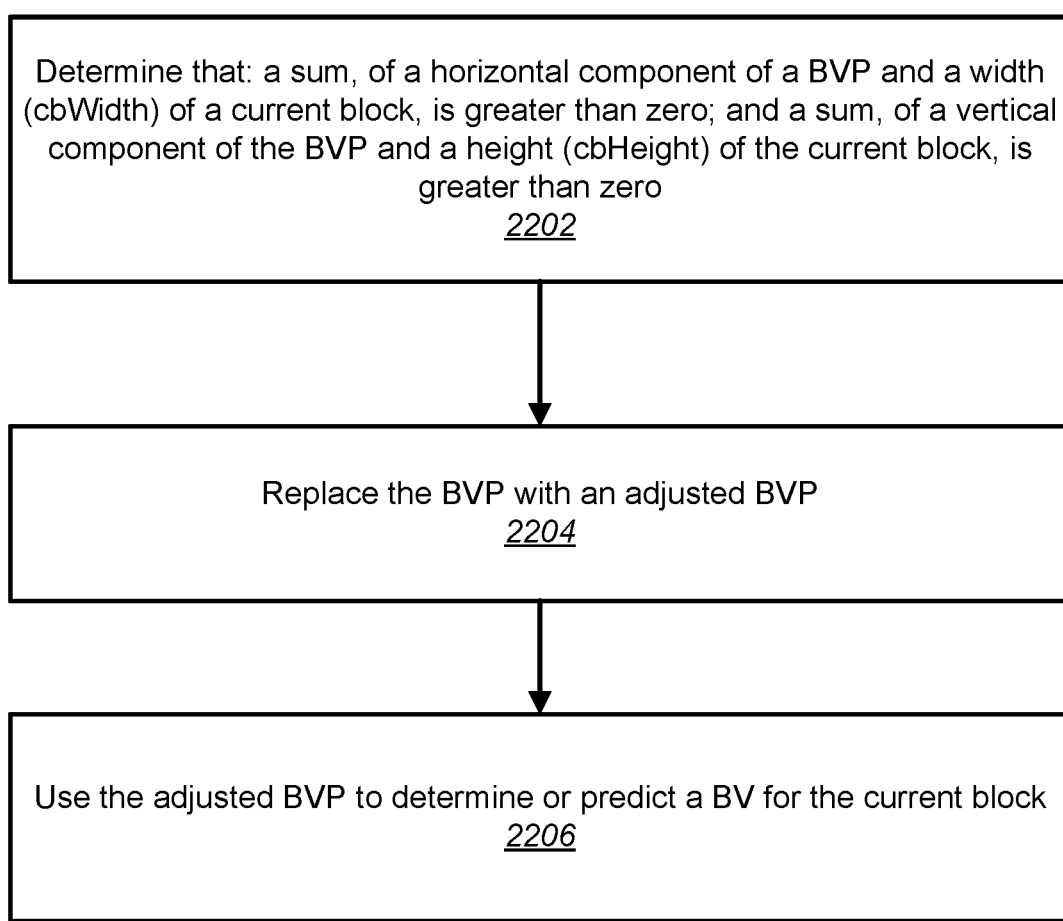
FIG. 22 shows an example method for replacing a BVP with an adjusted BVP.

FIG. 22 shows an example method for replacing a BVP with an adjusted BVP. The method 2200 may be performed by a device in a video encoding or decoding system. For example, the device may be an encoder and/or a decoder (e.g., the encoder 200 as shown in FIG. 2 and/or the decoder 300 as shown in FIG. 3).

At step 2202, the device may determine that a sum, of a horizontal component of a BVP and width (e.g., cbWidth) of a current block, is greater than zero The device may further determine that a sum, of a vertical component of the BVP and a height (e.g., cbHeight) of the current block, is greater than zero.

At step 2204, the BVP may be replaced with an adjusted BVP based on the determinations made at step 2202. A horizontal component of the adjusted BVP may be equal to −cbWidth; and a vertical component of the adjusted BVP may be equal to the vertical component of the BVP. A horizontal component of the adjusted BVP may be equal to the horizontal component of the BVP; and a vertical component of the adjusted BVP may be equal to −cbHeight. A horizontal component of the adjusted BVP may be equal to −cbWidth; and a vertical component of the adjusted BVP may be equal to −cbHeight.

Replacing the BVP with an adjusted BVP may comprise determining a plurality of adjusted BVP candidates. The adjusted BVP candidates comprise at least two of: a first adjusted BVP candidate with a horizontal component equal to −cbWidth, and a vertical component equal to the vertical component $BVP_y$ of the BVP; a second adjusted BVP candidate with a horizontal component equal to the horizontal component $BVP_x$ of the BVP, and a vertical component equal to −cbHeight; and a third adjusted BVP candidate with a horizontal component equal to −cbWidth, and a vertical component equal to −cbHeight.

Replacing the BVP with an adjusted BVP may comprise selecting one of the adjusted BVP candidates as the adjusted BVP. The selecting may be among valid adjusted BVP candidates. The adjusted BVP may be selected, from the adjusted BVP candidates, based on BVDs determined/calculated for each of the adjusted BVP candidates. The adjusted BVP may be associated with a smallest BVD among the BVDs calculated for the adjusted BVP candidates.

The method 2200 may comprise sending/signaling, in/via a bitstream, an indication of the adjusted BVP. The method 2200 may comprise receiving, in/via a bitstream, an indication of the adjusted BVP. At step 2206, the adjusted BVP may be used to determine or predict (e.g., at an encoder or at the decoder) a BV for the current block. For example, an encoder may determine a BVD based on the adjusted BVP and the BV (e.g., using equations 17 and 18). The decoder may decode the BV using the received indication of the adjusted BVP and the BVD.

An encoder (e.g., the encoder 200 as shown in FIG. 2), may code a BV using merge mode. The encoder, using the merge mode, may reuse a same BV as that of a neighboring block of a current block or other block for IBC prediction of the current block. A BVD corresponding to the current block need not be sent/signaled, for example, at least because the same BV of a neighboring or other block may be used. The signaling overhead for signaling the BV of the current block may be reduced. In a manner similar to BV prediction and difference coding (or AMVP for IBC), both the encoder and decoder may generate a candidate list of BVPs from neighboring or other blocks of the current block for the merge mode. The encoder may determine to use (or inherit) the BV of/associated with one of the BVPs in the candidate list for predicting the BV information of the current block being encoded. The encoder may send/signal, in/via the bit stream, an indication of the determined BVP from the candidate list. For example, the encoder may send/signal an indicator/index indicating the determined BVP in the list of candidate BVPs. The decoder may generate, determine, and/or construct the list of candidate BVPs in the same manner as the encoder for the merge mode. The BVP may be indicated in/via the bitstream, to the decoder, as an index/indicator of the BVP in the list of candidate BVPs. The decoder may decode the current block by determining and/or generating the reference block using the determined BV associated with the BVP. The reference block may correspond to/form (e.g., be considered as) the prediction of the current block. The decoder may decode the current block by combining the prediction with the prediction error. The list of candidate BVPs (e.g., in HEVC, VVC, and/or other coding standards/formats/protocols) for merge mode may comprise up to four (or any other quantity of) spatial merge candidates that are derived from the five (or any other quantity of) spatial neighboring blocks used in AMVP for IBC, and/or one or more additional history-based BVPs.

Figure 23A:
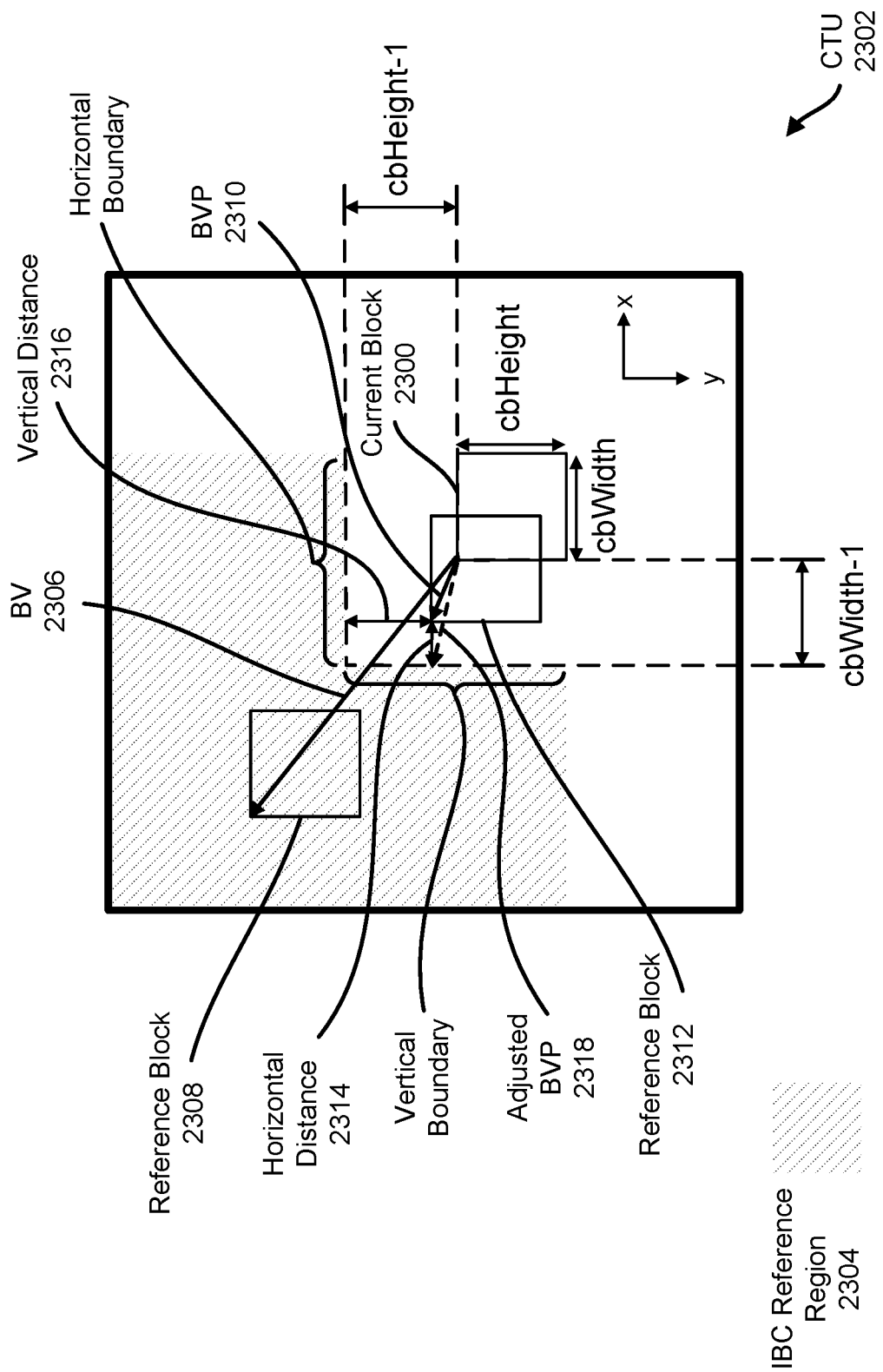
FIG. 23A, FIG. 23B, and FIG. 23C show examples of candidate BVP adjustment.
Figure 23B:
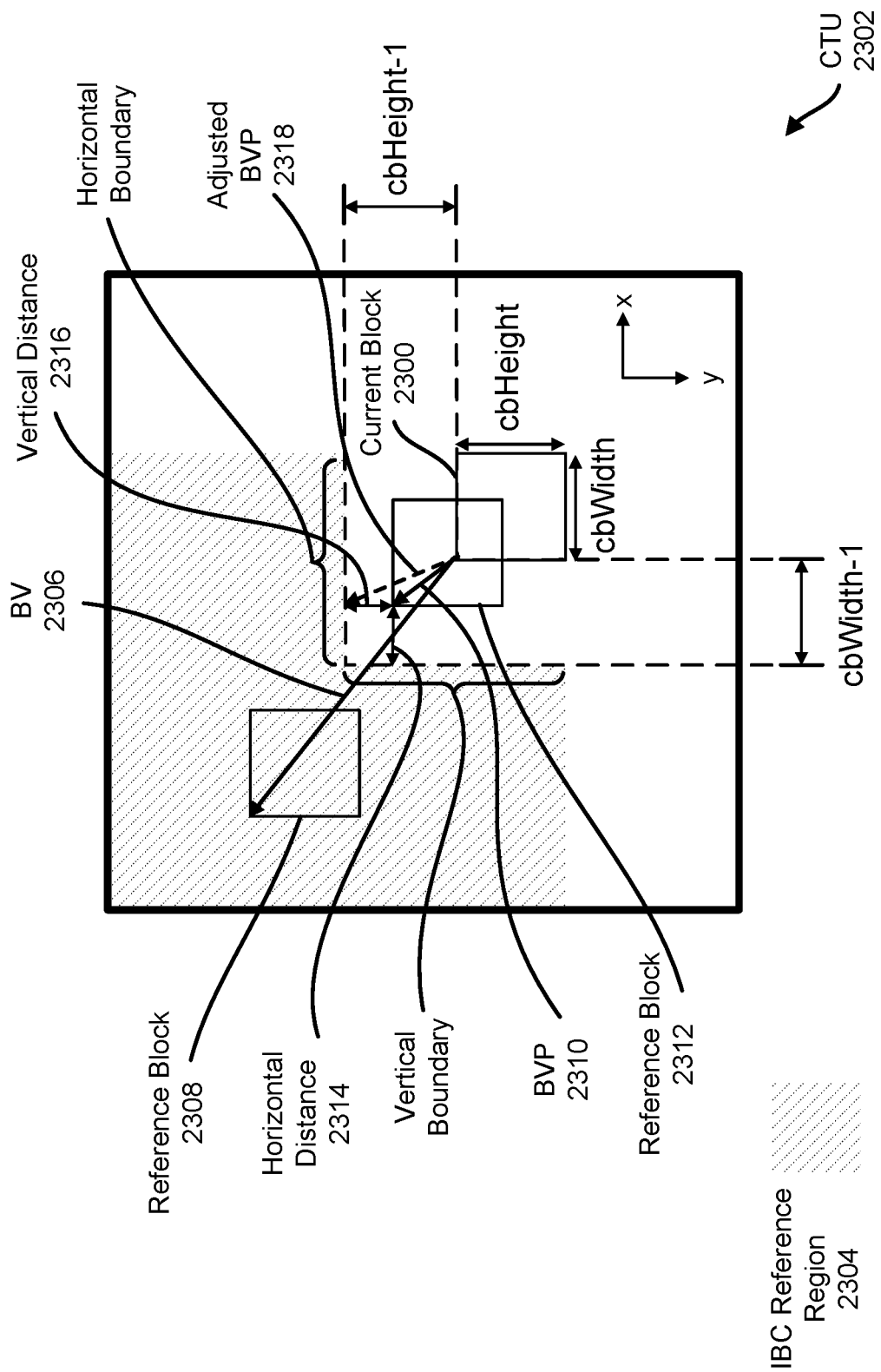
Figure 23C:
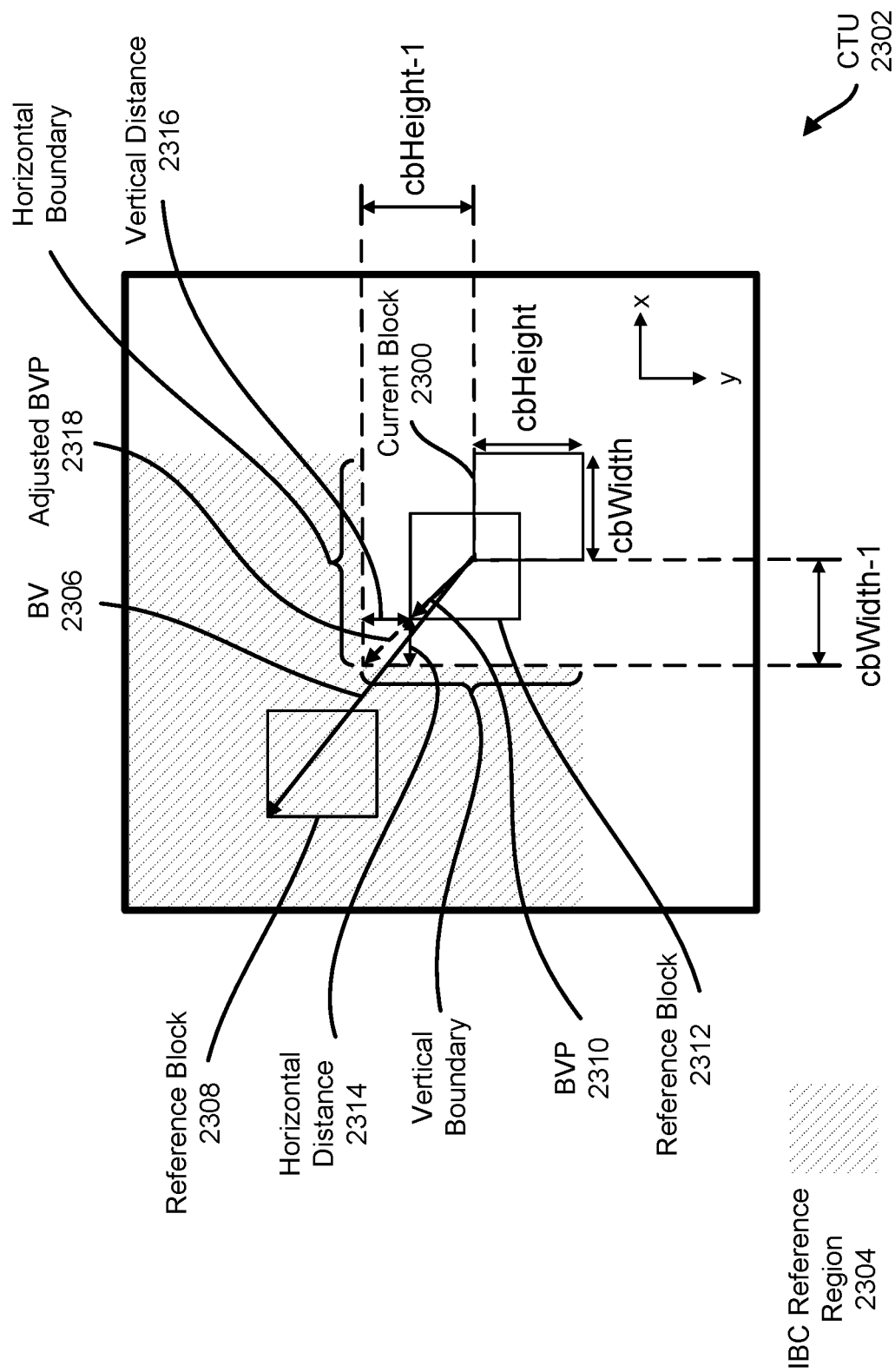

FIG. 23A, FIG. 23B, and FIG. 23C show examples of candidate BVP adjustment. An encoder (e.g., the encoder 200 as shown in FIG. 2) and/or a decoder (e.g., decoder 300 in FIG. 3) may use IBC to code a current block 2300 in a CTU 2302. The encoder and/or the decoder may code current block 2300 using IBC as described herein.

An encoder, using IBC, may search for a reference block in the same, current picture as that of the current block. Only a part of the current picture may be available for searching for a reference block. For example, only the part of the current picture that has been decoded prior to the encoding of the current block may be available for searching for a reference block. The part of the current picture available for searching for a reference block may be the IBC reference region. Searching only the part of the current picture that has been decoded prior to the encoding of the current block may ensure that the encoding and decoding systems may produce identical results, but may limit the IBC reference region.

Blocks may be scanned in a particular order. For example, blocks may be scanned from left-to-right, top-to-bottom using a z-scan (e.g., in HEVC, VVC, any other coding standard/format/protocol) to form the sequence order for encoding/decoding. Based on the z-scan, CTUs (not shown in FIG. 23A) to the left of and/or above CTU 2302 and blocks (not shown in FIG. 23A) to the left of and/or above current block 2300 within CTU 2302 may form an exemplary IBC reference region 2304 for determining a reference block to predict current block 2300. A different sequence order or picture partitioning method for encoding/decoding may be used for some video encoders and/or decoders. Using a different sequence order or picture partitioning method may change the IBC reference region 2304 accordingly.

One or more additional IBC reference region constraints may be placed on IBC reference region 2304, for example, in addition to the encoding/decoding sequence order. For example, the IBC reference region 2304 may be constrained based on a slice boundary, a tile boundary, WPP, and/or a limited memory for storing reference samples for predicting the current block 2300. Tiles may be used as part of a picture partitioning process for flexibly subdividing a picture into rectangular regions of CTUs such that coding dependencies between CTUs of different tiles are not allowed. WPP may be (similarly) used, as part of a picture partitioning process, for partitioning a picture into CTU rows. The partitioning into CTU rows may be such that dependencies between CTUs of different partitions are not allowed. Use of tiles and/or WPP may enable parallel processing of the picture partitions. One or more CTUs to the left of and/or above (not shown in FIG. 23A) the CTU 2302 may not be part of the IBC reference region 2304, for example, due to a limited memory for storing reference samples and/or due to one of the parallel processing approaches.

The IBC reference region 2304 may be constrained such that any BV (e.g., determined to code the current block 2300 based on IBC) indicates a displacement from the position of current block 2300 to the position of a reference block that does not overlap (or partially overlap) the current block 2300. The constraint with respect to the BV may result in an upside-down L-shaped gap between the current block 2300 and reference region 2304 as shown in FIG. 23A (or the gap between the current block 1700 and the reference region 1706). The L-shaped gap may have a width, on the left side of the current block 2300, of cbWidth−1 (where cbWidth is the width of current block 2300) and/or a length, above the current block 2300, of cbHeight−1 (where cbHeight is the height of current block 2300). The position of a block herein may refer to the position of the block's top-left sample. The position of a block may be determined by a position of another sample in the block in other example scenarios. The position of a sample in a picture may be indicated by a sample number in the horizontal direction (given by the variable x) and a sample number in the vertical direction (given by the variable y). The sample number in the horizontal direction and the sample number in the vertical direction may be relative to the origin (e.g., assigned (x, y)=(0,0)) of the picture coordinate system in the top left corner of the picture. The sample number in the horizontal direction and the sample number in the vertical direction may be relative to the top left sample of a block (e.g., a CTU) in which the sample is located. The positive direction may be rightwards in the horizontal x direction. A larger value of x may imply that the sample location is farther right in the positive, horizontal direction. The positive direction may be downwards in the vertical y direction. A larger value of y may imply that the sample location may be farther down in the positive, vertical direction.

The encoder may apply/use a block matching technique to determine a BV 2306. The BV 2306 may indicate the displacement from a position of current block 2300 to a position of a reference block 2308 (e.g., in accordance with intra block compensated prediction). The reference block 2308 may be a block, within IBC reference region 2304, that best matches the current block 2300. The BV 2306 may be constrained by the IBC reference region 2304 (e.g., as described herein) to indicate a displacement from the position of current block 2300 to the position of a reference block that is within IBC reference region 2304. The encoder may determine the best matching reference block from blocks, with positions within IBC reference region 2304, that may have been tested during a searching process. The encoder may determine that a reference block is the best matching reference block based on one or more cost criteria, such as a rate-distortion criterion (e.g., Lagrangian rate-distortion cost). The one or more cost criteria may be based on, for example, a difference (e.g., an SSD, an SAD, an SATD, and/or a difference determined based on a hash function) between the prediction samples of the reference block and the original samples of the current block. The reference block may comprise decoded (and/or reconstructed) samples of the current picture prior to being processed by in-loop filtering operations (e.g., deblocking and/or SAO filtering).

The encoder may determine a difference (e.g., a corresponding sample-by-sample difference) between the current block 2300 and the reference block 2308, for example, based on the determination of the reference block 2308 using IBC. The difference may be referred to as a prediction error and/or residual. The encoder may then store and/or send/signal, in/via a bitstream, the prediction error and/or the related prediction information for decoding by the decoder.

The encoder and/or decoder may determine a list of candidate BVPs for predictively coding the BV 2306. The encoder and/or the decoder may construct/determine the list of candidate BVPs from candidate BVPs derived from multiple sources. The multiple sources may comprise IBC information of spatially neighboring blocks of current block 2300, temporally co-located blocks of current block 2300, and/or history-based BVs. The encoder and/or the decoder may construct/determine the list of candidate BVPs for predictively coding the BV based on using AMVP for IBC or merge mode.

A candidate BVP (e.g., from sources such as BVs of spatially neighboring blocks, and/or history-based BVs) may indicate a displacement from the position of current block 2300 to the position of a reference block that may not be within the IBC reference region 2304 like BV 2306. The candidate BVP may not provide an accurate prediction of the BV 2306, for example, because the candidate BVP may indicate a displacement from the position of current block 2300 to the position of a reference block that may not be within the IBC reference region 2304 (e.g., unlike BV 2306). The quantity of bits needed to send/transmit a BVD, between BV 2306 and the candidate BVP, may be high because of the inaccurate prediction. Further, the BV may be predicted only by the BVP (e.g., in merge mode). A candidate BVP pointing outside of the IBC reference region may not be used to predict a BV because all/part of the samples of the reference block may not be decoded.

FIG. 23A shows an example of a candidate BVP. The candidate BVP 2310 (or simply BVP 2310) may indicate a displacement from the position of current block 2300 to the position of a reference block 2312. The reference block 2312 may not be within IBC reference region 2304.

An encoder and/or a decoder may determine that the BVP 2310 indicates a displacement from the position of current block 2300 to the position of reference block 2312 that is neither to the left of current block 2300 by at least an amount equal to the width (cbWidth) of current block 2300 nor above current block 2300 by at least an amount equal to the height (cbHeight) of current block 2300. For example, the BVP 2310 may indicate a displacement from the position of current block 2300 to the position of reference block 2312 in the L-shaped region surrounding the left and top part of current block 2300 or in the region to the right and below the L-shaped region, both/either of which may be outside the IBC reference region 2304. Non-inclusion of the L-shaped region (e.g., surrounding the left and top part of current block 2300, where the left part has a width equal to (cbWidth−1) and the top part has a height equal to (cbHeight−1)) in the IBC reference region 1704 is to prevent the BV 2306 from pointing to a reference block that overlaps (at least in part) with the current block 2300.

The encoder or the decoder may determine that the BVP 2310 indicates a displacement from the position of the current block 2300 to the position of the reference block 2312 that is neither to the left of the current block 2300 by at least an amount equal to cbWidth nor above the current block 2300 by at least an amount equal to cbHeight by determining that: a sum of the horizontal component $BVP_x$ of BVP 2310 and cbWidth is greater than zero; and a sum of the vertical component $BVP_y$ of BVP 2310 and cbHeight is greater than zero. The first and second determinations may be equivalently stated as determining that the horizontal component $BVP_x$ of BVP 2310 is greater than−cbWidth; and the vertical component $BVP_y$ of BVP 2310 is greater than −cbHeight. The first and second determinations may be equivalently stated as determining that a magnitude of the horizontal component $BVP_x$ of BVP 2310 is less than cbWidth; and a magnitude of the vertical component $BVP_y$ of BVP 2310 is less than cbHeight.

The encoder and/or the decoder may replace the BVP 2310 with an adjusted BVP. The encoder and/or the decoder may replace the BVP 2310 with an adjusted BVP, for example, based on determining that the position of the reference block 2312 is neither to the left of the current block 2300 by at least an amount equal to cbWidth nor above the current block 2300 by at least an amount equal to cbHeight. The adjusted BVP may indicate a displacement from the position of current block 2300 to a position of a reference block within the IBC reference region 2304. For example, the encoder and/or the decoder may determine and/or calculate: a horizontal distance 2314 from the position of the reference block 2312 to a closest vertical boundary of the IBC reference region 2304 of the current block 2300; and a vertical distance 2316 from the position of the reference block 2312 to a closest horizontal boundary of the IBC reference 2304 region of the current block 2300. The horizontal distance 2314 may be determined based on the sum of the cbWidth and the horizontal component $BVP_x$ of the BVP 2310. The vertical distance 2316 may be determined based on the sum of the cbHeight and the vertical component $BVP_y$ of the BVP 2310. The encoder and/or the decoder may replace the BVP 2310 with an adjusted BVP based on a comparison between the horizontal distance 2314 and the vertical distance 2316. The adjusted BVP may be based on one or more of: whether the horizontal distance 2314 is greater than the vertical distance 2316, whether the horizontal distance 2314 is less than the vertical distance 2316, and/or whether the horizontal distance 2314 is equal to the vertical distance 2316. The BVP adjustment may be in a manner such that a change in the location of the reference block 2312 may be minimal.

The encoder and/or the decoder may replace the BVP 2310 with an adjusted BVP 2318, for example, based on the horizontal distance 1714 being less than the vertical distance 1716. The encoder and/or decoder may replace the BVP 2310 with an adjusted BVP 2318 comprising a horizontal component equal to a negative of the width of the current block 2300 (−cbWidth) and a vertical component equal to the vertical component of BVP 2310, for example, based on the horizontal distance 1714 being less than the vertical distance 1716. FIG. 23A shows an example where the horizontal distance 2314 is less than the vertical distance 2316. The adjusted BVP 2318, in FIG. 23A, may comprise a horizontal component equal to −cbWidth and a vertical component equal to the vertical component of BVP 2310, for example, based on the horizontal distance 2314 being less than the vertical distance 2316.

The encoder and/or the decoder may replace BVP 2310 with an adjusted BVP 2318, for example, based on the horizontal distance 1714 being greater than the vertical distance 1716. The encoder and/or the decoder may replace the BVP 2310 with an adjusted BVP 2318 comprising a horizontal component equal to the horizontal component of BVP 2310 and a vertical component equal to a negative of the height of the current block (−cbHeight).

FIG. 23B shows an example where the horizontal distance 2314 is greater than the vertical distance 2316. The adjusted BVP 2318, in FIG. 23B, comprises a horizontal component equal to the horizontal component of BVP 2310 and a vertical component equal to −cbHeight, for example, based on the horizontal distance 2314 being greater than the vertical distance 2316.

The encoder and/or the decoder may replace the BVP 2310 with an adjusted BVP 2318, for example, based on the horizontal distance 2314 being equal to the vertical distance 2316. The encoder and/or the decoder may replace the BVP 2310 with an adjusted BVP 2318 comprising a horizontal component equal to −cbWidth and a vertical component equal to −cbHeight.

FIG. 23C shows an example where the horizontal distance 2314 is equal to the vertical distance 2316. The adjusted BVP 2318, in FIG. 23C, comprises a horizontal component equal to −cbWidth and a vertical component equal to −cbHeight, for example, based on the horizontal distance 2314 being equal to the vertical distance 2316.

Figure 24:
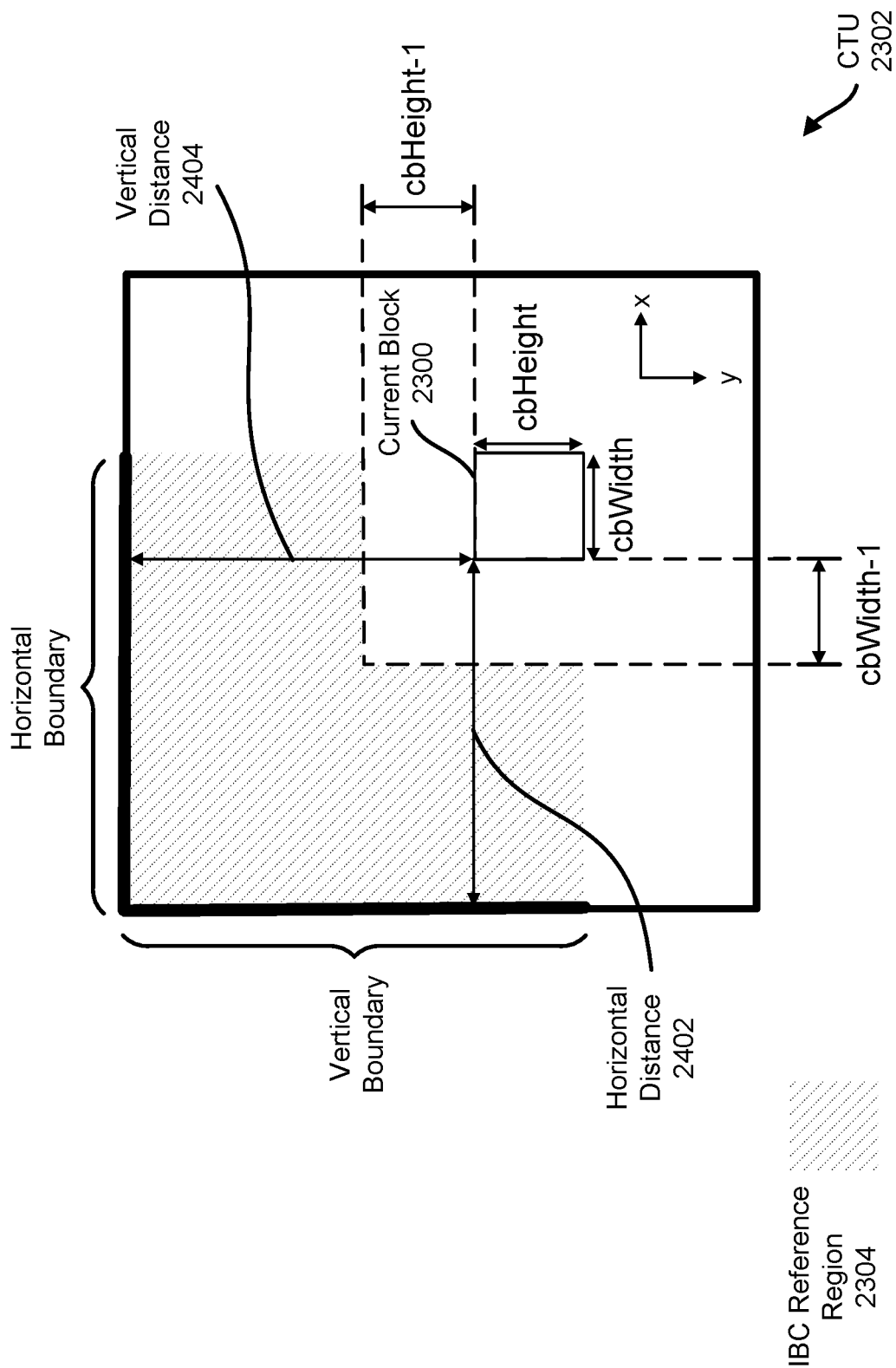
FIG. 24 shows an example distance check that may be performed before adjusting a BVP.

FIG. 24 shows an example distance check. The distance check may be performed before adjusting a BVP. The BVP may be the BVP 2310 as described herein with respect to FIG. 23A, FIG. 23B, and/or FIG. 23C. As described with respect to FIG. 23A, FIG. 23B, and/or FIG. 23C, one or both of the horizontal and vertical components of the BVP 2310 may be adjusted to generate the adjusted BVP 2324. The horizontal component of BVP 2310 may be adjusted to −cbWidth and/or the vertical component of BVP 2310 may be adjusted −cbHeight. The encoder and/or the decoder may determine a horizontal distance 2402 from the position of the current block 2300 to a vertical boundary (e.g., the left most vertical boundary) of the IBC reference region 2304 and/or may determine a vertical distance 2404 from the position of the current block 2300 to a horizontal boundary (e.g., the top-most horizontal boundary) of the IBC reference region 2304, for example, prior to making either or both adjustments to the horizontal and vertical components of the BVP 2310. The horizontal distance 2402 may be greater than or equal to cbWidth, for example, in order to make the adjustment to the horizontal component of BVP 2310 to −cbWidth. The vertical distance 2404 may be greater than or equal to cbHeight, for example, in order to make the adjustment to the vertical component of BVP 2310 to −cbHeight.

Replacement of the BVP 2310 based on the horizontal distance 2314 and the vertical distance 2316 may be performed as described above with respect to FIG. 23A, FIG. 23B, and/or FIG. 23C, for example, based on both the horizontal distance 2402 being greater than or equal to cbWidth and vertical distance 2404 being greater than or equal to −cbHeight. The BVP 2310 may be replaced by the adjusted BVP 2324, for example, based on both horizontal distance 2402 being greater than or equal to cbWidth and vertical distance 2404 being greater than or equal to −cbHeight. The BVP 2310 may be replaced by the adjusted BVP 2324 comprising: a horizontal component equal to −cbWidth and a vertical component equal to the vertical component of BVP 2310 based on horizontal distance 2314 being less than vertical distance 2316; a horizontal component equal to the horizontal component of BVP 2310 and a vertical component equal to −cbHeight based on horizontal distance 2314 being greater than vertical distance 2316; or a horizontal component equal to −cbWidth and a vertical component equal to −cbHeight based on horizontal distance 2314 being equal to vertical distance 2316.

The BVP 2310 may be replaced by an adjusted BVP comprising a horizontal component equal to −cbWidth and a vertical component equal to the vertical component of BVP 2310, for example, based on the horizontal distance 2402 being greater than or equal to cbWidth and vertical distance 2404 being less than −cbHeight. The BVP 2310 may be replaced by an adjusted BVP comprising a horizontal component equal to the horizontal component of BVP 2310 and a vertical component equal to −cbHeight, for example, based on horizontal distance 2402 being less than cbWidth and vertical distance 2404 being greater than or equal to −cbHeight.

The IBC reference region 2304, as shown in FIG. 23A, FIG. 23B, FIG. 23C, and/or FIG. 24, is merely exemplary, and an IBC reference region may be different from the IBC reference region 2304. The methods, devices, and systems described above with respect to FIG. 23A, FIG. 23B, FIG. 23C, and/or FIG. 24 may be used for/applied to IBC reference regions different than the IBC reference region 2304. For example, the IBC reference region 2304 may be replaced by an IBC reference region determined based on a different set of IBC reference region constraints. The IBC reference region 2304 may be (further) constrained to include a number/quantity of decoded or reconstructed samples that may be stored in a limited memory size (e.g., IBC reference sample memory). The size of the IBC reference sample memory may be limited based on being implemented on-chip with the encoder and/or on-chip with the decoder. The IBC reference region 2304 may be increased in size by using a larger size IBC reference sample memory off-chip from the encoder and/or off-chip from the decoder. Using an off-chip memory may require higher memory bandwidth requirements and/or increased delay in writing and reading samples (e.g., in the IBC reference region 2304) to and/or from the IBC reference sample memory. The IBC reference region 2304 may be determined and/or be constrained in accordance with the various considerations as described above with reference to the IBC reference regions 1706, 2100, and 2118.

FIG. 25 shows an example method for replacing a BVP with an adjusted BVP. The method 2500 as shown in FIG. 25 may be implemented by an encoder and/or by a decoder (e.g., the encoder 200 as shown in FIG. 2 and/or the decoder 300 as shown in FIG. 3).

At step 2502, a sum, of a horizontal component of a BVP and a width (cbWidth) of a current block, may be determined to be greater than zero, and a sum, of a vertical component of the BVD and a height (cbHeight) of the current block, may be determined to be greater than zero. The BVP may indicate a displacement from a position of the current block to a position of a reference block.

At step 2504, a first horizontal distance and a first vertical distance may be determined. The first horizontal distance may be a distance from the position of the reference block to a first vertical boundary of an IBC reference region of the current block. The first vertical distance may be a distance from the position of the reference block to a first horizontal boundary of the IBC reference region of the current block. The first horizontal distance may be determined/calculated based on a sum of cbWidth and the horizontal component of the BVP. The first first vertical distance may be determined/calculated based on a sum of cbHeight and the vertical component of the BVP.

At step 2506, the BVP may be replaced with an adjusted BVP. The BVP may be replaced with an adjusted BWP, for example, based on a comparison between the first horizontal distance and the first vertical distance. The BVP may be replaced with an adjusted BVP comprising a horizontal component equal to −cbWidth and a vertical component equal to the vertical component of the BVP, for example, based on the first horizontal distance being less than the first vertical distance. The BVP may be replaced with an adjusted BVP comprising a horizontal component equal to the horizontal component of the BVP and a vertical component equal to −cbHeight, for example, based on the first horizontal distance being greater than the first vertical distance. The BVP may be replaced with an adjusted BVP comprising a horizontal component equal to −cbWidth and a vertical component equal to −cbHeight, for example, based on the first horizontal distance being equal to the first vertical distance.

The BVP may be replaced with an adjusted BVP, for example, based on a second horizontal distance from the position of the current block to a second vertical boundary of the IBC reference region of the current block being greater than cbWidth; and a second vertical distance from the position of the current block to a second horizontal boundary of the IBC reference region of the current block being greater than cbHeight. The second vertical boundary of the IBC reference region may be the left-most vertical boundary of the IBC reference region; and the second horizontal boundary of the IBC reference region may be the top-most horizontal boundary of the IBC reference region.

The method 2500 may comprise determining a BV based on the adjusted BVP. The method 2500 may comprise predicting a BV based on the adjusted BVP. For example, the BV may be predicted based on the adjusted BVP in accordance with AMVP and/or a merge mode. The method 2500 may comprise adding the adjusted BVP to a list candidate BVPs. The list of candidate BVPs may be for the AMVP and/or the merge mode.

Various examples herein may be implemented in hardware (e.g., using analog and/or digital circuits), in software (e.g., through execution of stored/received instructions by one or more general purpose or special-purpose processors), and/or as a combination of hardware and software. Various examples herein may be implemented in an environment comprising a computer system or other processing system.

Figure 26:
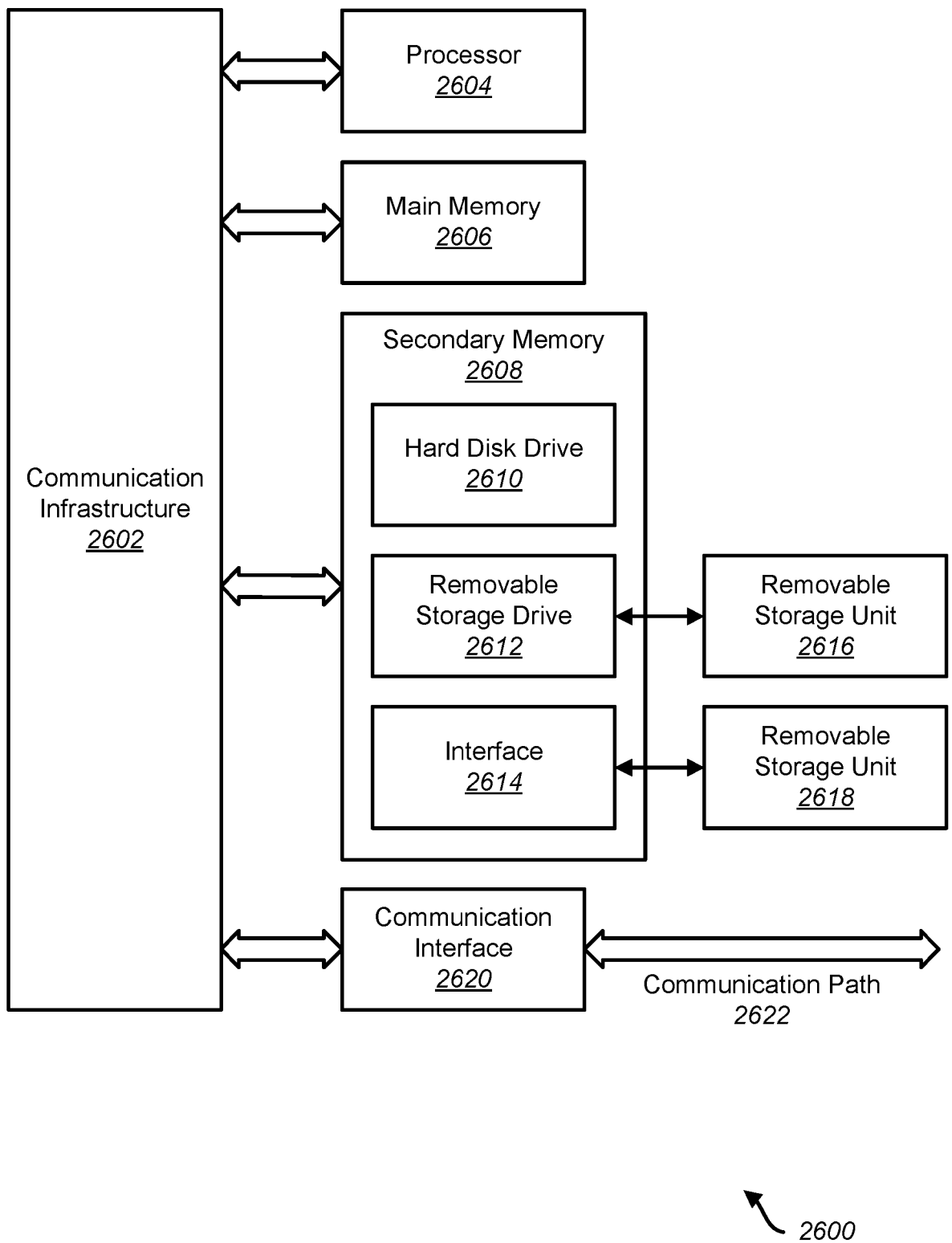
FIG. 26 shows an example computer system that may be used any of the examples described herein.

FIG. 26 shows an example computer system that may be used any of the examples described herein. For example, the example computer system 2600 shown in FIG. 26 may implement one or more of the methods described herein. For example, various devices and/or systems described herein (e.g., in FIGS. 1, 2, and 3) may be implemented in the form of one or more computer systems 2600. Furthermore, each of the steps of the flowcharts depicted in this disclosure may be implemented on one or more computer systems 2600.

The computer system 2600 may comprise one or more processors, such as a processor 2604. The processor 2604 may be a special purpose processor, a general purpose processor, a microprocessor, and/or a digital signal processor. The processor 2604 may be connected to a communication infrastructure 2602 (for example, a bus or network). The computer system 2600 may also comprise a main memory 2606 (e.g., a random access memory (RAM)), and/or a secondary memory 2608.

The secondary memory 2608 may comprise a hard disk drive 2610 and/or a removable storage drive 2612 (e.g., a magnetic tape drive, an optical disk drive, and/or the like). The removable storage drive 2612 may read from and/or write to a removable storage unit 2616. The removable storage unit 2616 may comprise a magnetic tape, optical disk, and/or the like. The removable storage unit 2616 may be read by and/or may be written to the removable storage drive 2612. The removable storage unit 2616 may comprise a computer usable storage medium having stored therein computer software and/or data.

The secondary memory 2608 may comprise other similar means for allowing computer programs or other instructions to be loaded into the computer system 2600. Such means may include a removable storage unit 2618 and/or an interface 2614. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2618 and interfaces 2614 which may allow software and/or data to be transferred from the removable storage unit 2618 to the computer system 2600.

The computer system 2600 may also comprise a communications interface 2620. The communications interface 2620 may allow software and data to be transferred between the computer system 2600 and external devices. Examples of the communications interface 2620 may include a modem, a network interface (e.g., an Ethernet card), a communications port, etc. Software and/or data transferred via the communications interface 2620 may be in the form of signals which may be electronic, electromagnetic, optical, and/or other signals capable of being received by the communications interface 2620. The signals may be provided to the communications interface 2620 via a communications path 2622. The communications path 2622 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2616 and 2618 or a hard disk installed in the hard disk drive 2610. The computer program products may be means for providing software to the computer system 2600. The computer programs (which may also be called computer control logic) may be stored in the main memory 2606 and/or the secondary memory 2608. The computer programs may be received via the communications interface 2620. Such computer programs, when executed, may enable the computer system 2600 to implement the present disclosure as discussed herein. In particular, the computer programs, when executed, may enable the processor 2604 to implement the processes of the present disclosure, such as any of the methods described herein. Accordingly, such computer programs may represent controllers of the computer system 2600.

Figure 27:
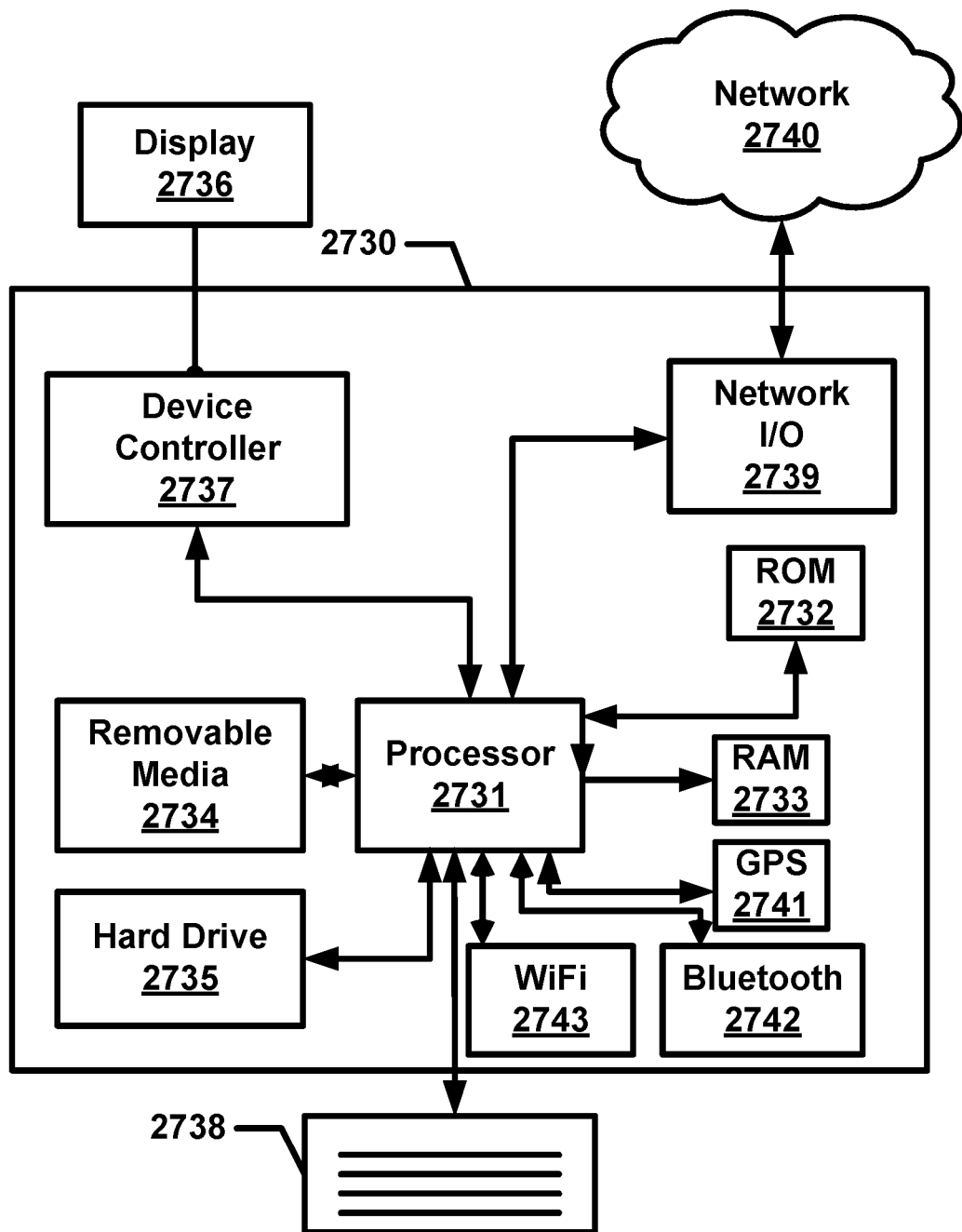
FIG. 27 shows example elements of a computing device that may be used to implement any of the various devices described herein.

FIG. 27 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2730 may include one or more processors 2731, which may execute instructions stored in the random-access memory (RAM) 2733, the removable media 2734 (such as a Universal Serial Bus (USB) drive, compact disk (CD) or digital versatile disk (DVD), or floppy disk drive), or any other desired storage medium. Instructions may also be stored in an attached (or internal) hard drive 2735. The computing device 2730 may also include a security processor (not shown), which may execute instructions of one or more computer programs to monitor the processes executing on the processor 2731 and any process that requests access to any hardware and/or software components of the computing device 2730 (e.g., ROM 2732, RAM 2733, the removable media 2734, the hard drive 2735, the device controller 2737, a network interface 2739, a GPS 2741, a Bluetooth interface 2742, a WiFi interface 2743, etc.). The computing device 2730 may include one or more output devices, such as the display 2736 (e.g., a screen, a display device, a monitor, a television, etc.), and may include one or more output device controllers 2737, such as a video processor. There may also be one or more user input devices 2738, such as a remote control, keyboard, mouse, touch screen, microphone, etc. The computing device 2730 may also include one or more network interfaces, such as a network interface 2739, which may be a wired interface, a wireless interface, or a combination of the two. The network interface 2739 may provide an interface for the computing device 2730 to communicate with a network 2740 (e.g., a RAN, or any other network). The network interface 2739 may include a modem (e.g., a cable modem), and the external network 2740 may include communication links, an external network, an in-home network, a provider's wireless, coaxial, fiber, or hybrid fiber/coaxial distribution system (e.g., a DOCSIS network), or any other desired network. Additionally, the computing device 2730 may include a location-detecting device, such as a global positioning system (GPS) microprocessor 2741, which may be configured to receive and process global positioning signals and determine, with possible assistance from an external server and antenna, a geographic position of the computing device 2730.

The example in FIG. 27 may be a hardware configuration, although the components shown may be implemented as software as well. Modifications may be made to add, remove, combine, divide, etc. components of the computing device 2730 as desired. Additionally, the components may be implemented using basic computing devices and components, and the same components (e.g., processor 2731, ROM storage 2732, display 2736, etc.) may be used to implement any of the other computing devices and components described herein. For example, the various components described herein may be implemented using computing devices having components such as a processor executing computer-executable instructions stored on a computer-readable medium, as shown in FIG. 27. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine, one or more candidate block vector predictors ("BVP"s), wherein each of the one or more candidate BVPs comprises at least one of: a horizontal component determined based on a width of a current block, or a vertical component determined based on a height of the current block. The computing device may determine a block vector (BV) for the current block based on a list of candidate BVPs that is modified to include at least one candidate BVP, from among the one or more candidate BVPs, that indicates a displacement from the current block to a position in an intra block copy (IBC) reference region. The computing device may also perform one or more additional operations. The at least one candidate BVP is selected from among the one or more candidate BVPs based on: a horizontal distance as a sum of a horizontal component of a BVP, in the list of candidate BVPs, and a width of a current block being greater than zero; and a vertical distance as a sum of a vertical component of the BVP, in the list of candidate BVPs, and a height of the current block being greater than zero. The width of the current block may be cbWidth. The height of the current block may be cbHeight. The horizontal component of a candidate BVP, among the least one candidate BVP, may be equal to −cbWidth; and the vertical component of the candidate BVP may be equal to −cbHeight. The horizontal component of a candidate BVP, among the least one candidate BVP, may be equal to −cbWidth; and the vertical component of the candidate BVP is equal to a vertical component of a BVP in the list of candidate BVPs. The vertical component of a candidate BVP, among the least one candidate BVP, may be equal to −cbHeight; and the horizontal component of the candidate BVP may be equal to a horizontal component of a BVP in the list of candidate BVPs. The at least one candidate BVP may be selected from among the one or more candidate BVPs based on: determining respective block vector differences (BVDs) for each of the one or more candidate BVPs; and selecting the at least one candidate BVP based on a BVD for the at least one candidate BVP being the smallest among the respective BVDs. The determining the one or more candidate BVPs may be based on determining that a BVP in the list of candidate BVPs is outside the IBC reference region. The determining the one or more candidate BVPs may be based on determining that: a horizontal component of a BVP is greater than-cbWidth; and a vertical component of the BVP is greater than −cbHeight. The computing device may comprise an encoder. The computing device may send an indication of the at least one candidate BVP to a decoder. The computing device may replace at least one BVP, in the list of candidate BVPs, with the at least one candidate BVP. The computing device may determine, based on the BV and a candidate BVP of the at least one candidate BVP, a block vector difference (BVD). The computing device may send an indication of the BVD to a decoder. The computing device may encode the current block based on a reference block indicated by the BV. The computing device may receive an indication of a block vector difference (BVD). The computing device may determine, based on the BVD and a candidate BVP of the at least one candidate BVP, the BV. The computing device may decode the current block based on a reference block indicated by the BV. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block using the at least one candidate BVP. A computer-readable medium may store instructions that, when executed, cause performance of the described method, additional operations and/or include the additional elements.

A computing device may perform a method comprising multiple operations. The computing device may determine that: a horizontal distance as a sum of a horizontal component of a block vector predictor (BVP), in a list of candidate BVPs, and a width of a current block, is greater than zero; and a vertical distance as a sum of a vertical component of the BVP and a height of the current block is greater than zero. The computing device may, based on the determining, replace the BVP, in the list of candidate BVPs, with an adjusted BVP. The computing device may use the list of candidate BVPs to determine a block vector (BV) for the current block. The computing device may also perform one or more additional operations. The adjusted BVP may comprise at least one of: a horizontal component determined based on the width of the current block; or a vertical component determined based on the height of the current block. The width of the current block may be cbWidth, and the height of the current block may cbHeight. A horizontal component of the adjusted BVP may be equal to −cbWidth. A vertical component of the adjusted BVP may be equal to −cbHeight. A horizontal component of the adjusted BVP may be equal to −cbWidth, and a vertical component of the adjusted BVP may be equal to a vertical component of the BVP. A vertical component of the adjusted BVP may be equal to −cbHeight, and a horizontal component of the adjusted BVP may be equal to a horizontal component of the BVP. The replacing the BVP with the adjusted BVP may comprise selecting the adjusted BVP, from one or more candidate BVPs, based on a block vector difference (BVD) for the adjusted BVP being smallest among BVDs determined for each of the one or more candidate BVPs. The replacing the BVP with the adjusted BVP may comprise determining, by a computing device, one or more candidate BVP. Each of the one or more candidate BVPs may comprise at least one of: a horizontal component determined based on a width of a current block, or a vertical component determined based on a height of the current block. The one or more candidate BVPs may comprise one or more of: a first candidate BVP comprising: a horizontal component equal to −cbWidth; and a vertical component equal to the vertical component of the BVP; a second BVP candidate comprising: a horizontal component equal to the horizontal component of the BVP; and a vertical component equal to −cbHeight; and a third BVP candidate comprising: a horizontal component equal to −cbWidth; and a vertical component equal to −cbHeight. The replacing the BVP with the adjusted BVP may comprise the replacing the BVP with a selected one of the one or more candidate BVPs. The computing device may determine one or more valid candidate BVPs in the one or more candidate BVPs. The replacing the BVP with the adjusted BVP may comprise the replacing the BVP with a selected one of the one or more valid candidate BVPs. The computing device may send an indication of the adjusted BVP. The computing device may use the adjusted BVP to determine a block vector difference (BVD). The computing device may receive an indication of the adjusted BVP. The computing device may use the adjusted BVP to determine the BV. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block using the adjusted BVP. A computer-readable medium may store instructions that, when executed, cause performance of the described method, additional operations and/or include the additional elements.

A computing device may perform a method comprising multiple operations. The computing device may determine that a block vector predictor (BVP), in a list of candidate BVPs, is outside an intra block copy (IBC) reference region associated with a current block based on the BVP indicating a displacement from the current block to a position outside the IBC reference region. The computing device may, based on the determining, replace the BVP, in the list of candidate BVPs, with an adjusted BVP indicating a displacement from the current block to a position in an intra block copy (IBC) reference region. The computing device may use the list of candidate BVPs to determine a block vector (BV) for the current block. The computing device may also perform one or more additional operations. The determining that the BVP is outside the IBC associated with the current block may be based on: a horizontal distance as a sum of a horizontal component of the BVP and a width of the current block being greater than zero; and a vertical distance as a sum of a vertical component of the BVP and a height of the current block being greater than zero. The computing device may select the adjusted BVP from the one or more candidate BVPs comprising at least one of: a horizontal component determined based on a width of a current block; or a vertical component determined based on a height of the current block. The replacing the BVP with the adjusted BVP may comprise selecting the adjusted BVP, from one or more candidate BVPs, based on a block vector difference (BVD) for the adjusted BVP being smallest among BVDs determined for each of the one or more candidate BVPs. The computing device may send an indication of the adjusted BVP to a receiving device. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block using the adjusted BVP. A computer-readable medium may store instructions that, when executed, cause performance of the described method, additional operations and/or include the additional elements.

A computing device may perform a method comprising multiple operations. The computing device may calculate: a horizontal distance as a sum of a horizontal component of a block vector predictor (BVP) and a width of a current block of a video frame; and a vertical distance as a sum of a vertical component of the BVP and a height of the current block. The BVP may indicate a position of a reference block relative to a position of the current block. The computing device may determine that the horizontal distance is greater than zero and that the vertical distance is greater than zero. The computing device may replace, based on the determining and based on a comparison between the horizontal distance and the vertical distance, the BVP with an adjusted BVP. A horizontal component of the adjusted BVP may be based on the width of the current block. A vertical component of the adjusted BVP may be based on the height of the current block. The computing device may also perform one or more additional operations. The width of the current block may cbWidth, and the height of the current block may be cbHeight. The computing device may, based on the horizontal distance being less than the vertical distance, set: the horizontal component of the adjusted BVP equal to −cbWidth; and the vertical component of the adjusted BVP equal to the vertical component of the BVP. The computing device may, based on the horizontal distance being greater than the vertical distance, set: the horizontal component of the adjusted BVP equal to the horizontal component of the BVP; and the vertical component of the adjusted BVP equal to −cbHeight. The computing device may, based on the horizontal distance being equal to the first vertical distance, set: the horizontal component of the adjusted BVP equal to −cbWidth; and the vertical component of the adjusted BVP equal to −cbHeight. The replacing the BVP with the adjusted BVP may be further based on at least one of: a second horizontal distance from a position of the current block to a left-most vertical boundary of an inter-intra block copy (IBC) reference region being greater than the width of the current block; or a second vertical distance from the position of the current block to a top-most horizontal boundary of the IBC reference region of the current block being greater than the height of the current block. The computing device may receive an indication of a block vector difference (BVD). The computing device may determine a block vector (BV) of the current block as a combination of the adjusted BVP and a block vector difference (BVD). The computing device may determine a block vector difference (BVD) as a combination of block vector (BV) of the current block and the adjusted BVP. The computing device may send an indication of a block vector difference (BVD). The computing device may add the adjusted BVP to a list of candidate BVPs associated with advanced motion vector prediction (AMVP) or associated with a merge mode. The computing device may use the adjusted BVP for encoding or decoding the current block. The determining the one or more candidate BVPs may be based on determining that a BVP in the list of candidate BVPs is outside the IBC reference region. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block using the adjusted BVP. A computer-readable medium may store instructions that, when executed, cause performance of the described method, additional operations and/or include the additional elements.

A computing device may perform a method comprising multiple operations. The computing device may calculate: a horizontal distance from a position of a reference block to a vertical boundary of an intra block copy (IBC) reference region of a current block of a video frame; a vertical distance from the position of the reference block to a horizontal boundary of the IBC reference region of the current block. The computing device may determine that: a sum of a horizontal component of a block vector predictor (BVP) and a width of the current block is greater than zero; and a sum of a vertical component of the BVP and a height of the current block, is greater than zero. The BVP may indicate the position of the reference block relative to a position of a current block. The computing device may replace, based on the determining and based on a comparison between the horizontal distance and the vertical distance, the BVP with an adjusted BVP. The computing device may also perform one or more additional operations. The width of the current block may be cbWidth, and the height of the current block may be cbHeight. The computing device may, based on the horizontal distance being less than the vertical distance, set: a horizontal component of the adjusted BVP equal to −cbWidth; and a vertical component of the adjusted BVP equal to a vertical component of the BVP. The computing device may, based on the horizontal distance being greater than first vertical distance, set: a horizontal component of the adjusted BVP equal to a horizontal component of the BVP; and a vertical component of the adjusted BVP equal to −cbHeight. The computing device may, based on the horizontal distance being equal to the first vertical distance, set: a horizontal component of the adjusted BVP equal to −cbWidth; and a vertical component of the adjusted BVP equal to −cbHeight. The replacing the BVP with the adjusted BVP may be further based on at least one of: a second horizontal distance from a position of the current block to a second vertical boundary of the IBC reference region of the current block being greater than the width of the current block, wherein the second vertical boundary of the IBC reference region is a left-most vertical boundary of the IBC reference region; and a second vertical distance from the position of the current block to a second horizontal boundary of the IBC reference region of the current block being greater than the height of the current block, wherein the second horizontal boundary of the IBC reference region is a top-most horizontal boundary of the IBC reference region. The horizontal distance may be based on the sum of the horizontal component of the BVP and the width of the current block. The vertical distance may be based on the sum of the vertical component of the BVP and the height of the current block. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block using the adjusted BVP. A computer-readable medium may store instructions that, when executed, cause performance of the described method, additional operations and/or include the additional elements.

A computing device may perform a method comprising multiple operations. The computing device may determine, based on a block vector predictor (BVP) of a reference block, that the reference block overlaps with a current block of a video frame. The computing device may, based on the determining, calculate: a horizontal distance from a position of the reference block to a vertical boundary of an intra block copy (IBC) reference region of the current block; and a vertical distance from the position of the reference block to a horizontal boundary of the IBC reference region of the current block. The computing device may replace, based on a comparison of the horizontal distance and the vertical distance, the BVP with an adjusted BVP. The computing device may also perform one or more additional operations. The width of the current block may be cbWidth, and the height of the current block may be cbHeight. The replacing the BVP with the adjusted BVP may comprise setting, based on the horizontal distance being less than the vertical distance: a horizontal component of the adjusted BVP equal to −cbWidth; and a vertical component equal of the adjusted BVP to a vertical component of the BVP. The replacing the BVP with the adjusted BVP may comprise setting, based on the horizontal distance being greater than the vertical distance: a horizontal component of the adjusted BVP equal to a horizontal component of the BVP; and a vertical component equal of the adjusted BVP to −cbHeight. The replacing the BVP with the adjusted BVP may comprise setting, based on the horizontal distance being equal to the first vertical distance: a horizontal component of the adjusted BVP equal to −cbWidth, wherein cbWidth is a width of the current block; and a vertical component of the adjusted BVP equal to −cbHeight. The computing device may calculate: a second horizontal distance from the position of the current block to a second vertical boundary of the IBC reference region, wherein the second vertical boundary is a left-most vertical boundary of the IBC reference region; and a second vertical distance from the position of the current block to a second horizontal boundary of the IBC reference region, wherein the second horizontal boundary is a top-most horizontal boundary of the IBC reference region. The replacing the BVP with the adjusted BVP may comprise setting, based on the second horizontal distance being greater than a width of the current block and the second vertical distance being less than a height of the current block: a horizontal component of the adjusted BVP equal to −cbWidth; and a vertical component of the adjusted BVP equal to a vertical component of the BVP. The replacing the BVP with the adjusted BVP may comprise setting, based on the second horizontal distance being less than a width of the current block and the second vertical distance being greater than a height of the current block: a horizontal component of the adjusted BVP equal to a horizontal component of the BVP; and a vertical component of the adjusted BVP equal to −cbHeight. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block using the adjusted BVP. A computer-readable medium may store instructions that, when executed, cause performance of the described method, additional operations and/or include the additional elements.

A computing device may perform a method comprising multiple operations. The computing device may determine, based on a block vector predictor (BVP) of a reference block, that the reference block overlaps with a current block of a video frame. The computing device may, based on the determining, calculate: a first horizontal distance from the position of the current block to a first vertical boundary of an intra block copy (IBC) reference region of the current block; and a first vertical distance from the position of the current block to a first horizontal boundary of the IBC reference region of the current block. The computing device may replace the BVP with an adjusted BVP based on the first horizontal distance and the first vertical distance. The computing device may also perform one or more additional operations. The width of the current block may be cbWidth, and the height of the current block may be cbHeight. The replacing the BVP with the adjusted BVP may comprise setting, based on the first horizontal distance being greater than a width of the current block and the first vertical distance being less than a height of the current block: a horizontal component of the adjusted BVP equal to −cbWidth; and a vertical component of the adjusted BVP equal to a vertical component of the BVP. The replacing the BVP with the adjusted BVP may comprise setting, based on the first horizontal distance being less than a width of the current block and the first vertical distance being greater than a height of the current block: a horizontal component of the adjusted BVP equal to a horizontal component of the BVP; and a vertical component of the adjusted BVP equal to −cbHeight. The computing device may, based on the first horizontal distance being greater than a width of the current block and the first vertical distance being greater than a height of the current block, calculate: a second horizontal distance from the position of the reference block to a second vertical boundary of the IBC reference region of the current block; and a second vertical distance from the position of the reference block to a second horizontal boundary of the IBC reference region of the current block. The replacing the BVP with the adjusted BVP may comprise setting, based on the second horizontal distance being less than the second vertical distance: a horizontal component of the adjusted BVP equal to −cbWidth; and a vertical component of the adjusted BVP equal to a vertical component of the BVP. The replacing the BVP with the adjusted BVP may comprises setting, based on the second horizontal distance being greater than the second vertical distance: a horizontal component of the adjusted BVP equal to a horizontal component of the BVP; and a vertical component of the adjusted BVP equal to −cbHeight. The replacing the BVP with the adjusted BVP may comprise setting, based on the second horizontal distance being equal to the second vertical distance: a horizontal component of the adjusted BVP equal to −cbWidth; and a vertical component of the adjusted BVP equal to −cbHeight. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block using the adjusted BVP. A computer-readable medium may store instructions that, when executed, cause performance of the described method, additional operations and/or include the additional elements.

A computing device may perform a method comprising multiple operations. The computing device may determine, based on a block vector predictor (BVP) of a reference block, that the reference block overlaps with a current block of a video frame. The computing device may, based on the determining, calculate: a first horizontal distance from the position of the reference block to a first vertical boundary of an intra block copy (IBC) reference region of the current block; a first vertical distance from the position of the reference block to a first horizontal boundary of the IBC reference region of the current block. The computing device may replace the BVP with an adjusted BVP based on a comparison between the first horizontal distance and the first vertical distance. The computing device may also perform one or more additional operations. The width of the current block may be cbWidth, and the height of the current block may be cbHeight. The determining that the reference block overlaps with the current block may comprise determining that: a sum, of a horizontal component of the BVP and a width of the current block, is greater than zero; and a sum, of a vertical component of the BVP and a height of the current block, is greater than zero. The replacing the BVP with the adjusted BVP may be further based on: a second horizontal distance from the position of the current block to a second vertical boundary of the IBC reference region of the current block being greater than a width of the current block; and a second vertical distance from the position of the current block to a second horizontal boundary of the IBC reference region of the current block being greater than a height of the current block. The second vertical boundary of the IBC reference region may be the left-most vertical boundary of the IBC reference region. The second horizontal boundary of the IBC reference region may be the top-most horizontal boundary of the IBC reference region. The replacing the BVP with the adjusted BVP may comprise setting, based on the first horizontal distance being less than the first vertical distance: a horizontal component of the adjusted BVP equal to −cbWidth; and a vertical component of the adjusted BVP equal to a vertical component of the BVP. The replacing the BVP with the adjusted BVP may comprise setting, based on the first horizontal distance being greater than the first vertical distance: a horizontal component of the adjusted BVP equal to a horizontal component of the BVP; and a vertical component of the adjusted BVP equal to −cbHeight. The replacing the BVP with the adjusted BVP may comprise setting, based on the first horizontal distance being equal to the first vertical distance: a horizontal component of the adjusted BVP equal to −cbWidth; and a vertical component of the adjusted BVP equal to −cbHeight. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block using the adjusted BVP. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device.

The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   determining, by a computing device:
      a horizontal distance as a sum of a horizontal component of a block vector predictor (BVP) and a width of a current block of a video frame; and
      a vertical distance as a sum of a vertical component of the BVP and a height of the current block, wherein the BVP indicates a position of a reference block relative to a position of the current block;
   replacing, based on the horizontal distance being greater than zero and the vertical distance being greater than zero and based on a comparison between the horizontal distance and the vertical distance, the BVP with an adjusted BVP comprising a horizontal component that is based on the width of the current block or a vertical component that is based on the height of the current block, wherein the adjusted BVP minimizes a change to the position of the reference block.

2. The method of claim 1, wherein the width of the current block is cbWidth, and wherein the method further comprises:
   based on the horizontal distance being less than the vertical distance, setting:
      the horizontal component of the adjusted BVP equal to −cbWidth; and
      the vertical component of the adjusted BVP equal to the vertical component of the BVP.

3. The method of claim 1, wherein the height of the current block is cbHeight, and wherein the method further comprises:
   based on the horizontal distance being greater than the vertical distance, setting:
      the horizontal component of the adjusted BVP equal to the horizontal component of the BVP; and
      the vertical component of the adjusted BVP equal to −cbHeight.

4. The method of claim 1, wherein the width of the current block is cbWidth and the height of the current block is cbHeight, and wherein the method further comprises:
   based on the horizontal distance being equal to the first vertical distance, setting:
      the horizontal component of the adjusted BVP equal to −cbWidth; and
      the vertical component of the adjusted BVP equal to −cbHeight.

5. The method of claim 1, wherein the replacing the BVP with the adjusted BVP is further based on at least one of:
   a second horizontal distance from a position of the current block to a left-most vertical boundary of an intra block copy (IBC) reference region being greater than the width of the current block; or
   a second vertical distance from the position of the current block to a top-most horizontal boundary of the IBC reference region of the current block being greater than the height of the current block.

6. The method of claim 1, further comprising determining a block vector (BV) as a combination of the adjusted BVP and a block vector difference (BVD).

7. The method of claim 1, further comprising adding the adjusted BVP to a list of candidate BVPs associated with advanced motion vector prediction (AMVP) or associated with a merge mode.

8. The method of claim 1, further comprising using the adjusted BVP for encoding or decoding the current block.

9. A method comprising:
determining, by a computing device:
a horizontal distance from a position of a reference block to a vertical boundary of an intra block copy (IBC) reference region of a current block of a video frame;
a vertical distance from the position of the reference block to a horizontal boundary of the IBC reference region of the current block;
determining that:
a sum of a horizontal component of a block vector predictor (BVP) and a width of the current block is greater than zero; and
a sum of a vertical component of the BVP and a height of the current block, is greater than zero, wherein the BVP indicates the position of the reference block relative to a position of a current block; and
replacing, based on the determining and based on a comparison between the horizontal distance and the vertical distance, the BVP with an adjusted BVP that minimizes a change to the position of the reference block.

10. The method of claim 9, wherein the width of the current block is cbWidth, and wherein the method further comprises:
based on the horizontal distance being less than the vertical distance, setting:
a horizontal component of the adjusted BVP equal to −cbWidth; and
a vertical component of the adjusted BVP equal to a vertical component of the BVP.

11. The method of claim 9, wherein the height of the current block is cbHeight, and wherein the method further comprises:
based on the horizontal distance being greater than first vertical distance, setting:
a horizontal component of the adjusted BVP equal to a horizontal component of the BVP; and
a vertical component of the adjusted BVP equal to −cbHeight.

12. The method of claim 9, wherein the width of the current block is cbWidth and the height of the current block is cbHeight, and wherein method further comprises:
based on the horizontal distance being equal to the first vertical distance, setting:
a horizontal component of the adjusted BVP equal to −cbWidth; and
a vertical component of the adjusted BVP equal to −cbHeight.

13. The method of claim 9, wherein the replacing the BVP with the adjusted BVP is further based on at least one of:
a second horizontal distance from a position of the current block to a second vertical boundary of the IBC reference region of the current block being greater than the width of the current block, wherein the second vertical boundary of the IBC reference region is a left-most vertical boundary of the IBC reference region; and
a second vertical distance from the position of the current block to a second horizontal boundary of the IBC reference region of the current block being greater than the height of the current block, wherein the second horizontal boundary of the IBC reference region is a top-most horizontal boundary of the IBC reference region.

14. The method of claim 9, wherein:
the horizontal distance is based on the sum of the horizontal component of the BVP and the width of the current block; and
the vertical distance is based on the sum of the vertical component of the BVP and the height of the current block.

15. A method comprising:
determining, by a computing device and based on a block vector predictor (BVP) of a reference block, that the reference block overlaps with a current block of a video frame;
based on the determining:
a horizontal distance from a position of the reference block to a vertical boundary of an intra block copy (IBC) reference region of the current block; and
a vertical distance from the position of the reference block to a horizontal boundary of the IBC reference region of the current block; and
replacing, based on a comparison of the horizontal distance and the vertical distance, the BVP with an adjusted BVP that minimizes a change to the position of the reference block.

16. The method of claim 15, wherein the replacing the BVP with the adjusted BVP comprises setting, based on the horizontal distance being less than the vertical distance:
a horizontal component of the adjusted BVP equal to −cbWidth, wherein cbWidth is a width of the current block; and
a vertical component equal of the adjusted BVP to a vertical component of the BVP.

17. The method of claim 15, wherein the replacing the BVP with the adjusted BVP comprises setting, based on the horizontal distance being greater than the vertical distance:
a horizontal component of the adjusted BVP equal to a horizontal component of the BVP; and
a vertical component equal of the adjusted BVP to −cbHeight, wherein cbHeight is a height of the current block.

18. The method of claim 15, further comprising determining:
a second horizontal distance from the position of the current block to a second vertical boundary of the IBC reference region, wherein the second vertical boundary is a left-most vertical boundary of the IBC reference region; and
a second vertical distance from the position of the current block to a second horizontal boundary of the IBC reference region, wherein the second horizontal boundary is a top-most horizontal boundary of the IBC reference region.

19. The method of claim 18, wherein the replacing the BVP with the adjusted BVP comprises setting, based on the second horizontal distance being greater than a width of the current block and the second vertical distance being less than a height of the current block:
a horizontal component of the adjusted BVP equal to −cbWidth, wherein cbWidth is the width of the current block; and
a vertical component of the adjusted BVP equal to a vertical component of the BVP.

20. The method of claim 18, wherein the replacing the BVP with the adjusted BVP comprises setting, based on the second horizontal distance being less than a width of the current block and the second vertical distance being greater than a height of the current block:
- a horizontal component of the adjusted BVP equal to a horizontal component of the BVP; and
- a vertical component of the adjusted BVP equal to −cbHeight, wherein cbHeight is the height of the current block.

* * * * *